United States Patent
Shibuya et al.

(10) Patent No.: US 11,368,908 B2
(45) Date of Patent: Jun. 21, 2022

(54) WIRELESS COMMUNICATION TERMINAL, ACCESS POINT, WIRELESS COMMUNICATION SYSTEM, WIRELESS COMMUNICATION METHOD, AND RECORDING MEDIUM

(71) Applicant: OLYMPUS CORPORATION, Hachioji (JP)

(72) Inventors: Kazuyuki Shibuya, Sagamihara (JP); Tetsuyuki Takahashi, Tokyo (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 38 days.

(21) Appl. No.: 17/142,394

(22) Filed: Jan. 6, 2021

(65) Prior Publication Data

US 2021/0176703 A1 Jun. 10, 2021

Related U.S. Application Data

(63) Continuation of application No. PCT/JP2019/014848, filed on Apr. 3, 2019.

(51) Int. Cl.
*H04W 48/20* (2009.01)
*H04W 76/10* (2018.01)
(Continued)

(52) U.S. Cl.
CPC ......... *H04W 48/20* (2013.01); *H04W 12/037* (2021.01); *H04W 12/06* (2013.01);
(Continued)

(58) Field of Classification Search
CPC .............................. H04W 12/06; G06Q 20/32
(Continued)

(56) References Cited

U.S. PATENT DOCUMENTS

2010/0265928 A1 10/2010 Peng et al.
2011/0268027 A1 11/2011 Nogawa
(Continued)

FOREIGN PATENT DOCUMENTS

JP 2011-234205 A 11/2011
JP 2013-162301 A 8/2013
(Continued)

OTHER PUBLICATIONS

International Search Report dated Jun. 18, 2019, issued in counterpart application No. PCT/JP2019/014848, w/English translation (3 pages).

(Continued)

*Primary Examiner* — Kiet M Doan
(74) *Attorney, Agent, or Firm* — WHDA, LLP

(57) ABSTRACT

In a wireless communication terminal, a control circuit is configured to cause a wireless communicator to wirelessly connect to a first AP on the basis of authentication information of the first AP stored on a memory and is configured to execute authentication processing with the first AP on the basis of the authentication information of the first AP stored on the memory without executing setup processing when the control circuit selects a first mode. The control circuit is configured to start the setup processing with a second AP by using the wireless communicator when the control circuit selects the second mode. The control circuit is configured to cause the wireless communicator to wirelessly connect to the second AP and is configured to execute the authentication processing with the second AP on the basis of authentication information received from the second AP by the wireless communicator.

14 Claims, 24 Drawing Sheets

(51) Int. Cl.
     *H04W 12/037*   (2021.01)
     *H04W 12/06*    (2021.01)
     *H04W 12/08*    (2021.01)
     *H04W 84/12*    (2009.01)

(52) U.S. Cl.
     CPC ........... *H04W 12/08* (2013.01); *H04W 76/10* (2018.02); *H04W 84/12* (2013.01)

(58) Field of Classification Search
     USPC ............. 455/556.14, 411, 567; 370/338, 329
     See application file for complete search history.

(56) References Cited

U.S. PATENT DOCUMENTS

| | | | |
|---|---|---|---|
| 2014/0082207 A1 | 3/2014 | Kikuchi et al. | |
| 2016/0226842 A1* | 8/2016 | Mower | H04W 12/50 |
| 2017/0265081 A1* | 9/2017 | Kitano | H04W 12/12 |

FOREIGN PATENT DOCUMENTS

| | | |
|---|---|---|
| JP | 2013-183251 A | 9/2013 |
| JP | 2014-060503 A | 4/2014 |
| JP | 2014-160889 A | 9/2014 |

OTHER PUBLICATIONS

International Search Report dated Sep. 11, 2018, issued in counterpart application No. PCT/JP2018/026311, w/English translation (3 pages).

* cited by examiner

WIRELESS COMMUNICATION TERMINAL, ACCESS POINT, WIRELESS COMMUNICATION SYSTEM, WIRELESS COMMUNICATION METHOD, AND RECORDING MEDIUM

BACKGROUND OF THE INVENTION

Field of the Invention

The present invention relates to a wireless communication terminal, an access point, a wireless communication system, a wireless communication method, and a recording medium.

The present application is a continuation application based on PCT Patent Application No. PCT/JP2019/014848, filed on Apr. 3, 2019 that claims priority to International Patent Application No. PCT/JP2018/026311 filed on Jul. 12, 2018, and the content of the PCT patent applications is incorporated herein by reference.

Description of Related Art

In conventional technologies, in order for a communication terminal having station functions of a wireless local area network (LAN) to participate in a network (infrastructure network) offered by an access point, various pieces of information (network-setting information) need to be set in the communication terminal. Hereinafter, an access point is abbreviated as AP. For example, the network-setting information includes a network identifier (service set identifier (SSID)), information of an authentication method, and information of an encryption method. Alternatively, the network-setting information includes a passphrase or a pre-shared key (PSK). The passphrase or the PSK becomes the source of a common key in encryption. When the network-setting information is to be set, various pieces of setting information need to be input on a communication terminal and an AP. Since inputting this setting information is complicated, it is difficult for a user, in particular, who is not used to wireless LAN technologies to set the information.

In order to address this problem, Wi-Fi protected setup (TM) is defined as a standard mechanism in the wireless LAN industry. Hereinafter, this is abbreviated as WPS. In the WPS, a communication terminal participates in an infrastructure network by executing setup processing. In the setup processing, the authentication method for an AP to authenticate a communication terminal is identified. In the setup processing, the encryption method used in wireless communication between the AP and the communication terminal authenticated by using the authentication method is identified.

Several setting methods are specified in the WPS. There is a case in which an AP has a function of accepting a communication terminal that desires participation in a network and there is a case in which a terminal other than the AP has the function. Hereinafter, each setting method of the WPS will be described with reference to a case in which the AP has the function as an example.

In a push-button configuration (PBC) method, a user pushes a button provided in a communication terminal that is not participating in a network in which the communication terminal desires participation and also pushes a button provided in an AP that has constructed the network. Alternatively, a user pushes a button that has appeared on a screen by using a graphical user interface (GUI) function. When the button is pushed, the communication terminal and the AP execute the setup processing by using a fixed value defined in the WPS as a seed of an encryption key.

In a personal identification number (PIN) method, a PIN code having an arbitrary value is generated and the PIN code is displayed in a communication terminal that is not participating in a network in which the communication terminal desires participation. The PIN code is input to an AP as a seed of an encryption key in the setup processing and the setup processing is executed. For example, another terminal in a network of an AP may connect to the AP and the PIN code input to the terminal by a user by using a browser may be transmitted from the terminal to the AP.

In the near-field communication (NFC) method, a communication terminal and an AP come near to each other and information is delivered between the communication terminal and the AP by using near-field radio waves. Alternatively, a token card comes near to the communication terminal and the AP and information is delivered between the communication terminal and the AP via the token card. By using these methods, seed information similar to the above-described PIN code is input to each terminal or the network-setting information is input to each terminal.

The AP can securely deliver the network-setting information possessed by the AP to the communication terminal through the setup processing. After delivering the network-setting information on the basis of the WPS is completed, the communication terminal can set the network-setting information on the basis of the delivered network-setting information. A user does not need to perform the troublesome work to input a passphrase, a PSK, or the like. The communication terminal can execute authentication processing with the AP and can perform communication of encrypted data with the AP if necessary.

There is a case in which a general communication terminal such as a PC or a smartphone connects to an AP having experience in succeeding in connection and authentication with the communication terminal and executes the authentication with the AP again. Automatic connection for executing the connection and the authentication with an AP has been available in recent years. The communication terminal stores the network-setting information previously used in the connection and the authentication. The communication terminal connects to the AP and executes the authentication by using the stored network-setting information. In the automatic connection, inputting the network-setting information by a user or inputting the network-setting information on the basis of the WPS are unnecessary. In many cases, a user can set ON and OFF of the automatic connection.

Although the automatic connection is a convenient function as described above, the automatic connection is not always useful. In some cases, a user needs to switch between ON and OFF of the automatic connection. There is also a case in which inputting the network-setting information by a user or inputting the network-setting information on the basis of the WPS are necessary.

For example, the following case will be described. The device group A includes one or more communication terminals and each of the communication terminals distributes pictures captured by a camera included in each of the communication terminals. The device group B includes one or more APs and each of the APs receives the pictures distributed by the device group A. One communication terminal distributes pictures to only one AP. For example, the device group A includes only one device A1 and the device group B includes two devices of a device B1 and a device B2.

In a case in which the device A1 has experience in connecting to the device B1 and executing the authentication with the device B1, the device A1 stores the network-setting information of the device B1. Both the device B1 and the device B2 are operating as an AP. The automatic connection of the device A1 is in a valid state. The device A1 connects to the device B1 by using the stored network-setting information and executes the authentication with the device B1. Since the device A1 does not connect to the device B2, the device A1 is unable to distribute pictures to the device B2 even though a user desires to start distribution of pictures from the device A1 to the device B2. This is a situation against the intention of a user. Therefore, it is desirable that the device A1 connects to the device B2 and executes the authentication with the device B2 without executing the automatic connection.

On the other hand, a case in which the device group A includes only one device A3 and the device group B includes only one device B3 will be described. It is not convenient for a user to input the network-setting information of the device B3 to the device A3 every time in order to distribute pictures from the device A3 to the device B3. In a case in which the network-setting information is acquired on the basis of the WPS, a user does not need to input the network-setting information. However, it is not convenient that the network-setting information is acquired on the basis of the WPS each time delivery of pictures is performed. In this case, a user inputs the network-setting information of the device B3 to the device A3 or the device A3 acquires the network-setting information of the device B3 on the basis of the WPS. The device A3 stores the network-setting information used for the connection and the authentication after succeeding in the connection and the authentication. Thereafter, it is desirable for the device A3 to execute the automatic connection.

In the technique disclosed in Japanese Unexamined Patent Application, First Publication No. 2013-162301, when a device newly connects to an AP, the network-setting information is input on the basis of a user's operation or the WPS and the device connects to the AP and executes the authentication with the AR When the device connects to the AP having experience in connecting to the device, the device connects to the AP on the basis of the stored network-setting information and executes the authentication with the AR When the device succeeds in the connection and the authentication, the device executes connection processing in the upper layer.

SUMMARY OF THE INVENTION

According to a first aspect of the present invention, a wireless communication terminal includes a control circuit, a wireless communicator, and a memory. The memory is configured to store authentication information received from an access point when the control circuit executes setup processing with the access point by using the wireless communicator. The control circuit is configured to detect one or more access points by executing scanning using the wireless communicator. The control circuit is configured to determine whether or not a first AP is included in the one or more access points. The first AP is an access point having experience in executing the setup processing with the wireless communication terminal. The first AP is the last access point wirelessly connected to by the wireless communicator. The control circuit is configured to determine whether or not a second AP is included in the one or more access points. The second AP is an access point in a state of being able to execute the setup processing with the wireless communication terminal. The control circuit is configured to select any one of a first mode and a second mode by executing selection processing when the wireless communicator does not wireles sly connect to any of the one or more access points. The first mode is an operation mode in which the setup processing is not executed. The second mode is an operation mode in which the setup processing is executed. The control circuit is configured to prevent the wireless communicator from wirelessly connecting to any of the one or more access points when the control circuit selects the first mode in the selection processing and the first AP is not included in the one or more access points. The control circuit is configured to cause the wireless communicator to wirelessly connect to the first AP on the basis of the authentication information of the first AP stored on the memory and is configured to execute authentication processing with the first AP on the basis of the authentication information of the first AP stored on the memory without executing the setup processing when the control circuit selects the first mode in the selection processing and the first AP is included in the one or more access points. The control circuit is configured to cause the wireless communicator to transmit setup information to the second AP and is configured to start the setup processing with the second AP by using the wireless communicator regardless of whether or not a user performs a new operation on the wireless communication terminal after the second mode is selected and regardless of whether or not the authentication information is stored on the memory when the control circuit selects the second mode in the selection processing. The setup information indicates that the control circuit is able to execute the setup processing. After the setup processing is executed, the control circuit is configured to cause the wireless communicator to wirelessly connect to the second AP with which the control circuit has executed the setup processing and is configured to execute the authentication processing, on the basis of authentication information received from the second AP by the wireless communicator in the setup processing, with the second AP with which the control circuit has executed the setup processing.

According to a second aspect of the present invention, in the first aspect, the control circuit may be configured to select the first mode in the selection processing when the setup information is not included in information received from at least one of the one or more access points by the wireless communicator by executing the scanning According to a third aspect of the present invention, in the first aspect, the control circuit may be configured to select the second mode in the selection processing when the setup information is included in information received from at least one of the one or more access points by the wireless communicator by executing the scanning.

According to a fourth aspect of the present invention, in the first aspect, the wireless communication terminal may further include an alarm circuit. The control circuit may be configured to notify a user of occurrence of an error by using the alarm circuit without selecting any of the first mode and the second mode in the selection processing when the wireless communicator receives information not including the setup information from at least one of the one or more access points by executing the scanning and the wireless communicator receives the setup information from at least one of the one or more access points by executing the scanning.

According to a fifth aspect of the present invention, in the first aspect, the wireless communication terminal may further include an operation device configured to accept an operation of selecting any one of the first mode and the second mode. The control circuit may be configured to select the first mode in the selection processing when the operation device accepts an operation of selecting the first mode. The control circuit may be configured to select the second mode in the selection processing when the operation device accepts an operation of selecting the second mode.

According to a sixth aspect of the present invention, in the first aspect, the control circuit may be configured to update the authentication information stored on the memory with the authentication information received from the second AP each time the setup processing is executed.

According to a seventh aspect of the present invention, in the first aspect, the control circuit may be configured to select the first mode in the selection processing when the wireless communicator receives the setup information from only any one of the one or more access points by executing the scanning. The control circuit may be configured to select the second mode in the selection processing when the control circuit detects two or more access points by executing the scanning using the wireless communicator and the wireless communicator receives the setup information from at least two of the two or more access points by executing the scanning.

According to an eighth aspect of the present invention, in the first aspect, the wireless communication terminal may further include an operation device configured to accept an operation of selecting any one of a first mode, a second mode, and a third mode. The third mode is an operation mode for selecting any one of the first mode and the second mode on the basis of a state of receiving the setup information. The control circuit may be configured to select the first mode in the selection processing when the operation device accepts an operation of selecting the first mode. The control circuit may be configured to select the second mode in the selection processing when the operation device accepts an operation of selecting the second mode. The control circuit may be configured to select the first mode in the selection processing when the operation device accepts an operation of selecting the third mode and the wireless communicator receives the setup information from only any one of the one or more access points by executing the scanning. The control circuit may be configured to select the second mode in the selection processing when the control circuit detects two or more access points by executing the scanning using the wireless communicator, the operation device accepts an operation of selecting the third mode, and the wireless communicator receives the setup information from at least two of the two or more access points by executing the scanning.

According to a ninth aspect of the present invention, in the first aspect, the authentication information may be configured to be information used for generating a common key and the common key is used for encryption of data communication.

According to a tenth aspect of the present invention, in the first aspect, the authentication information may include at least one of a passphrase and a pre-shared key (PSK).

According to an eleventh aspect of the present invention, an access point is configured to execute wireless communication with a wireless communication terminal. The access point includes a first control circuit and a first wireless communicator. The wireless communication terminal includes a second control circuit, a second wireless communicator, and a memory. The memory is configured to store authentication information received from the access point when the second control circuit executes setup processing with the access point by using the second wireless communicator. The second control circuit is configured to detect one or more access points by executing scanning using the second wireless communicator. The second control circuit is configured to determine whether or not a first AP is included in the one or more access points. The first AP is an access point having experience in executing the setup processing with the wireless communication terminal. The first AP is the last access point wirelessly connected to by the second wireless communicator. The second control circuit is configured to determine whether or not a second AP is included in the one or more access points. The second AP is an access point in a state of being able to execute the setup processing with the wireless communication terminal. The second control circuit is configured to select any one of a first mode and a second mode by executing selection processing when the second wireless communicator does not wirelessly connect to any of the one or more access points. The first mode is an operation mode in which the setup processing is not executed. The second mode is an operation mode in which the setup processing is executed. The second control circuit is configured to prevent the second wireless communicator from wirelessly connecting to any of the one or more access points when the second control circuit selects the first mode in the selection processing and the first AP is not included in the one or more access points. The second control circuit is configured to cause the second wireless communicator to wirelessly connect to the first AP on the basis of the authentication information of the first AP stored on the memory and is configured to execute authentication processing with the first AP on the basis of the authentication information of the first AP stored on the memory without executing the setup processing when the second control circuit selects the first mode in the selection processing and the first AP is included in the one or more access points. The second control circuit is configured to cause the second wireless communicator to transmit setup information to the second AP and is configured to start the setup processing with the second AP by using the second wireless communicator regardless of whether or not a user performs a new operation on the wireless communication terminal after the second mode is selected and regardless of whether or not the authentication information is stored on the memory when the second control circuit selects the second mode in the selection processing. The setup information indicates that the second control circuit is able to execute the setup processing. After the setup processing is executed, the second control circuit is configured to cause the second wireless communicator to wirelessly connect to the second AP with which the second control circuit has executed the setup processing and is configured to execute the authentication processing, on the basis of authentication information received from the second AP by the second wireless communicator in the setup processing, with the second AP with which the second control circuit has executed the setup processing. The first control circuit is configured to generate authentication information. The first control circuit is configured to cause the first wireless communicator to wirelessly connect to the wireless communication terminal and is configured to execute the authentication processing with the wireless communication terminal on the basis of the generated authentication information without executing the setup processing in a case in which the first wireless communicator does not receive the setup information from the wireless communication terminal. The first control circuit is configured start the setup processing with the wireless communication terminal by using the first wireless communicator when the first wireless communicator receives the setup information from the wireless communication terminal. The first control circuit is configured to cause the first wireless communicator to transmit the generated authentication information to the wireless communication terminal in the setup processing. After the setup processing is executed, the first control circuit is configured to cause the first wireless communicator to wirelessly connect to the wireless communication terminal with which the first control circuit has executed the setup processing and is configured to execute the authentication processing, on the basis of the authentication information transmitted to the wireless communication terminal in the setup processing, with the wireless communication terminal with which the first control circuit has executed the setup processing. The first control circuit is configured to generate authentication information different from the already generated authentication information each time the first control circuit executes the setup processing.

According to a twelfth aspect of the present invention, a wireless communication system includes an access point and a wireless communication terminal. The access point includes a first wireless communicator and a first control circuit. The wireless communication terminal includes a second control circuit, a second wireless communicator, and a memory. The memory is configured to store authentication information received from the access point when the second control circuit executes setup processing with the access point by using the second wireless communicator. The second control circuit is configured to detect one or more access points by executing scanning using the second wireless communicator. The second control circuit is configured to determine whether or not a first AP is included in the one or more access points. The first AP is an access point having experience in executing the setup processing with the wireless communication terminal. The first AP is the last access point wirelessly connected to by the second wireless communicator. The second control circuit is configured to determine whether or not a second AP is included in the one or more access points. The second AP is an access point in a state of being able to execute the setup processing with the wireless communication terminal. The second control circuit is configured to select any one of a first mode and a second mode by executing selection processing when the second wireless communicator does not wirelessly connect to any of the one or more access points. The first mode is an operation mode in which the setup processing is not executed. The second mode is an operation mode in which the setup processing is executed. The second control circuit is configured to prevent the second wireless communicator from wirelessly connecting to any of the one or more access points when the second control circuit selects the first mode in the selection processing and the first AP is not included in the one or more access points. The second control circuit is configured to cause the second wireless communicator to wirelessly connect to the first AP on the basis of the authentication information of the first AP stored on the memory and is configured to execute authentication processing with the first AP on the basis of the authentication information of the first AP stored on the memory without executing the setup processing when the second control circuit selects the first mode in the selection processing and the first AP is included in the one or more access points. The second control circuit is configured to cause the second wireless communicator to transmit setup information to the second AP and is configured to start the setup processing with the second AP by using the second wireless communicator regardless of whether or not a user performs a new operation on the wireless communication terminal after the second mode is selected and regardless of whether or not the authentication information is stored on the memory when the second control circuit selects the second mode in the selection processing. The setup information indicates that the second control circuit is able to execute the setup processing. After the setup processing is executed, the second control circuit is configured to cause the second wireless communicator to wirelessly connect to the second AP with which the second control circuit has executed the setup processing and is configured to execute the authentication processing, on the basis of authentication information received from the second AP by the second wireless communicator in the setup processing, with the second AP with which the second control circuit has executed the setup processing. The first control circuit is configured to generate authentication information. The first control circuit is configured to cause the first wireless communicator to wirelessly connect to the wireless communication terminal and is configured to execute the authentication processing with the wireless communication terminal on the basis of the generated authentication information without executing the setup processing in a case in which the first wireless communicator does not receive the setup information from the wireless communication terminal. The first control circuit is configured to start the setup processing with the wireless communication terminal by using the first wireless communicator when the first wireless communicator receives the setup information from the wireless communication terminal. The first control circuit is configured to cause the first wireless communicator to transmit the generated authentication information to the wireless communication terminal in the setup processing. After the setup processing is executed, the first control circuit is configured to cause the first wireless communicator to wirelessly connect to the wireless communication terminal with which the first control circuit has executed the setup processing and is configured to execute the authentication processing, on the basis of the authentication information transmitted to the wireless communication terminal in the setup processing, with the wireless communication terminal with which the first control circuit has executed the setup processing. The first control circuit is configured to generate authentication information different from the already generated authentication information each time the first control circuit executes the setup processing.

According to a thirteenth aspect of the present invention, a wireless communication method of a wireless communication terminal is provided. The wireless communication terminal includes a control circuit, a wireless communicator, and a memory. The memory is configured to store authentication information received from an access point when the control circuit executes setup processing with the access point by using the wireless communicator. The wireless communication method includes a first step, a second step, a third step, a fourth step, a fifth step, a sixth step, and a seventh step. The control circuit detects one or more access points by executing scanning using the wireless communicator in the first step. The control circuit determines whether or not a first AP is included in the one or more access points in the second step. The first AP is an access point having experience in executing the setup processing with the wireless communication terminal. The first AP is the last access point wirelessly connected to by the wireless communicator. The control circuit determines whether or not a second AP is included in the one or more access points in the third step.

The second AP is an access point in a state of being able to execute the setup processing with the wireless communication terminal. The control circuit selects any one of a first mode and a second mode by executing selection processing in the fourth step when the wireless communicator does not wirelessly connect to any of the one or more access points. The first mode is an operation mode in which the setup processing is not executed, the second mode is an operation mode in which the setup processing is executed. The control circuit prevents the wireless communicator from wirelessly connecting to any of the one or more access points when the control circuit selects the first mode in the selection processing and the first AP is not included in the one or more access points. The control circuit causes the wireless communicator to wirelessly connect to the first AP on the basis of the authentication information of the first AP stored on the memory and executes authentication processing with the first AP on the basis of the authentication information of the first AP stored on the memory in the fifth step without executing the setup processing when the control circuit selects the first mode in the selection processing and the first AP is included in the one or more access points. The control circuit causes the wireless communicator to transmit setup information to the second AP and starts the setup processing with the second AP by using the wireless communicator in the sixth step regardless of whether or not a user performs a new operation on the wireless communication terminal after the second mode is selected and regardless of whether or not the authentication information is stored on the memory when the control circuit selects the second mode in the selection processing. The setup information indicates that the control circuit is able to execute the setup processing. The control circuit causes the wireless communicator to wirelessly connect to the second AP with which the control circuit has executed the setup processing and executes the authentication processing, on the basis of authentication information received from the second AP by the wireless communicator in the setup processing, with the second AP with which the control circuit has executed the setup processing in the seventh step after the setup processing is executed.

According to a fourteenth aspect of the present invention, a non-transitory computer-readable recording medium saves a program for causing a control circuit of a wireless communication terminal to execute processing. The wireless communication terminal includes a control circuit, a wireless communicator, and a memory. The memory is configured to store authentication information received from an access point when the control circuit executes setup processing with the access point by using the wireless communicator. The program causes the control circuit to execute a first step, a second step, a third step, a fourth step, a fifth step, a sixth step, and a seventh step. The control circuit detects one or more access points by executing scanning using the wireless communicator in the first step. The control circuit determines whether or not a first AP is included in the one or more access points in the second step. The first AP is an access point having experience in executing the setup processing with the wireless communication terminal. The first AP is the last access point wirelessly connected to by the wireless communicator. The control circuit determines whether or not a second AP is included in the one or more access points in the third step. The second AP is an access point in a state of being able to execute the setup processing with the wireless communication terminal. The control circuit selects any one of a first mode and a second mode by executing selection processing in the fourth step when the wireless communicator does not wirelessly connect to any of the one or more access points. The first mode is an operation mode in which the setup processing is not executed, the second mode is an operation mode in which the setup processing is executed. The control circuit prevents the wireless communicator from wirelessly connecting to any of the one or more access points when the control circuit selects the first mode in the selection processing and the first AP is not included in the one or more access points. The control circuit causes the wireless communicator to wirelessly connect to the first AP on the basis of the authentication information of the first AP stored on the memory and executes authentication processing with the first AP on the basis of the authentication information of the first AP stored on the memory in the fifth step without executing the setup processing when the control circuit selects the first mode in the selection processing and the first AP is included in the one or more access points. The control circuit causes the wireless communicator to transmit setup information to the second AP and starts the setup processing with the second AP by using the wireless communicator in the sixth step regardless of whether or not a user performs a new operation on the wireless communication terminal after the second mode is selected and regardless of whether or not the authentication information is stored on the memory when the control circuit selects the second mode in the selection processing. The setup information indicates that the control circuit is able to execute the setup processing. The control circuit causes the wireless communicator to wirelessly connect to the second AP with which the control circuit has executed the setup processing and executes the authentication processing, on the basis of authentication information received from the second AP by the wireless communicator in the setup processing, with the second AP with which the control circuit has executed the setup processing in the seventh step after the setup processing is executed.

DETAILED DESCRIPTION OF THE INVENTION

Hereinafter, embodiments of the present invention will be described with reference to the drawings.

First Embodiment

Figure 1:
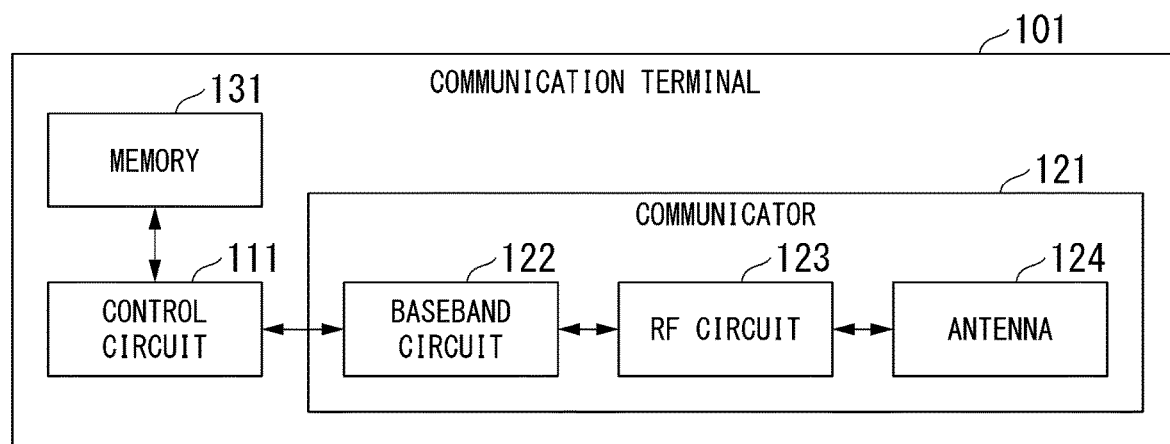
FIG. 1 is a block diagram showing a configuration of a communication terminal according to a first embodiment of the present invention.

FIG. 1 shows a configuration of a communication terminal 101 according to a first embodiment of the present invention. The communication terminal 101 is a wireless communication terminal. The communication terminal 101 shown in FIG. 1 includes a control circuit 111 (second control circuit), a communicator 121, and a memory 131. The communicator 121 is a wireless communicator (second wireless communicator).

A schematic configuration of the communication terminal 101 will be described. When the control circuit 111 executes setup processing with an AP (access point) by using the communicator 121, the memory 131 stores authentication information (WPS authentication information) received from the AP. The control circuit 111 detects one or more APs by executing scanning using the communicator 121. The control circuit 111 determines whether or not a first AP is included in the one or more APs detected through the scanning. The first AP is an AP having experience in executing the setup processing with the communication terminal 101 and is the last AP wirelessly connected to by the communicator 121. The first AP is an AP to which the communicator 121 wirelessly connected last among the APs having experience in executing the setup processing with the communication terminal 101. The control circuit 111 determines whether or not a second AP is included in the one or more APs detected through the scanning The second AP is an AP in a state of being able to execute the setup processing with the communication terminal 101.

When the communicator 121 does not wirelessly connect to any of the one or more APs detected through the scanning, the control circuit 111 selects any one of a first mode and a second mode by executing selection processing. The first mode is an operation mode in which the setup processing is not executed. The second mode is an operation mode in which the setup processing is executed. When the control circuit 111 selects the first mode in the selection processing and the first AP is not included in the one or more APs detected through the scanning, the control circuit 111 prevents the communicator 121 from wirelessly connecting to any of the one or more APs detected through the scanning. When the control circuit 111 selects the first mode in the selection processing and the first AP is included in the one or more APs detected through the scanning, the control circuit 111 causes the communicator 121 to wirelessly connect to the first AP on the basis of the authentication information of the first AP stored on the memory 131 and executes the authentication processing with the first AP on the basis of the authentication information of the first AP stored on the memory 131 without executing the setup processing.

When the control circuit 111 selects the second mode in the selection processing, the control circuit 111 causes the communicator 121 to transmit setup information to the second AP and causes the communicator 121 to start the setup processing with the second AP regardless of whether or not a user performs a new operation after the second mode is selected and regardless of whether or not the authentication information is stored on the memory 131. The setup information indicates that the control circuit 111 is able to execute the setup processing. After the setup processing is executed, the control circuit 111 causes the communicator 121 to wirelessly connect to the second AP with which the setup processing has been executed and executes the authentication processing, on the basis of the authentication information received from the second AP by the communicator 121 in the setup processing, with the second AP with which the setup processing has been executed.

A detailed configuration of the communication terminal 101 will be described. For example, the control circuit 111 (controller) is a processor. The processor is at least one of a central processing unit (CPU), a digital signal processor (DSP), and a graphics-processing unit (GPU). The communication terminal 101 may include one or a plurality of processors. The control circuit 111 may be at least one of a dedicated IC, an application-specific integrated circuit (ASIC), and a field-programmable gate array (FPGA).

The control circuit 111 may read a program and execute the read program. The program includes commands defining the operations of the control circuit 111. In other words, the functions of the control circuit 111 may be realized by software. The program, for example, may be provided by using a "computer-readable recording medium" such as a flash memory. The program may be transmitted from a computer storing the program to the communication terminal 101 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

The communicator 121 is a wireless module. For example, the communicator 121 performs communication in accordance with IEEE802.11. The communicator 121 includes a baseband circuit 122, an RF circuit 123, and an antenna 124.

The baseband circuit 122 performs digital signal processing in accordance with an instruction from the control circuit 111 and converts a digital signal into an analog signal through D/A conversion. The analog signal generated by the baseband circuit 122 is output to the RF circuit 123. In addition, the baseband circuit 122 converts an analog signal output from the RF circuit 123 into a digital signal through A/D conversion and processes the digital signal. The control circuit 111 controls part of the processing in the media access control (MAC) layer among processing performed on the digital signal by the baseband circuit 122. The MAC layer is included in the data link layer.

The RF circuit 123 modulates the analog signal output from the baseband circuit 122 into an analog signal of a frequency band of carrier waves. The analog signal modulated by the RF circuit 123 is output to the antenna 124. In addition, the RF circuit 123 demodulates the analog signal of the frequency band of carrier waves output from the antenna 124. The analog signal demodulated by the RF circuit 123 is output to the baseband circuit 122. The antenna 124 converts the analog signal output from the RF circuit 123 into radio waves and transmits the radio waves to an external terminal. In addition, the antenna 124 receives radio waves transmitted from the external terminal and converts the received radio waves into an analog signal. The analog signal processed by the antenna 124 is output to the RF circuit 123.

In the example shown in FIG. 1, the antenna 124 is disposed inside the communicator 121. The antenna 124 may be disposed outside the communicator 121.

The control circuit 111 is disposed outside the communicator 121 and controls the entire operations of the communication terminal 101. The control circuit 111 controls the baseband circuit 122 and the memory 131. In a case in which the communication terminal 101 includes a display unit, an operation unit, or the like not shown in FIG. 1, the control circuit 111 controls the display unit, the operation unit, or the like. A control circuit disposed inside the communicator 121 may control the baseband circuit 122 in place of the control circuit 111. In such a case, the control circuit 111 controls the control circuit inside the communicator 121.

The control circuit 111 transmits information such as a connection request to the AP by using the communicator 121. Specifically, the control circuit 111 controls the communicator 121 such that information is transmitted to the AP. In other words, the control circuit 111 causes the communicator 121 to transmit information for the AP. In this way, the communicator 121 transmits information to the AP. The control circuit 111 receives information such as WPS authentication information from the AP by using the communicator 121. Specifically, the control circuit 111 controls the communicator 121 such that information is received from the AP. In other words, the control circuit 111 causes the communicator 121 to receive information from the AP. In this way, the communicator 121 receives information from the AP.

The memory 131 is a volatile or nonvolatile storage medium. For example, the memory 131 is at least one of a random-access memory (RAM), a dynamic random-access memory (DRAM), a static random-access memory (SRAM), an electrically erasable programmable read-only memory (EEPROM), and a flash memory.

For example, the AP includes a mode switch in the first embodiment. The mode switch is a switch for switching the operation modes of the AP. The AP determines the state of the AP on the basis of the state of the mode switch. The state in which the AP or the communication terminal 101 is able to execute the setup processing is defined as WPS support. The state in which the AP or the communication terminal 101 is able to execute the automatic connection without executing the setup processing is defined as WPS non-support.

The communication terminal 101 selects any one of the first mode and the second mode on the basis of the information transmitted from the AP. In other words, the communication terminal 101 determines whether to execute the automatic connection without executing the setup processing or execute the setup processing. When the state of the AP is the WPS support, the AP transmits information indicating that the AP supports the WPS to the communication terminal 101. In a case in which the information indicating that the AP supports the WPS is not received, the communication terminal 101 selects the first mode and executes the automatic connection. In a case in which the information indicating that the AP supports the WPS is received, the communication terminal 101 selects the second mode and executes the setup processing.

Figure 2:
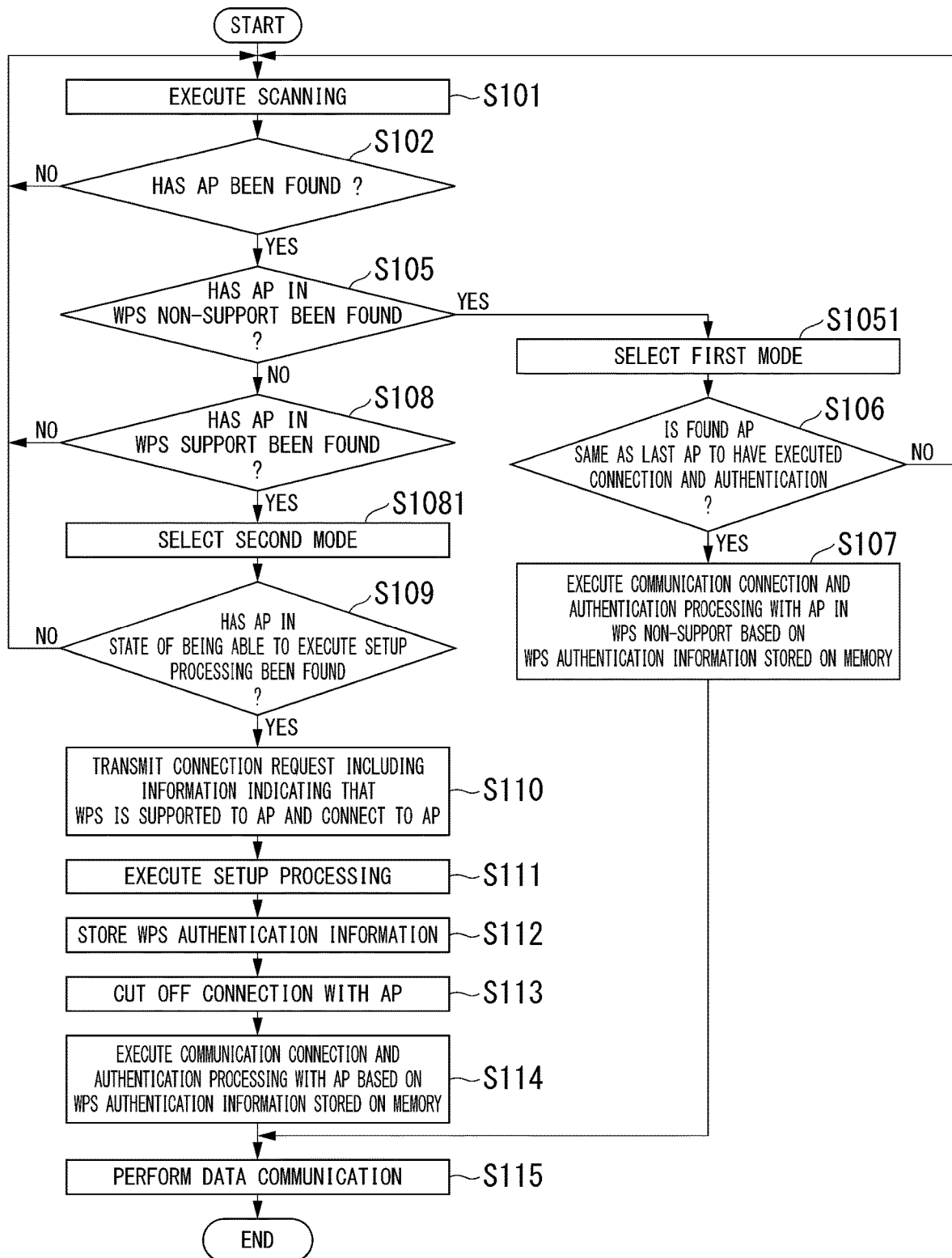
FIG. 2 is a flow chart showing a procedure of an operation of the communication terminal according to the first embodiment of the present invention.

An operation of the communication terminal 101 will be described. FIG. 2 shows a procedure of the operation of the communication terminal 101. For example, when the power source of the communication terminal 101 is turned on or the communicator 121 returned from a sleep state to a normal state, the operation shown in FIG. 2 is executed. When the operation shown in FIG. 2 is started, the communication terminal 101 is in a state of not connecting to the AP.

(Step S101)

The control circuit 111 executes the scanning by using the communicator 121. For example, the control circuit 111 executes passive scanning. The control circuit 111 receives a beacon from the AP in the passive scanning. Alternatively, the control circuit 111 executes active scanning. The control circuit 111 transmits a probe request including the information (WSC IE) indicating that the communication terminal 101 supports the WPS by broadcasting. For example, the scanning is executed for a predetermined period of time. This WSC IE is the setup information.

(Step S102)

After Step S101, the control circuit 111 determines whether or not the AP has been found through the scanning.

When the control circuit 111 determines that the AP has not been found in Step S102, the processing in Step S101 is executed. In other words, the control circuit 111 repeatedly executes the scanning until the AP is found.

(Step S105)

When the control circuit 111 determines that the AP has been found in Step S102, the control circuit 111 determines whether or not the AP in the WPS non-support has been found. When a beacon not including the WSC IE or a probe response not including the WSC IE is received from the AP, the control circuit 111 determines that the AP in the WPS non-support has been found. The WSC IE indicates that the AP supports the WPS. In other words, the WSC IE indicates that the AP is able to execute the setup processing on the basis of the WPS. The probe response is a scanning response transmitted from the AP when the active scanning is executed.

(Step S108)

When the control circuit 111 determines that the AP in the WPS non-support has not been found in Step S105, the control circuit 111 determines whether or not the AP in the WPS support has been found. The control circuit 111 determines whether or not the second AP is included in the one or more APs detected through the scanning by executing the processing in Step S108. When the beacon or the probe response received from the AP includes the WSC IE, the control circuit 111 determines that the AP in the WPS support has been found. When the control circuit 111 determines that the AP in the WPS support has not been found in Step S108, the processing in Step S101 is executed.

(Step S1051)

When the control circuit 111 determines that the AP in the WPS non-support has been found in Step S105, the control circuit 111 selects the first mode. The control circuit 111 stores information indicating the selected first mode on the memory 131. When the state in which the first mode is selected continues, the control circuit 111 does not need to execute the processing in Step S1051.

(Step S106)

After Step S1051, the control circuit 111 determines whether or not the AP found through the scanning is the same as the last AP to have executed connection and authentication with the communication terminal 101. The control circuit 111 determines whether or not the first AP is included in the one or more APs detected through the scanning by executing the processing in Step S106.

For example, the memory 131 stores multiple pieces of WPS authentication information. A flag is attached to only the WPS authentication information received from the last AP to have executed the connection and the authentication with the communication terminal 101. In a case in which the following first and second conditions are met, the AP found through the scanning is the same as the last AP to have executed the connection and the authentication with the communication terminal 101. The first condition indicates that the network identifier of the AP found through the scanning is the same as the network identifier of the WPS authentication information to which the flag is attached. The second condition indicates that the MAC address of the AP found through the scanning is the same as the MAC address of the WPS authentication information to which the flag is attached.

The memory 131 may separately store the network identifier and the MAC address of the last AP to have executed the connection and the authentication with the communication terminal 101. The network identifier and the MAC address are distinguished from the WPS authentication information. In a case in which the following third and fourth conditions are met, the AP found through the scanning is the same as the last AP to have executed the connection and the authentication with the communication terminal 101. The third condition indicates that the network identifier of the AP found through the scanning is the same as the network identifier separately stored on the memory 131. The fourth condition indicates that the MAC address of the AP found through the scanning is the same as the MAC address separately stored on the memory 131.

The memory 131 may store only one piece of the WPS authentication information. In a case in which the following fifth and sixth conditions are met, the AP found through the scanning is the same as the last AP to have executed the connection and the authentication with the communication terminal 101. The fifth condition indicates that the network identifier of the AP found through the scanning is the same as the network identifier of the WPS authentication information stored on the memory 131. The sixth condition indicates that the MAC address of the AP found through the scanning is the same as the MAC address of the WPS authentication information stored on the memory 131.

The WPS authentication information is the network-setting information. The WPS authentication information is configured to be information used for generating a common key. The common key is used for encryption of data communication. The WPS authentication information includes at least one of a passphrase and a pre-shared key (PSK). The WPS authentication information may include only any one of the passphrase and the PSK. The WPS authentication information may include the passphrase and the PSK. The WPS authentication information includes the network identifier and the MAC address of the AP in addition to at least one of the passphrase and the PSK. The WPS authentication information may further include another piece of information. The WPS authentication information is used in the authentication processing executed by the communication terminal 101 and the AP in order to generate the common key. The common key is used in communication of encrypted data between the communication terminal 101 and the AP.

The communication terminal 101 may include a display unit. When the AP found through the scanning is not the same as the last AP to have executed the connection and the authentication with the communication terminal 101, the control circuit 111 may cause the display unit to display information that urges a user to set the AP to be in the state in which the WPS is supported.

When the control circuit 111 determines that the AP found through the scanning is not the same as the last AP to have executed the connection and the authentication with the communication terminal 101 in Step S106, the processing in Step S101 is executed. In this case, the last AP to have executed the connection and the authentication with the communication terminal 101 has not been detected through the scanning. The control circuit 111 prevents the communicator 121 from wirelessly connecting to any of the one or more APs found through the scanning In other words, the control circuit 111 does not execute communication connection with any of the one or more APs found through the scanning.

(Step S107)

When the control circuit 111 determines that the AP found through the scanning is the same as the last AP to have executed the connection and the authentication with the communication terminal 101 in Step S106, the control circuit 111 executes the communication connection and the authentication processing with the AP. The state of the AP is the WPS non-support. The control circuit 111 causes the communicator 121 to wirelessly connect to the AP in the communication connection by using the network identifier of the WPS authentication information and the MAC address of the WPS authentication information stored on the memory 131. After the connection is completed, the control circuit 111 executes the authentication processing with the AP on the basis of, for example, the WPA2-PSK by using the passphrase of the WPS authentication information or the PSK of the WPS authentication information stored on the memory 131.

The control circuit 111 causes the communicator 121 to transmit a connection request (association request) to the AP in the communication connection of Step S107. This connection request does not include the information (WSC IE) indicating that the communication terminal 101 supports the WPS. The control circuit 111 causes the communicator 121 to receive a connection response (association response) transmitted from the AP. When the connection response includes information indicating a success, the connection is completed. The network identifier and the MAC address used in the communication connection of Step S107 may be acquired through the scanning in Step S101. Alternatively, in a case in which the third condition or the fourth condition is met in Step S106, the network identifier of the AP and the MAC address of the AP stored on the memory 131 may be used.

The setup processing is not executed in Step S107. The communicator 121 wirelessly connects to the first AP in Step S107. The control circuit 111 executes the authentication processing with the first AP in Step S107. The control circuit 111 causes the communicator 121 to transmit information necessary for the authentication to the first AP in the authentication processing of Step S107. The control circuit 111 causes the communicator 121 to receive information necessary for the authentication from the first AP in the authentication processing of Step S107.

(Step S115)

After Step S107, the control circuit 111 causes the communicator 121 to perform wireless data communication with the AP.

(Step S1081)

When the control circuit 111 determines that the AP in the WPS support has been found in Step S108, the control circuit 111 selects the second mode. The control circuit 111 stores information indicating the selected second mode on the memory 131. When the state in which the second mode is selected continues, the control circuit 111 does not need to execute the processing in Step S1081.

In the operation shown in FIG. 2, when the WSC IE (setup information) is not included in the information received from at least one of the one or more APs by the communicator 121 by executing the scanning, the control circuit 111 selects the first mode in the selection processing (Step S1051). In the operation shown in FIG. 2, when the WSC IE is included in the information received from at least one of the one or more APs by the communicator 121 by executing the scanning, the control circuit 111 selects the second mode in the selection processing (Step S1081).

(Step S109)

After Step S1081, the control circuit 111 determines whether or not the AP in the state of being able to execute the setup processing has been found. The AP in the state of being able to execute the setup processing is an AP that has become able to execute the setup processing for the communication terminal 101. When a trigger is generated on the basis of the WPS method, the AP is then able to execute the setup processing. For example, in the PBC method, when a button is pushed, the AP is then able to execute the setup processing. In the NFC method, when the communication terminal 101 and the AP are able to communicate with each other through the near-field wireless communication, the AP is then able to execute the setup processing. Alternatively, in the NFC method, when the communication terminal 101 and the AP touch each other via a token card, the AP is then able to execute the setup processing. In the PIN method, when the AP goes into a state of being able to accept a PIN code, the AP is then able to execute the setup processing.

When the AP is then able to execute the setup processing, 1 is set in the selected-registrar in the WSC IE of the beacon and the WSC IE of the probe response transmitted from the AP. This selected-registrar indicates whether or not a device transmitting the WPS authentication information is able to execute the setup processing. The communication terminal 101 can determine whether or not the AP is able to execute the setup processing on the basis of the value that has been set in the WSC IE of the beacon or the value that has been set in the WSC IE of the probe response. When the control circuit 111 determines that the AP in the state of being able to execute the setup processing has not been found in Step S109, the processing in Step S101 is executed.

(Step S110)

When the control circuit 111 determines that the AP in the state of being able to execute the setup processing has been found in Step S109, the control circuit 111 executes the communication connection with the AP found in Step S109. The control circuit 111 causes the communicator 121 to transmit a connection request to the AP found in Step S109 and wirelessly connect to the AP in the communication connection. This connection request includes the information (WSC IE) indicating that the communication terminal 101 supports the WPS.

When a plurality of APs that are in the WPS support have been found in Step S108 and only one AP is able to execute the setup processing, the communication terminal 101 connects to the AP. When a plurality of APs are able to execute the setup processing and the WPS method used by the AP is the PBC, the control circuit 111 generates an error in accordance with the specifications of the WPS and completes processing. This is not shown in FIG. 2. The WPS method used by the AP is indicated by the device password ID described later.

The control circuit 111 causes the communicator 121 to transmit a connection request (association request) to the AP in the communication connection of Step S110. This connection request includes the information (WSC IE) indicating that the communication terminal 101 supports the WPS. The control circuit 111 causes the communicator 121 to receive a connection response (association response) transmitted from the AP. When the connection response includes information indicating a success, the connection is completed. The network identifier and the MAC address used in the communication connection of Step S110 are acquired through the scanning in Step S101.

The AP that is the target of the processing in Steps after Step S110 is the AP that has completed the connection with the communication terminal 101 in Step S110. After the AP in the state of being able to execute the setup processing is found in Step S109, an operation in which a user selects the WPS method on the UI of the communication terminal 101 is unnecessary. In a case in which the WPS method is the PBC, a user does not need to push the button of the communication terminal 101 after the AP in the state of being able to execute the setup processing is found in Step S109.

(Step S111)

After Step S110, the control circuit 111 executes the setup processing with the AP. The WPS method for executing the setup processing may be always fixed to one method. The WPS method may be set before Step S111 and the control circuit 111 may execute the setup processing on the basis of the method in Step S111. The control circuit 111 may select a method based on the value of the device password ID and may execute the setup processing on the basis of the selected method. The device password ID is a value in the WSC IE included in the beacon received from the AP or the probe response received from the AP.

For example, when the device password ID received from the AP indicates the PBC, the control circuit 111 executes the setup processing on the basis of the PBC. When the device password ID received from the AP indicates the PIN, the control circuit 111 executes the setup processing on the basis of the PIN and displays a PIN code on a display unit. When the device password ID received from the AP indicates the NFC, the control circuit 111 executes the setup processing on the basis of the NFC and urges a user to perform touching by executing processing such as displaying a message on a display unit.

When the setup processing is normally completed, the WPS authentication information is transmitted from the AP to the communication terminal 101. The control circuit 111 causes the communicator 121 to receive the WPS authentication information from the second AP.

(Step S112)

After Step S111, the control circuit 111 stores the WPS authentication information received from the AP on the memory 131. Accordingly, after the setup processing is executed, the control circuit 111 stores the authentication information received from the second AP on the memory 131. The memory 131 may store the WPS authentication information of a plurality of APs. When storing the WPS authentication information received from the AP on the memory 131, the control circuit 111 does not need to delete the other WPS authentication information already stored on the memory 131.

(Step S113)

After Step S112, the control circuit 111 cuts off the connection with the AP to which the control circuit 111 has connected in Step S110. The connection may be cut off as a result of the fact that the AP starts processing for cutting off the connection. In a case in which the AP does not cut off the connection even when a predetermined period of time has passed following the completion of the setup processing, the communication terminal 101 may cut off the communication. Cutting off the connection is executed by transmitting a deauthentication or a disassociation.

(Step S114)

After Step S113, the control circuit 111 executes the communication connection and the authentication processing with the AP. The control circuit 111 causes the communicator 121 to wirelessly connect to the AP in the communication connection by using the network identifier of the WPS authentication information and the MAC address of the WPS authentication information stored on the memory 131 in Step S112. After the connection is completed, the control circuit 111 executes the authentication processing with the AP on the basis of, for example, the WPA2-PSK by using the passphrase of the WPS authentication information or the PSK of the WPS authentication information stored on the memory 131 in Step S112.

The control circuit 111 causes the communicator 121 to transmit a connection request (association request) to the AP in the communication connection of Step S114. This connection request does not include the information (WSC IE) indicating that the communication terminal 101 supports the WPS. The control circuit 111 causes the communicator 121 to receive a connection response (association response) transmitted from the AP. When the connection response includes information indicating a success, the connection is completed. The network identifier and the MAC address used in the communication connection of Step S114 may be acquired through the scanning executed after Step S113. The scanning is not shown in FIG. 2. After Step S114, the processing in Step S115 is executed.

Regardless of whether or not a user performs a new operation after the second mode is selected in Step S1081, the communication terminal 101 wirelessly connects to the second AP in Step S110. Regardless of whether or not the WPS authentication information is stored on the memory 131, the communication terminal 101 wirelessly connects to the second AP in Step S110. The control circuit 111 causes the communicator 121 to transmit information necessary for the authentication to the second AP in the authentication processing of Step S114. The control circuit 111 causes the communicator 121 to receive information necessary for the authentication from the second AP in the authentication processing of Step S114.

The communication terminal 101 connects to the AP in Step S110 in order to execute the setup processing. The connection request transmitted in Step S110 includes the information (WSC IE) indicating that the communication terminal 101 supports the WPS. Therefore, the communication terminal 101 and the AP perform communication for the setup processing in Step S111. The state of encryption in the communication of the setup processing is different from that in the communication of Step S114 and Step S115. In the specifications of IEEE802.11, when the communication connection established in Step S110 continues, encryption using the passphrase or the PSK acquired through the setup processing is not performed. In order to execute the authentication processing and perform the data communication, the connection is cut off in Step S113 and the communication terminal 101 connects to the AP again in Step S114. The connection request transmitted in Step S114 does not include the information (WSC IE) indicating that the communication terminal 101 supports the WPS. Therefore, the communication terminal 101 and the AP perform communication for the authentication processing in Step S114 and perform the data communication in Step S115.

The control circuit 111 may update the WPS authentication information stored on the memory 131 with the WPS authentication information received from the second AP each time the setup processing is executed. For example, the memory 131 stores the WPS authentication information of only one AP. In Step S112, the control circuit 111 deletes the WPS authentication information stored on the memory 131 and stores the WPS authentication information acquired through the processing in Step S111 on the memory 131. In this way, the WPS authentication information stored on the memory 131 is updated with the new WPS authentication information.

The processing in Step S1051 may be executed between the processing in Step S106 and the processing in Step S107. The processing in Step S1081 may be executed between the processing in Step S109 and the processing in Step S110.

The authentication processing may fail due to the reason that the passphrases or the PSKs stored by the communication terminal and the AP are different from each other or due to other reasons. In such a case, the processing may be completed without performing the data communication in Step S115. Alternatively, the processing in Step S101 may be executed without performing the data communication in Step S115. In a case in which the authentication processing fails and the processing in Step S101 is executed, the authentication processing is tried again and the authentication processing fails again. In a case in which the authentication processing repeatedly fails, the processing may be completed when the authentication processing fails a predetermined number of times.

When the control circuit 111 determines that the AP has been found in Step S102, the processing in Step S108 may be executed. When the control circuit 111 determines that the AP in the WPS support has not been found in Step S108, the processing in Step S105 may be executed.

Figure 3:
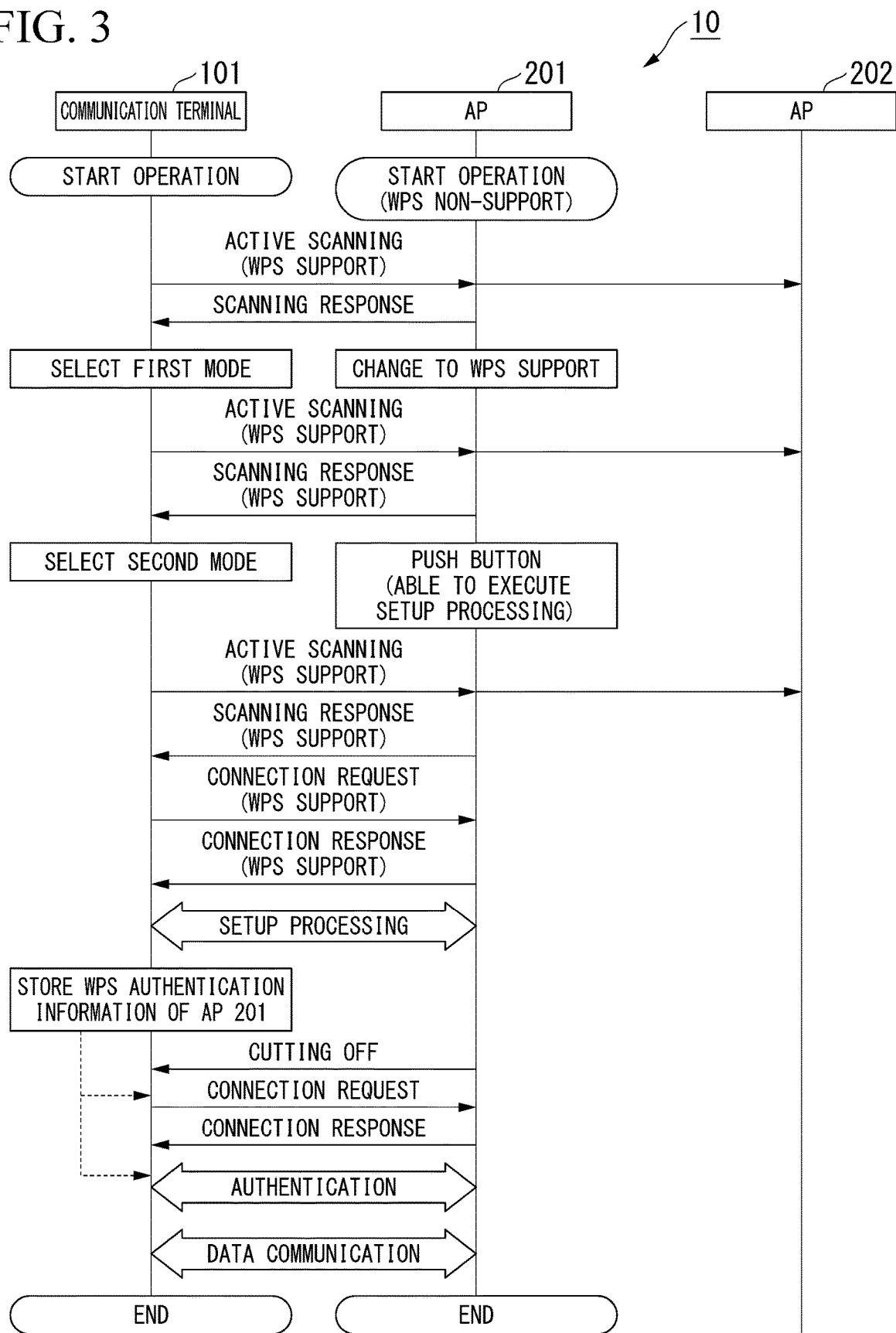
FIG. 3 is a diagram showing a procedure of an operation of each terminal in the first embodiment of the present invention.
Figure 4:
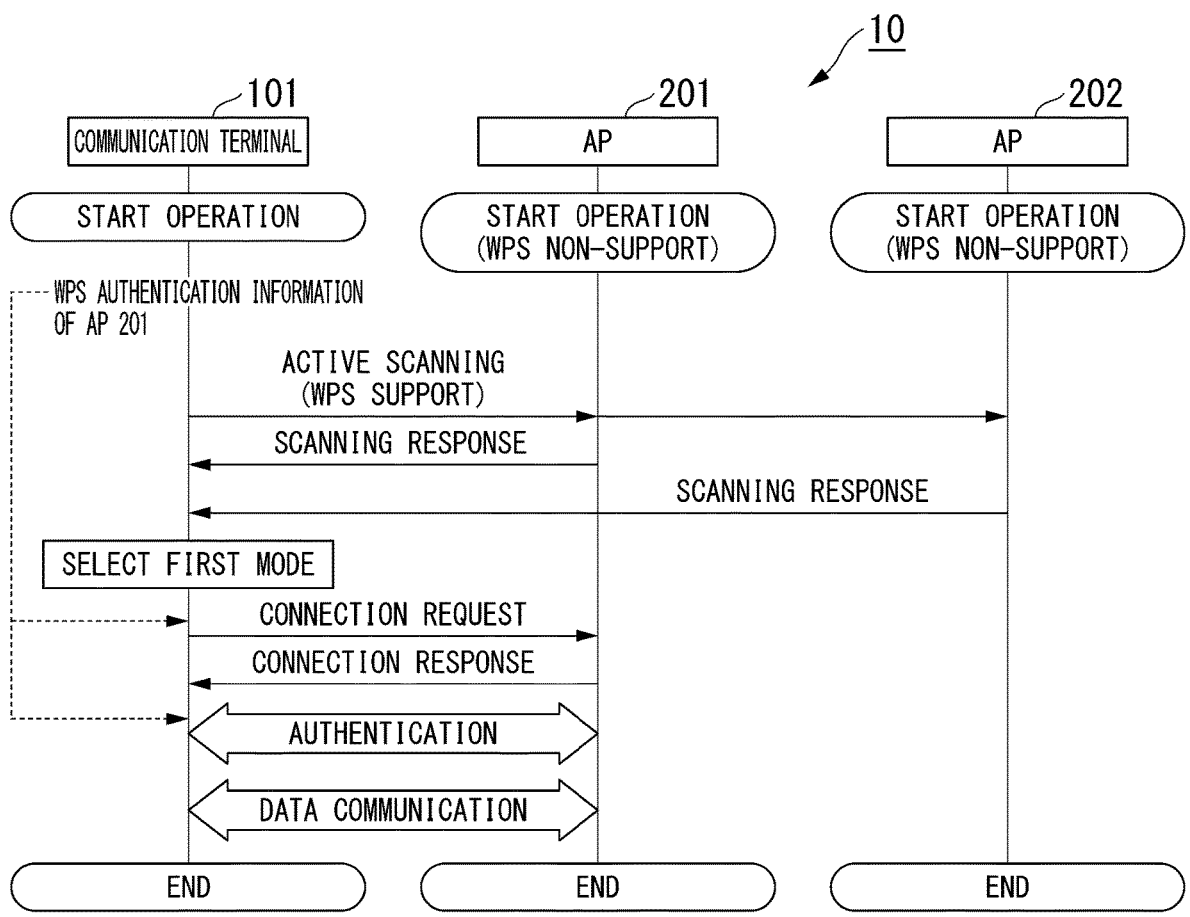
FIG. 4 is a diagram showing a procedure of an operation of each terminal in the first embodiment of the present invention.
Figure 5:
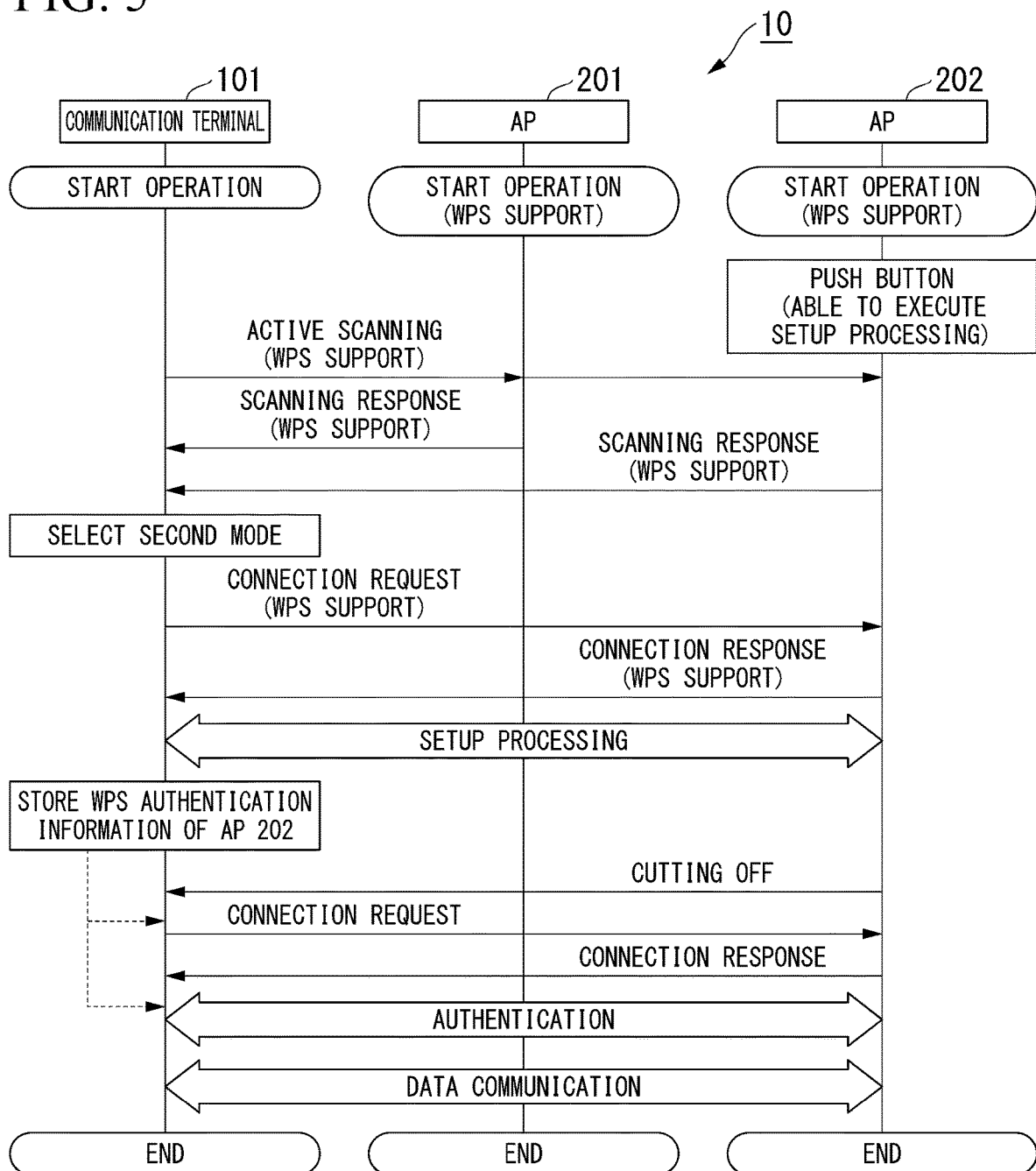
FIG. 5 is a diagram showing a procedure of an operation of each terminal in the first embodiment of the present invention.

An example of an operation of each terminal in the first embodiment will be described. FIGS. 3 to 5 show a procedure of an operation of each terminal included in a wireless communication system 10. The wireless communication system 10 includes the communication terminal 101 and two APs (AP 201 and AP 202). The two APs become the WPS support after starting operations in the WPS non-support first.

FIG. 3 shows an operation of each of the communication terminal 101 and the AP 201 in a case in which the communication terminal 101 and the AP 201 perform the data communication for the first time. The AP 201 has been set in the state (WPS non-support) of being unable to execute the setup processing on the basis of a user's operation.

The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). Since the scanning response transmitted from the AP 201 does not include the information indicating that the AP 201 supports the WPS, the communication terminal 101 finds the AP in the WPS non-support (Step S105).

The communication terminal 101 selects the first mode (Step S1051). The found AP 201 is not the last AP to have executed the connection and the authentication with the communication terminal 101 (Step S106). Therefore, the communication connection is not executed.

A user sets the AP 201 in the state (WPS support) of being able to execute the setup processing.

The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). The scanning response transmitted from the AP 201 includes the information indicating that the AP 201 supports the WPS. Since the scanning response not including the information indicating that the AP 201 supports the WPS is not received, the communication terminal 101 does not find the AP in the WPS non-support (Step S105). Since the scanning response including the information indicating that the AP supports the WPS is received, the communication terminal 101 finds the AP in the WPS support (Step S108).

The communication terminal 101 selects the second mode (Step S1081). At this time point, pushing a push button, inputting a PIN code, or the like has not been performed in the AP 201. Therefore, the AP 201 has not started the operation based on the WPS method and is unable to execute the setup processing (Step S109).

Thereafter, a user pushes the button in the AP 201 and the AP 201 is then able to execute the setup processing using the PBC method. The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). The scanning response transmitted from the AP 201 includes the information indicating that the AP 201 supports the WPS. Therefore, the communication terminal 101 finds the AP in the WPS support (Step S105 and Step S108).

The communication terminal 101 selects the second mode (Step S1081). The AP 201 is able to execute the setup processing (Step S109). The communication terminal 101 transmits a connection request including the information indicating that the communication terminal 101 supports the WPS to the AP 201. The communication terminal 101 completes the connection by receiving a connection response from the AP 201 (Step S110).

The communication terminal 101 and the AP 201 execute the setup processing on the basis of the PBC method. In the setup processing, the WPS authentication information is transmitted from the AP 201 to the communication terminal 101 (Step S111). The communication terminal 101 stores the WPS authentication information of the AP 201 on the memory 131 (Step S112). The AP 201 cuts off the connection with the communication terminal 101 (Step S113).

The communication terminal 101 transmits a connection request to the AP 201 on the basis of the network identifier of the WPS authentication information stored on the memory 131 and the MAC address of the WPS authentication information stored on the memory 131. The connection request does not include the information indicating that the communication terminal 101 supports the WPS. The communication terminal 101 completes the connection by receiving a connection response from the AP 201. The communication terminal 101 executes the authentication processing with the AP 201 on the basis of the WPA2-PSK by using the passphrase of the WPS authentication information or the PSK of the WPS authentication information (Step S114). After the authentication is completed, the communication terminal 101 and the AP 201 perform the data communication (Step S115).

FIG. 4 shows an operation of each of the communication terminal 101 and two APs in the WPS non-support. For example, FIG. 4 shows an operation of each terminal after the communication terminal 101 and the AP 201 complete the data communication in FIG. 3. After the power source is turned off in at least one of the communication terminal 101 and the AP 201, the power source is turned on in order for the communication terminal 101 and the AP 201 to perform the data communication. At this time, the AP 201 has been set in the state (WPS non-support) of being unable to execute the setup processing on the basis of a user's operation. The power source of the AP 202 is also turned on and the AP 202 has been set in the state (WPS non-support) of being unable to execute the setup processing on the basis of a user's operation.

The communication terminal 101 executes the connection and the authentication with the AP 201 through the operation shown in FIG. 3 before executing the operation shown in FIG. 4. The communication terminal 101 stores the WPS authentication information of the AP 201 on the memory 131.

The communication terminal 101 executes the active scanning by transmitting a probe request by broadcasting (Step S101). The probe request includes the information indicating that the communication terminal 101 supports the WPS. The communication terminal 101 finds the AP 201 and the AP 202 by receiving a scanning response transmitted from each of the AP 201 and the AP 202 (Step S102). Since the scanning response transmitted from each of the AP 201 and the AP 202 does not include the information indicating that the AP supports the WPS, the communication terminal 101 finds the APs in the WPS non-support (Step S105).

The communication terminal 101 selects the first mode (Step S1051). The AP 201 is the last AP to have executed the connection and the authentication with the communication terminal 101 and the APs in the WPS non-support include the AP 201 (Step S106). Therefore, the communication terminal 101 transmits a connection request to the AP 201 on the basis of the network identifier of the WPS authentication information stored on the memory 131 and the MAC address of the WPS authentication information stored on the memory 131. The connection request does not include the information indicating that the communication terminal 101 supports the WPS. The communication terminal 101 completes the connection by receiving a connection response from the AP 201. The communication terminal 101 executes the authentication processing with the AP 201 on the basis of the WPA2-PSK by using the passphrase of the WPS authentication information or the PSK of the WPS authentication information (Step S107). After the authentication is completed, the communication terminal 101 and the AP 201 perform the data communication (Step S115).

FIG. 5 shows an operation of each of the communication terminal 101 and two APs in the WPS support. For example, FIG. 5 shows an operation of each terminal after the communication terminal 101 and the AP 201 complete the data communication in FIG. 4. After the power source is turned off in at least one of the communication terminal 101 and the AP 201, the power source is turned on in order for the communication terminal 101 and the AP 202 to perform the data communication. At this time, the AP 202 has been set in the state (WPS support) of being able to execute the setup processing on the basis of a user's operation. The power source of the AP 201 is also turned on and the AP 201 has been set in the state (WPS support) of being able to execute the setup processing on the basis of a user's operation.

The communication terminal 101 executes the connection and the authentication with the AP 201 through the operation shown in FIG. 4 before executing the operation shown in FIG. 5. The communication terminal 101 stores the WPS authentication information of the AP 201 on the memory 131.

A user pushes the button in the AP 202 and the AP 202 is then able to execute the setup processing using the PBC method. The communication terminal 101 executes the active scanning by transmitting a probe request by broadcasting (Step S101). The probe request includes the information indicating that the communication terminal 101 supports the WPS. The communication terminal 101 finds the AP 201 and the AP 202 by receiving a scanning response transmitted from each of the AP 201 and the AP 202 (Step S102). The scanning response transmitted from the AP 201 includes the information indicating that the AP 201 supports the WPS. The scanning response transmitted from the AP 202 includes the information indicating that the AP 202 supports the WPS. Therefore, the communication terminal 101 finds the APs in the WPS support (Step S105 and Step S108).

The communication terminal 101 selects the second mode (Step S1081). Only the AP 202 is able to execute the setup processing (Step S109). The communication terminal 101 transmits a connection request including the information indicating that the communication terminal 101 supports the WPS to the AP 202. The communication terminal 101 completes the connection by receiving a connection response from the AP 202 (Step S110).

The communication terminal 101 and the AP 202 execute the setup processing on the basis of the PBC method. In the setup processing, the WPS authentication information is transmitted from the AP 202 to the communication terminal 101(Step S111). The communication terminal 101 stores the WPS authentication information of the AP 202 on the memory 131 (Step S112). The AP 202 cuts off the connection with the communication terminal 101 (Step S113).

The communication terminal 101 transmits a connection request to the AP 202 on the basis of the network identifier of the WPS authentication information stored on the memory 131 and the MAC address of the WPS authentication information stored on the memory 131. The connection request does not include the information indicating that the communication terminal 101 supports the WPS. The communication terminal 101 completes the connection by receiving a connection response from the AP 202. The communication terminal 101 executes the authentication processing with the AP 202 on the basis of the WPA2-PSK by using the passphrase of the WPS authentication information or the PSK of the WPS authentication information (Step S114). After the authentication is completed, the communication terminal 101 and the AP 202 perform the data communication (Step S115).

In the operation shown in FIG. 5, the last AP 201 to have executed the connection and the authentication with the communication terminal 101 is present. Since the AP 201 is in the WPS support, the communication terminal 101 does not execute the automatic connection with the AP 201.

The wireless communication method according to each aspect of the present invention includes a first step, a second step, a third step, a fourth step, a fifth step, a sixth step, and a seventh step. The control circuit 111 detects one or more APs by executing scanning using the communicator 121 in the first step (Step S101). The control circuit 111 determines whether or not a first AP is included in the one or more APs detected through the scanning in the second step (Step S106). The control circuit 111 determines whether or not a second AP is included in the one or more APs detected through the scanning in the third step (Step S108). When the communicator 121 does not wirelessly connect to any of the one or more APs detected through the scanning, the control circuit 111 selects any one of a first mode and a second mode by executing selection processing in the fourth step (Step S1051 and Step S1081).

When the control circuit 111 selects the first mode in the selection processing and the first AP is not included in the one or more APs detected through the scanning, the control circuit 111 prevents the communicator 121 from wirelessly connecting to any of the one or more APs detected through the scanning. When the control circuit 111 selects the first mode in the selection processing and the first AP is included in the one or more APs detected through the scanning, the control circuit 111 causes the communicator 121 to wirelessly connect to the first AP on the basis of the authentication information of the first AP stored on the memory 131 and executes the authentication processing with the first AP on the basis of the authentication information of the first AP stored on the memory 131 without executing the setup processing in the fifth step (Step S107).

When the control circuit 111 selects the second mode in the selection processing, the control circuit 111 causes the communicator 121 to transmit setup information (WSC IE) to the second AP and causes the communicator 121 to start the setup processing with the second AP in the sixth step (Step S110 and Step S111) regardless of whether or not a user performs a new operation after the second mode is selected and regardless of whether or not the authentication information is stored on the memory 131. After the setup processing is executed, the control circuit 111 causes the communicator 121 to wirelessly connect to the second AP with which the setup processing has been executed and executes the authentication processing, on the basis of the authentication information received from the second AP by the communicator 121 in the setup processing, with the second AP with which the setup processing has been executed in the seventh step (Step S114).

The wireless communication method according to each aspect of the present invention has only to include processing corresponding to the above-described first to seventh steps.

In any one of a case in which only one AP is present and a case in which two or more APs are present, the communication terminal 101 that has selected the first mode connects to an AP through a similar procedure to that of the automatic connection and executes the authentication with the AP by using the WPS authentication information stored on the memory 131. In addition, in any of the above-described cases, the communication terminal 101 that has selected the second mode executes the setup processing without executing the automatic connection regardless of whether or not the WPS authentication information is stored on the memory 131. The communication terminal 101 that has selected the second mode connects to an AP and executes the authentication with the AP on the basis of the WPS authentication information acquired through the setup processing.

In the communication terminal 101 that has selected the first mode or the second mode, some of the operations performed by a user are omitted. For example, a user does not need to perform an operation related to switching between ON and OFF of the automatic connection, selection of the connecting method (WPS), selection of the WPS method, and the instruction for starting the PBC method. Therefore, a user's load of operations related to the connection and the authentication can be reduced. A user needs to perform an operation related to the instruction for starting the PBC method on the AP but does not need to perform the operation on the communication terminal 101.

Second Embodiment

Figure 6:
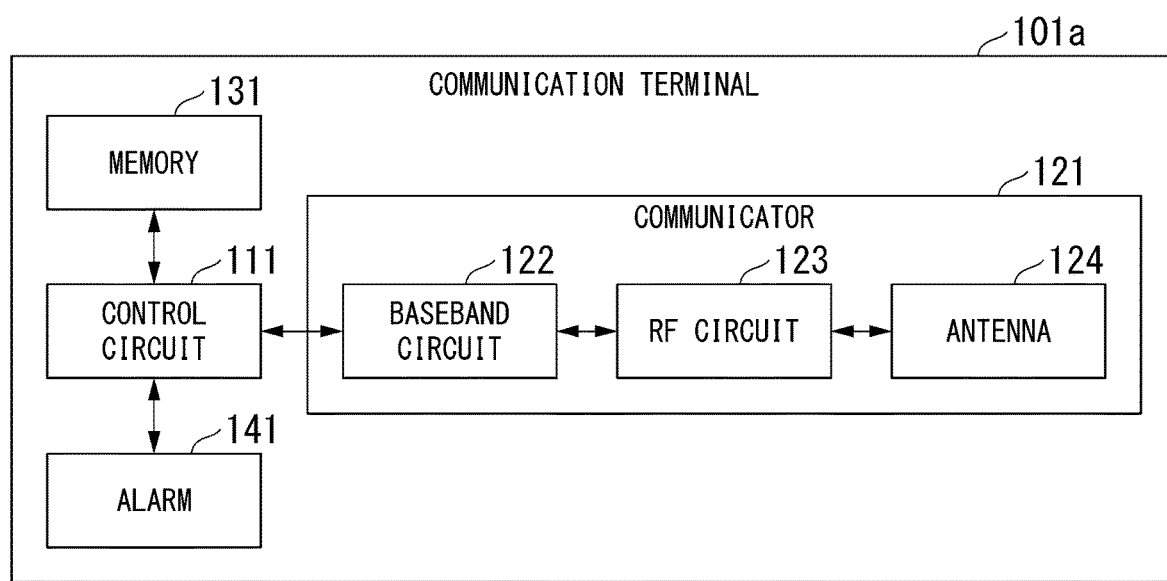
FIG. 6 is a block diagram showing a configuration of a communication terminal according to a second embodiment of the present invention.

FIG. 6 shows a configuration of a communication terminal 101a according to a second embodiment of the present invention. The same parts as those shown in FIG. 1 will not be described.

The communication terminal 101a includes an alarm 141 (alarm circuit) in addition to the configuration shown in FIG. 1. When the communicator 121 receives information not including the setup information (WSC IE) from at least one of the one or more APs by executing the scanning and the communicator 121 receives the setup information from at least one of the one or more APs by executing the scanning, the control circuit 111 notifies a user of the occurrence of an error by using the alarm 141 without selecting any of the first mode and the second mode in the selection processing.

The alarm 141 has only to be a member capable of notifying a user that an error has occurred. For example, the alarm 141 may be a member (liquid crystal display or the like) capable of displaying a character, a figure, a table, a pattern, or the like. In such a case, the alarm 141 reports an error by displaying a character, a figure, a table, a pattern, or the like that shows the error. The alarm 141 may be a member (LED or the like) including a light source that is capable of turning on light of a certain color or is capable of blinking light. In such a case, the alarm 141 reports an error by turning on light of a certain color or blinking light in a certain pattern. The alarm 141 may be a member (speaker or the like) capable of generating a sound. In such a case, the alarm 141 reports an error by generating a sound. When both the AP in the WPS support and the AP in the WPS non-support have been found, the alarm 141 reports an error.

Figure 7:
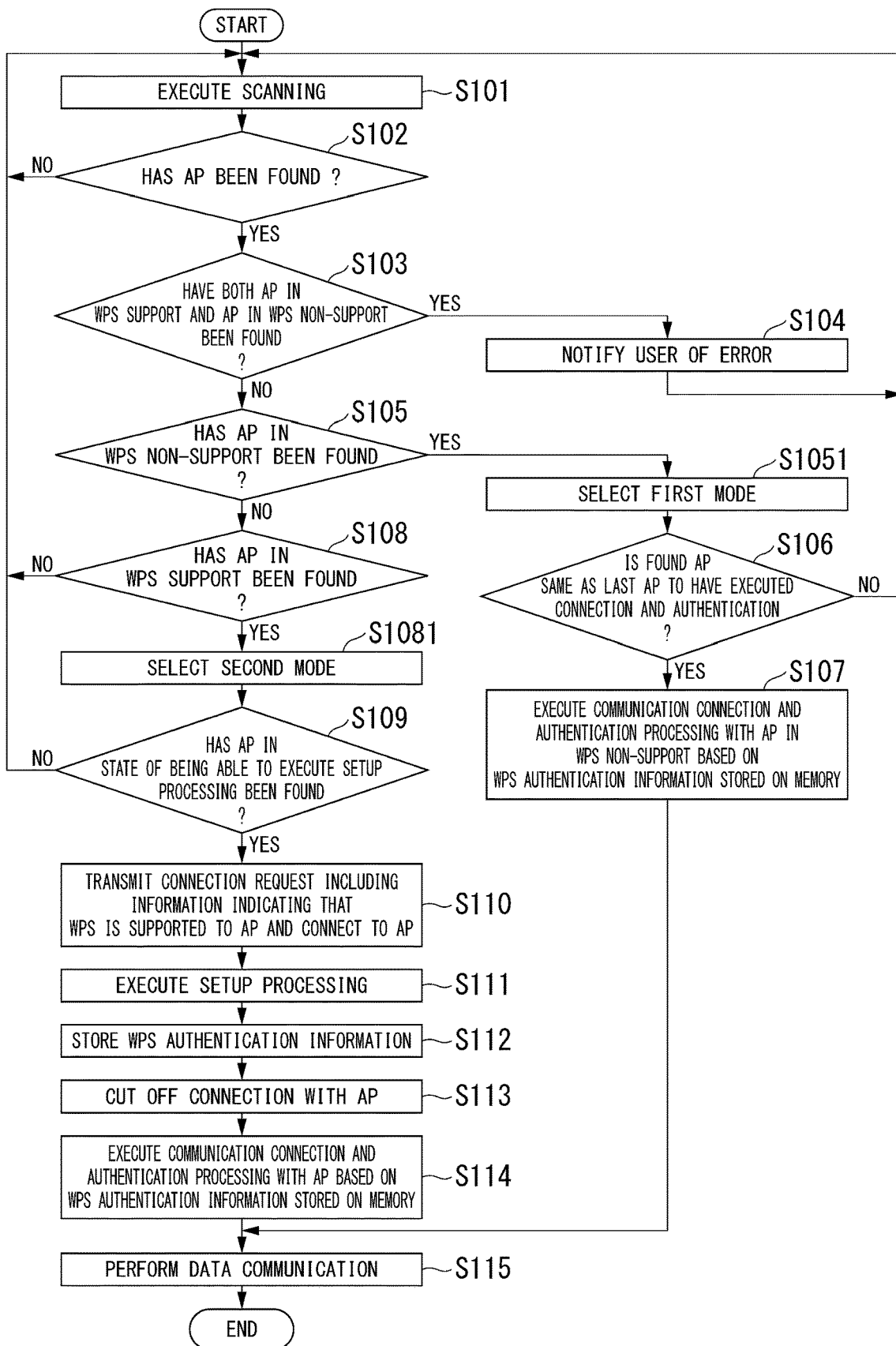
FIG. 7 is a flow chart showing a procedure of an operation of the communication terminal according to the second embodiment of the present invention.

An operation of the communication terminal 101a will be described. FIG. 7 shows a procedure of the operation of the communication terminal 101a. The same processing as that shown in FIG. 2 will not be described.

(Step S103)

When the control circuit 111 determines that the AP has been found in Step S102, the control circuit 111 determines whether or not both the AP in the WPS support and the AP in the WPS non-support have been found. When a beacon not including the WSC IE or a probe response not including the WSC IE is received from the AP, the control circuit 111 determines that the AP in the WPS non-support has been found. When the beacon or the probe response received from the AP includes the WSC IE, the control circuit 111 determines that the AP in the WPS support has been found. When the control circuit 111 determines that at least one of the AP in the WPS support and the AP in the WPS non-support has not been found in Step S103, the processing in Step S105 is executed.

(Step S104)

When the control circuit 111 determines that both the AP in the WPS support and the AP in the WPS non-support have been found in Step S103, the control circuit 111 notifies a user of an error by using the alarm 141. In this case, the first mode and the second mode are not selected. After Step S104, the processing in Step S101 is executed.

After Step S104, the processing may be completed. The processing may be completed when both the AP in the WPS support and the AP in the WPS non-support are found a predetermined number of times.

Figure 8:
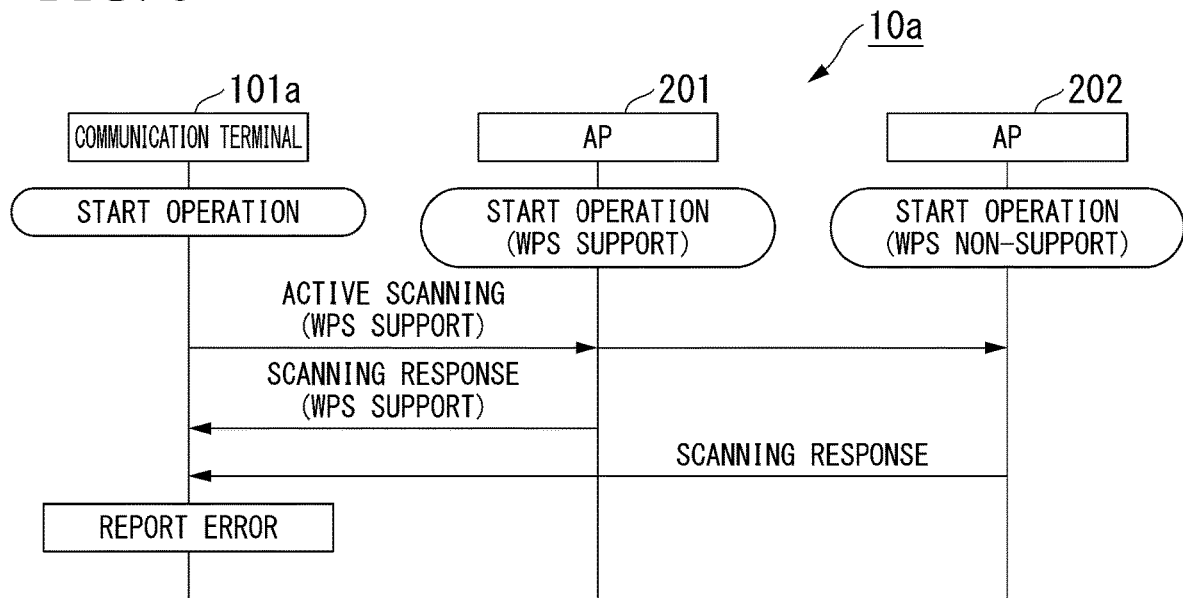
FIG. 8 is a diagram showing a procedure of an operation of each terminal in the second embodiment of the present invention.

An example of an operation of each terminal in the second embodiment will be described. FIG. 8 shows a procedure of an operation of each terminal included in a wireless communication system 10a. The wireless communication system 10a includes the communication terminal 101a and two APs (AP 201 and AP 202). FIG. 8 shows an operation of each of the communication terminal 101a, the AP 201 in the WPS support, and the AP 202 in the WPS non-support. The AP 201 has been set in the state (WPS support) of being able to execute the setup processing on the basis of a user's operation. The AP 202 has been set in the state (WPS non-support) of being unable to execute the setup processing on the basis of a user's operation.

The communication terminal 101a executes the active scanning by transmitting a probe request by broadcasting (Step S101). The probe request includes the information indicating that the communication terminal 101a supports the WPS. The communication terminal 101a finds the AP 201 and the AP 202 by receiving a scanning response transmitted from each of the AP 201 and the AP 202 (Step S102). The scanning response transmitted from the AP 201 includes the information indicating that the AP 201 supports the WPS. The scanning response transmitted from the AP 202 does not include the information indicating that the AP 202 supports the WPS. Therefore, the communication terminal 101a finds both the AP in the WPS support and the AP in the WPS non-support (Step S103).

The communication terminal 101a informs a user of an error (Step S104). Thereafter, the communication terminal 101a executes the active scanning by broadcasting. This operation is not shown in FIG. 8.

When both the AP in the WPS support and the AP in the WPS non-support have been found, the automatic connection is not executed and the setup processing is not executed. Therefore, the communication terminal 101a is unlikely to connect to a wrong AR For example, the communication terminal 101a avoids executing the setup processing with an AP in the WPS support although the communication terminal 101a desires to execute the automatic connection with an AP in the WPS non-support. Alternatively, the communication terminal 101a avoids executing the automatic connection with an AP in the WPS non-support although the communication terminal 101a desires to execute the setup processing with an AP in the WPS support. Accordingly, a surplus operation for performing the connection again can be omitted. Therefore, a user's load of operations related to the connection and the authentication can be reduced.

Third Embodiment

Figure 9:
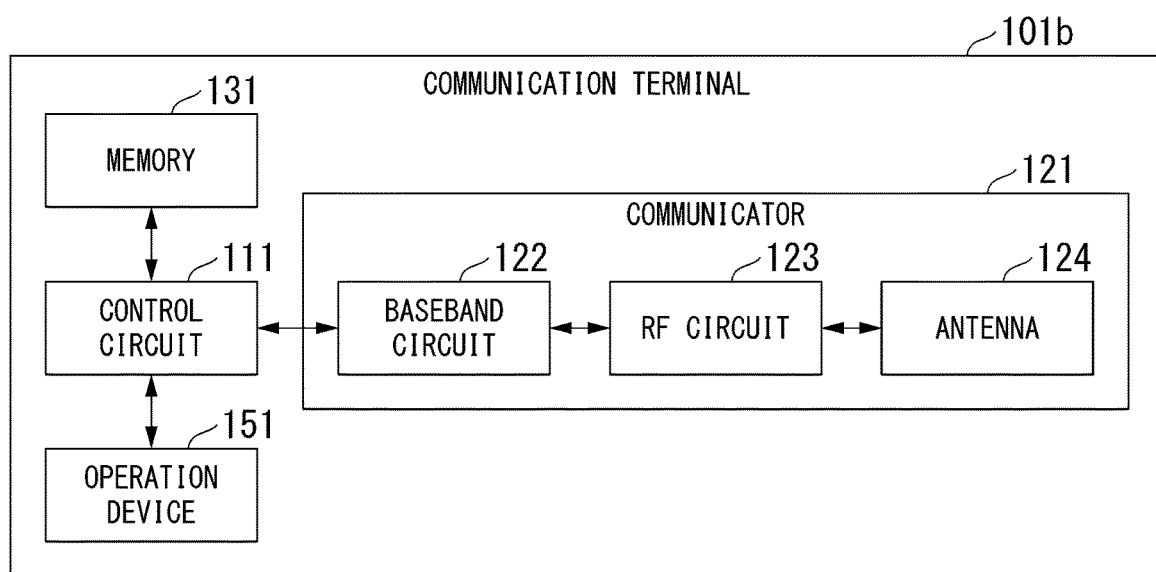
FIG. 9 is a block diagram showing a configuration of a communication terminal according to a third embodiment of the present invention.

FIG. 9 shows a configuration of a communication terminal 101b according to a third embodiment of the present invention. The same parts as those shown in FIG. 1 will not be described.

The communication terminal 101b includes an operation device 151 in addition to the configuration shown in FIG. 1. The operation device 151 accepts an operation of selecting any one of the first mode and the second mode. When the operation device 151 accepts an operation of selecting the first mode, the control circuit 111 selects the first mode in the selection processing. When the operation device 151 accepts an operation of selecting the second mode, the control circuit 111 selects the second mode in the selection processing.

The operation device 151 is a user interface. The operation device 151 is a member for a user to select the operation mode. The operation device 151 is a member that enables alternative selection. When a user selects one of the two modes by operating the operation device 151, the other mode is automatically set in an unselected state. The operation device 151 may be a mode switch that realizes mechanically alternative selection. For example, the operation device 151 may be a toggle switch, a slide switch, or a rotary switch. The operation device 151 may be a member for inputting an instruction for alternatively selecting a predetermined item on a menu. For example, the menu is displayed on a display unit not shown in FIG. 9. Alternatively, the menu is output from a speaker not shown in FIG. 9 by a voice. For example, the operation device 151 may be a keyboard, a mouse, or a touch panel. The operation device 151 may be a microphone for inputting an instruction by inputting a voice. The operation device 151 may be a video input device (camera or the like) for inputting an instruction by using a visual line.

Even when the communication terminal 101b in a state in which the first mode has been selected finds an AP in the WPS support, the communication terminal 101b does not wait for the AP to become able to execute the setup processing and does not execute the setup processing with the AP. Even when the communication terminal 101b in a state in which the second mode has been selected finds the same AP as the last AP to have executed the connection and the authentication with the communication terminal 101b, the communication terminal 101b does not connect to the AP and does not execute the authentication processing with the AP.

Figure 10:
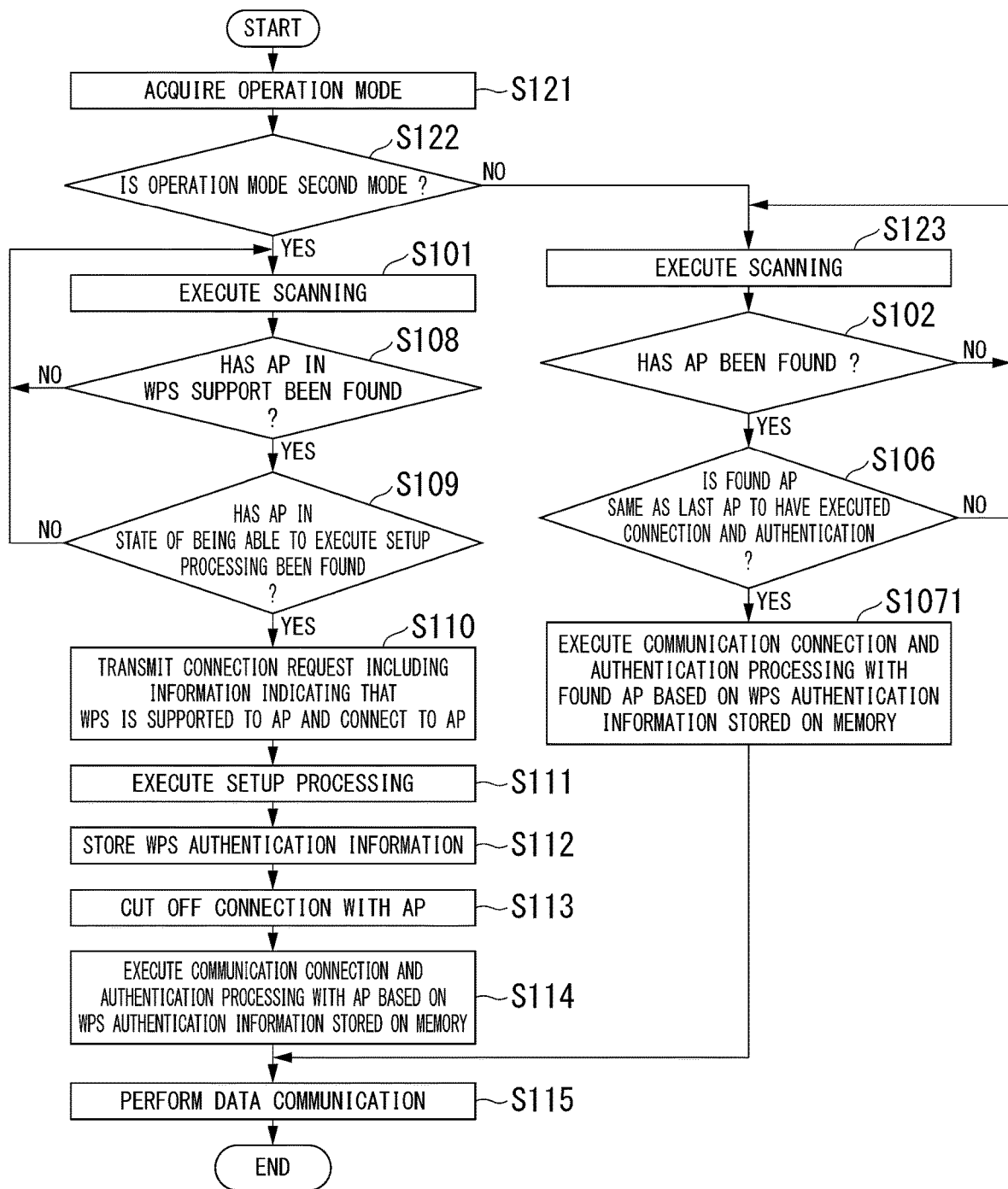
FIG. 10 is a flow chart showing a procedure of an operation of the communication terminal according to the third embodiment of the present invention.

An operation of the communication terminal 101b will be described. FIG. 10 shows a procedure of the operation of the communication terminal 101b. The same processing as that shown in FIG. 2 will not be described.
(Step S121)

The control circuit 111 acquires the operation mode that has been set in the communication terminal 101b by checking the state of the operation device 151. In a case in which the operation mode of the communication terminal 101b is set by the operation device 151, the control circuit 111 detects the operation mode that has been set in the communication terminal 101b.
(Step S122)

After Step S121, the control circuit 111 determines whether or not the operation mode acquired in Step S121 is the second mode. When the operation mode is the second mode, the control circuit 111 selects the second mode. When the operation mode is not the second mode, the control circuit 111 selects the first mode.

When the control circuit 111 determines that the operation mode is the second mode in Step S122, the processing in Step S101 is executed. After Step S101, the processing in Step S108 is executed. When the control circuit 111 determines that the AP in the WPS support has been found in Step S108, the processing in Step S109 is executed.
(Step S123)

When the control circuit 111 determines that the operation mode is the first mode in Step S122, the control circuit 111 executes the scanning by using the communicator 121. For example, the control circuit 111 executes the passive scanning. The control circuit 111 receives a beacon from the AP in the passive scanning. Alternatively, the control circuit 111 executes the active scanning The control circuit 111 transmits a probe request not including the information (WSC IE) indicating that the communication terminal 101b supports the WPS by broadcasting. For example, the scanning is executed for a predetermined period of time.

After Step S123, the processing in Step S102 is executed. When the control circuit 111 determines that the AP has not been found in Step S102, the processing in Step S123 is executed. When the control circuit 111 determines that the AP has been found in Step S102, the processing in Step S106 is executed. When the control circuit 111 determines that the AP found through the scanning is not the same as the last AP to have executed the connection and the authentication with the communication terminal 101b in Step S106, the processing in Step S123 is executed.
(Step S1071)

When the control circuit 111 determines that the AP found through the scanning is the same as the last AP to have executed the connection and the authentication with the communication terminal 101b in Step S106, the control circuit 111 executes the communication connection and the authentication processing with the AP. It does not matter whether the state of the AP is the WPS support or the WPS non-support. The control circuit 111 causes the communicator 121 to wirelessly connect to the AP in the communication connection by using the network identifier of the WPS authentication information and the MAC address of the WPS authentication information stored on the memory 131. After the connection is completed, the control circuit 111 executes the authentication processing with the AP on the basis of, for example, the WPA2-PSK by using the passphrase of the WPS authentication information or the PSK of the WPS authentication information stored on the memory 131. After Step S1071, the processing in Step S115 is executed.

When the control circuit 111 determines that the AP has not been found in Step S102, the processing in Step S121 may be executed. When the control circuit 111 determines that the AP found through the scanning is not the same as the last AP to have executed the connection and the authentication with the communication terminal 101b in Step S106, the processing in Step S121 may be executed. When the control circuit 111 determines that the AP found through the scanning is not the same as the last AP to have executed the connection and the authentication with the communication terminal 101b in Step S106, the control circuit 111 may cause the display unit to display information that urges a user to set the operation mode to the second mode.

When the control circuit 111 determines that the AP in the WPS support has not been found in Step S108, the processing in Step S121 may be executed. When the control circuit 111 determines that the AP in the state of being able to execute the setup processing has not been found in Step S109, the processing in Step S121 may be executed.

An example of an operation of each terminal in the third embodiment will be described. FIGS. 11 to 15 show a procedure of an operation of each terminal included in a wireless communication system 10b. The wireless communication system 10b includes the communication terminal 101b and two APs (AP 201 and AP 202). The differences from the operations shown in FIGS. 3 to 5 will be described.

Figure 11:
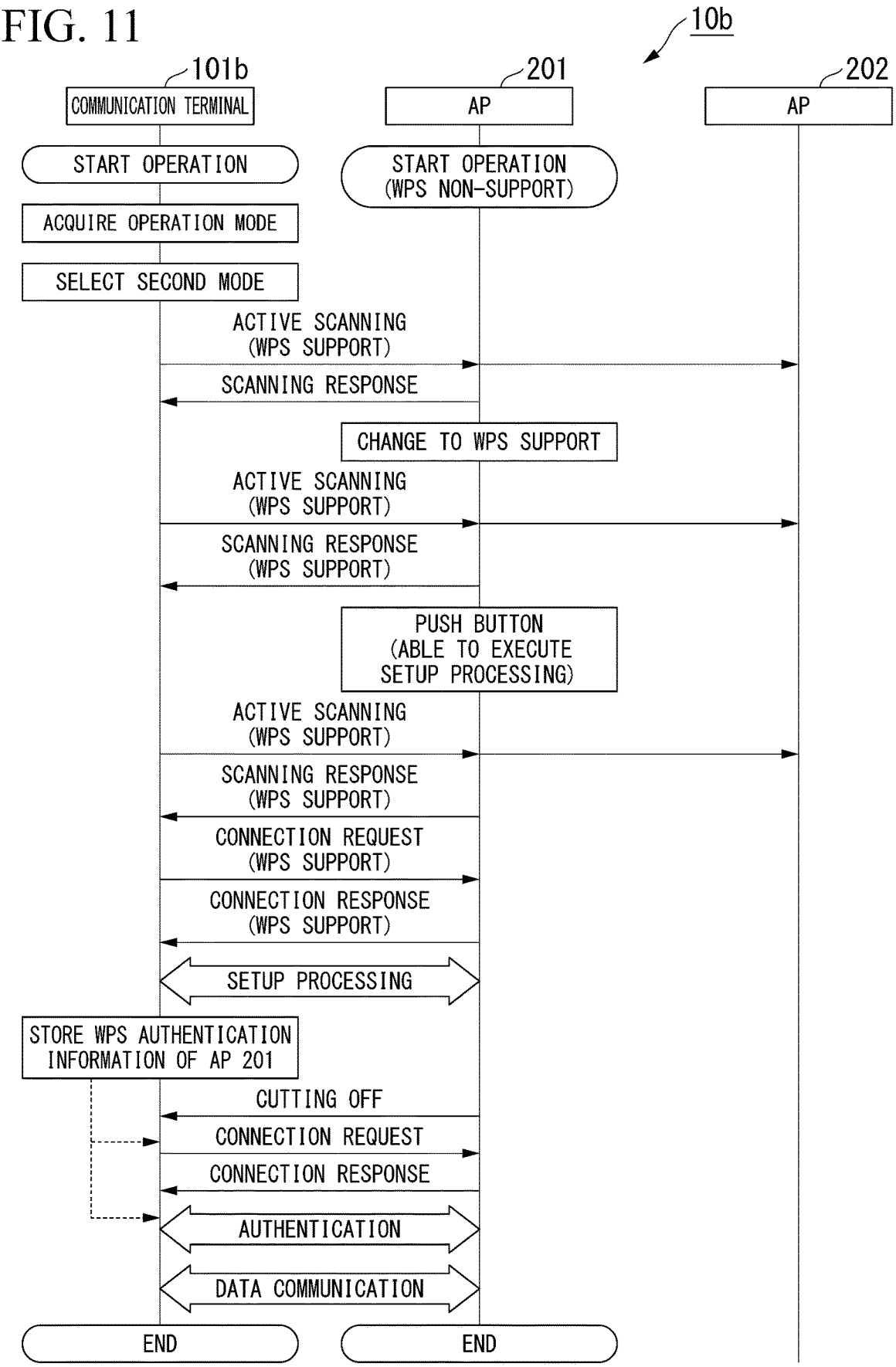
FIG. 11 is a diagram showing a procedure of an operation of each terminal in the third embodiment of the present invention.

FIG. 11 shows an operation of each of the communication terminal 101b in which the second mode has been set as the operation mode and the AP 201 in the WPS support. The state of the AP 201 becomes the WPS support after the AP 201 starts the operation in the WPS non-support first. The AP 201 has been set in the state (WPS non-support) of being unable to execute the setup processing on the basis of a user's operation.

The communication terminal 101b acquires the operation mode (Step S121). Since the operation mode is the second mode, the communication terminal 101b selects the second mode (Step S122).

The communication terminal 101b executes the active scanning by transmitting a probe request by broadcasting (Step S101). The probe request includes the information indicating that the communication terminal 101b supports the WPS. The communication terminal 101b finds the AP 201 by receiving a scanning response transmitted from the AP 201. Since the scanning response transmitted from the AP 201 does not include the information indicating that the AP 201 supports the WPS, the communication terminal 101b is unable to find the AP in the WPS support (Step S108). Therefore, the communication terminal 101b does not execute the setup processing.

A user sets the AP 201 in the state (WPS support) of being able to execute the setup processing.

The communication terminal 101b executes the active scanning by transmitting a probe request by broadcasting (Step S101). The probe request includes the information indicating that the communication terminal 101b supports the WPS. The communication terminal 101b finds the AP 201 by receiving a scanning response transmitted from the AP 201. The scanning response transmitted from the AP 201 includes the information indicating that the AP 201 supports the WPS. Since the scanning response including the information indicating that the AP supports the WPS is received, the communication terminal 101b finds the AP in the WPS support (Step S108).

At this time point, pushing a push button, inputting a PIN code, or the like has not been performed in the AP 201. Therefore, the AP 201 has not started the operation based on the WPS method and is unable to execute the setup processing (Step S109).

Thereafter, a user pushes the button in the AP 201 and the AP 201 is then able to execute the setup processing using the PBC method. The communication terminal 101b executes the active scanning by transmitting a probe request by broadcasting (Step S101). The probe request includes the information indicating that the communication terminal 101b supports the WPS. The communication terminal 101b finds the AP 201 by receiving a scanning response transmitted from the AP 201. The scanning response transmitted from the AP 201 includes the information indicating that the AP 201 supports the WPS. Therefore, the communication terminal 101b finds the AP in the WPS support (Step S108). The AP 201 is able to execute the setup processing (Step S109). Thereafter, the processing similar to that shown in FIG. 3 is executed.

Figure 12:
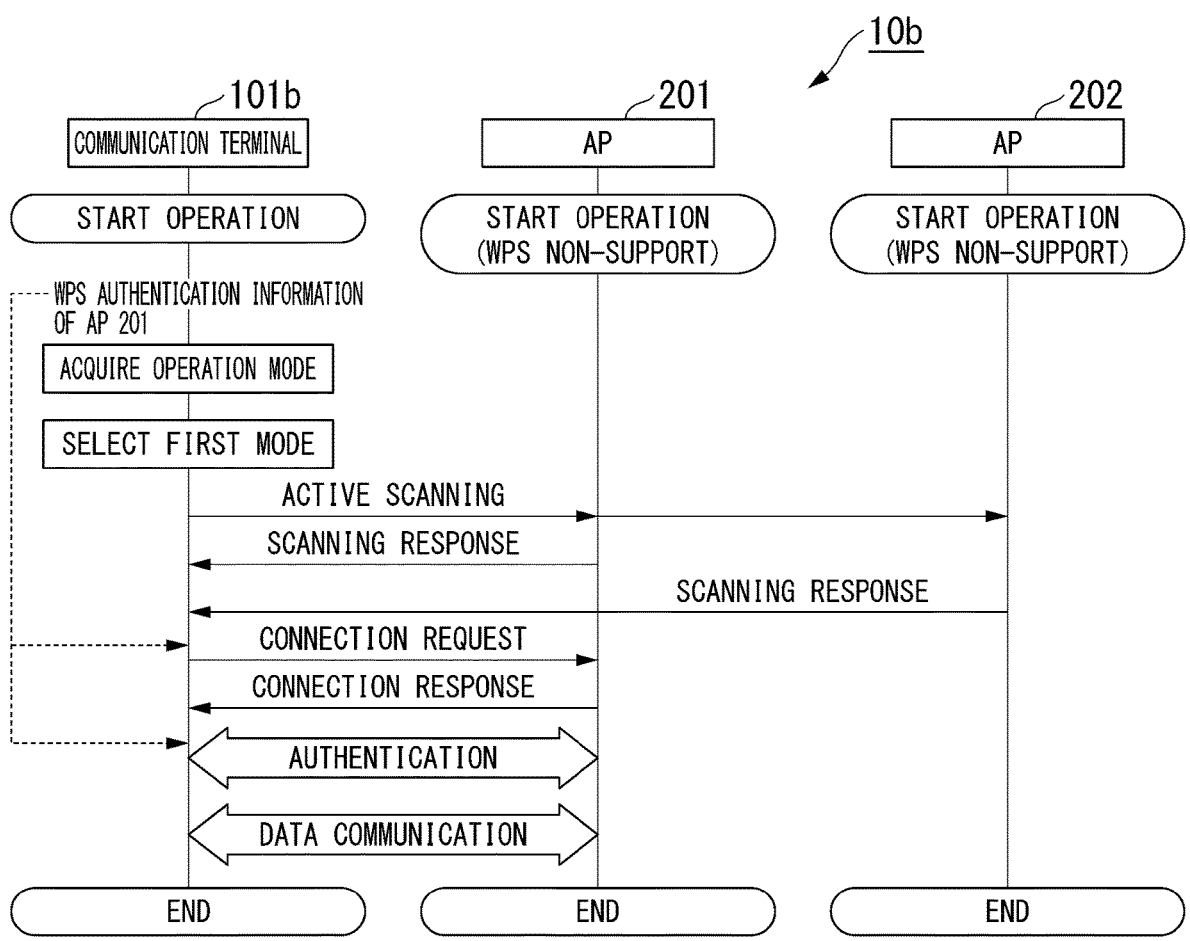
FIG. 12 is a diagram showing a procedure of an operation of each terminal in the third embodiment of the present invention.

FIG. 12 shows an operation of each of the communication terminal 101b in which the first mode has been set as the operation mode and two APs in the WPS non-support. For example, FIG. 12 shows an operation of each terminal after the communication terminal 101b and the AP 201 complete the data communication in FIG. 11. The AP 201 and the AP 202 have been set in the state (WPS non-support) of being unable to execute the setup processing on the basis of a user's operation.

The communication terminal 101b has already executed the connection and the authentication with the AP 201 by executing the operation shown in FIG. 11 before executing the operation shown in FIG. 12. The communication terminal 101b stores the WPS authentication information of the AP 201 on the memory 131. The communication terminal 101b acquires the operation mode (Step S121). Since the operation mode is the first mode, the communication terminal 101b selects the first mode (Step S122).

The communication terminal 101b executes the active scanning by transmitting a probe request by broadcasting (Step S123). The probe request does not include the information indicating that the communication terminal 101b supports the WPS. The communication terminal 101b finds the AP 201 and the AP 202 by receiving a scanning response transmitted from each of the AP 201 and the AP 202 (Step S102). The AP 201 is the last AP to have executed the connection and the authentication with the communication terminal 101*b* and the found APs include the AP 201 (Step S106). Therefore, the communication terminal 101*b* transmits a connection request to the AP 201 on the basis of the network identifier of the WPS authentication information stored on the memory 131 and the MAC address of the WPS authentication information stored on the memory 131. The connection request does not include the information indicating that the communication terminal 101*b* supports the WPS. The communication terminal 101*b* completes the connection by receiving a connection response from the AP 201. The communication terminal 101*b* executes the authentication processing with the AP 201 on the basis of the WPA2-PSK by using the passphrase of the WPS authentication information or the PSK of the WPS authentication information (Step S1071). Thereafter, the processing similar to that shown in FIG. 4 is executed.

Figure 13:
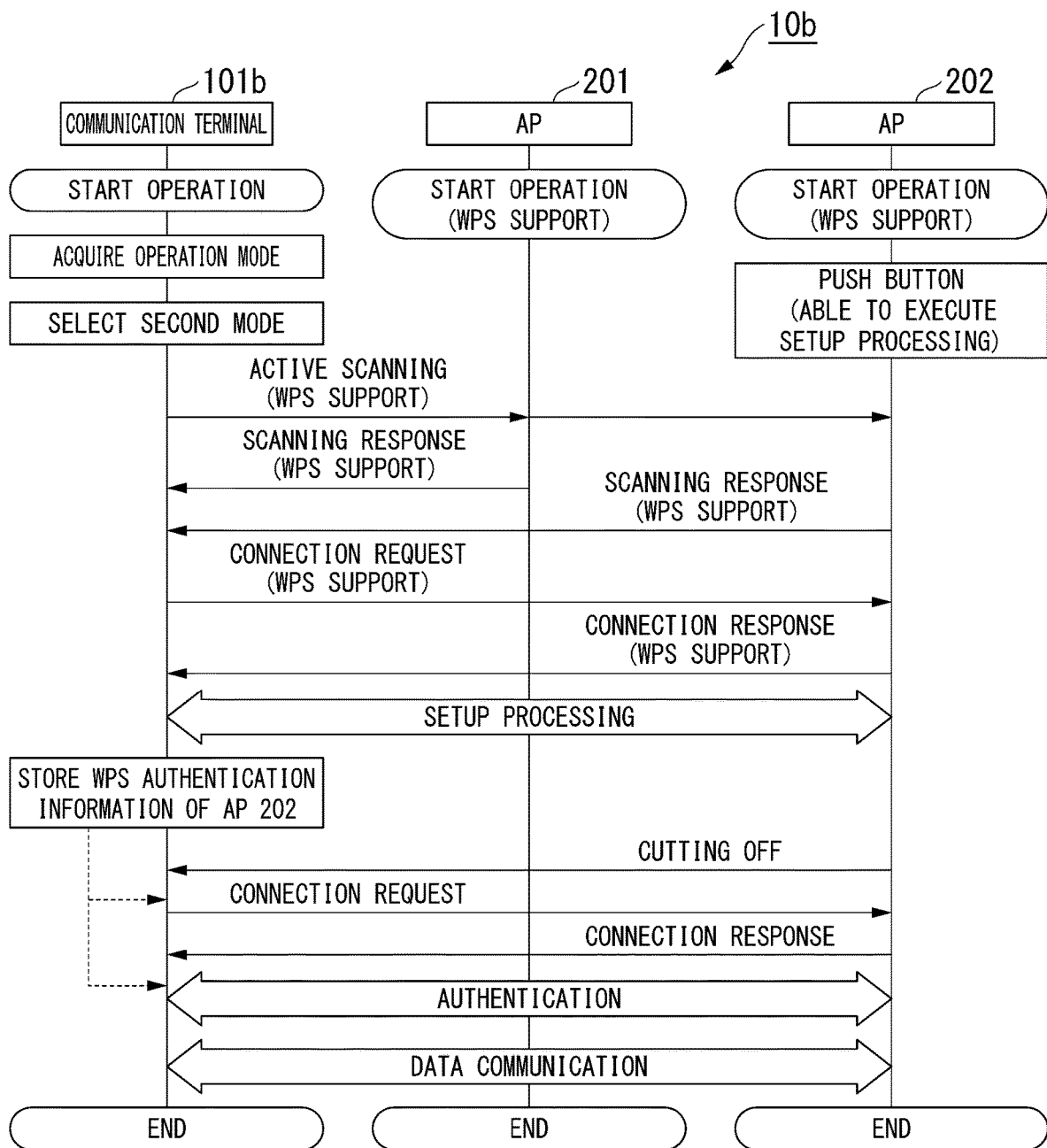
FIG. 13 is a diagram showing a procedure of an operation of each terminal in the third embodiment of the present invention.

FIG. 13 shows an operation of each of the communication terminal 101*b* in which the second mode has been set as the operation mode and two APs in the WPS support. For example, FIG. 13 shows an operation of each terminal after the communication terminal 101*b* and the AP 201 complete the data communication in FIG. 12. The AP 201 and the AP 202 have been set in the state (WPS support) of being able to execute the setup processing on the basis of a user's operation.

The communication terminal 101*b* executes the connection and the authentication with the AP 201 by executing the operation shown in FIG. 12 before executing the operation shown in FIG. 13. The communication terminal 101*b* stores the WPS authentication information of the AP 201 on the memory 131.

A user pushes the button in the AP 202 and the AP 202 is then able to execute the setup processing using the PBC method. The communication terminal 101*b* acquires the operation mode (Step S121). Since the operation mode is the second mode, the communication terminal 101*b* selects the second mode (Step S122).

The communication terminal 101*b* executes the active scanning by transmitting a probe request by broadcasting (Step S101). The probe request includes the information indicating that the communication terminal 101*b* supports the WPS. The communication terminal 101*b* finds the AP 201 and the AP 202 by receiving scanning responses transmitted from the AP 201 and the AP 202. The scanning response transmitted from the AP 201 includes the information indicating that the AP 201 supports the WPS. The scanning response transmitted from the AP 202 includes the information indicating that the AP 202 supports the WPS. Therefore, the communication terminal 101*b* finds the APs in the WPS support (Step S108). The AP 202 is able to execute the setup processing (Step S109). Thereafter, the processing similar to that shown in FIG. 5 is executed.

Figure 14:
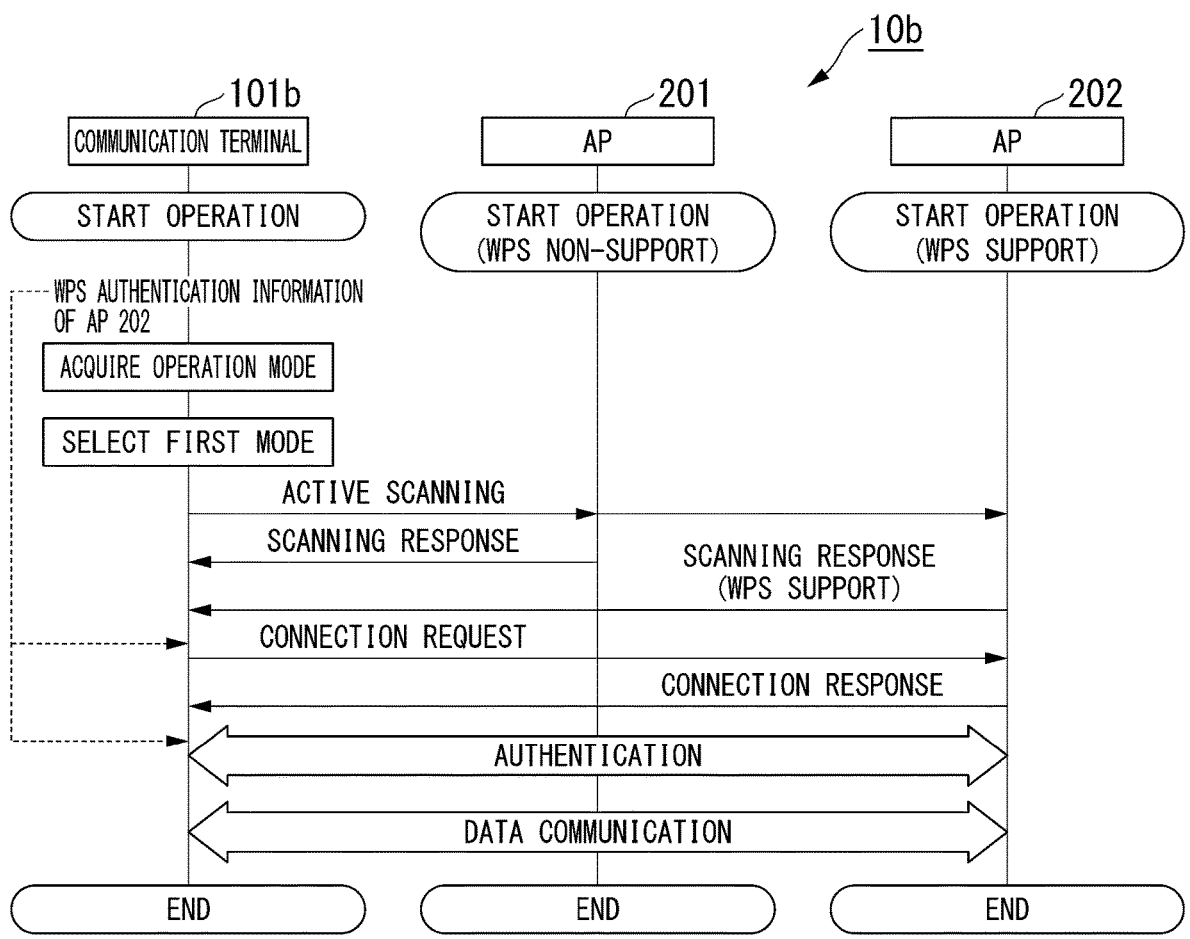
FIG. 14 is a diagram showing a procedure of an operation of each terminal in the third embodiment of the present invention.

FIG. 14 shows an operation of each of the communication terminal 101*b* in which the first mode has been set as the operation mode, the AP 202 in the WPS support, and the AP 201 in the WPS non-support. For example, FIG. 14 shows an operation of each terminal after the communication terminal 101*b* and the AP 202 complete the data communication in FIG. 13. After the power source is turned off in the communication terminal 101*b*, the state of the mode switch of the communication terminal 101*b* is set to the first mode in order for the communication terminal 101*b* and the AP 202 to perform the data communication. Thereafter, the power source of the communication terminal 101*b* is turned on. At this time, the AP 202 has been set in the state (WPS support) of being able to execute the setup processing on the basis of a user's operation. The power source of the AP 201 is also turned on and the AP 201 has been set in the state (WPS non-support) of being unable to execute the setup processing on the basis of a user's operation.

The communication terminal 101*b* executes the connection and the authentication with the AP 202 through the operation shown in FIG. 13 before executing the operation shown in FIG. 14. The communication terminal 101*b* stores the WPS authentication information of the AP 202 on the memory 131.

The communication terminal 101*b* acquires the operation mode (Step S121). Since the operation mode is the first mode, the communication terminal 101*b* selects the first mode (Step S122).

The communication terminal 101*b* executes the active scanning by transmitting a probe request by broadcasting (Step S123). The probe request does not include the information indicating that the communication terminal 101*b* supports the WPS. The communication terminal 101*b* finds the AP 201 and the AP 202 by receiving scanning responses transmitted from the AP 201 and the AP 202 (Step S102). The AP 202 is the last AP to have executed the connection and the authentication with the communication terminal 101*b* and the found APs include the AP 202 (Step S106).

Therefore, the communication terminal 101*b* transmits a connection request to the AP 202 on the basis of the network identifier of the WPS authentication information stored on the memory 131 and the MAC address of the WPS authentication information stored on the memory 131. The connection request does not include the information indicating that the communication terminal 101*b* supports the WPS. The communication terminal 101*b* completes the connection by receiving a connection response from the AP 202. The communication terminal 101*b* executes the authentication processing with the AP 202 on the basis of the WPA2-PSK by using the passphrase of the WPS authentication information or the PSK of the WPS authentication information (Step S1071). After the authentication is completed, the communication terminal 101*b* and the AP 202 perform the data communication (Step S115).

The AP 202 found through the scanning is in the WPS support. However, the communication terminal 101*b* does not wait for the AP 202 to become able to execute the setup processing and does not execute the setup processing with the AP 202.

Figure 15:
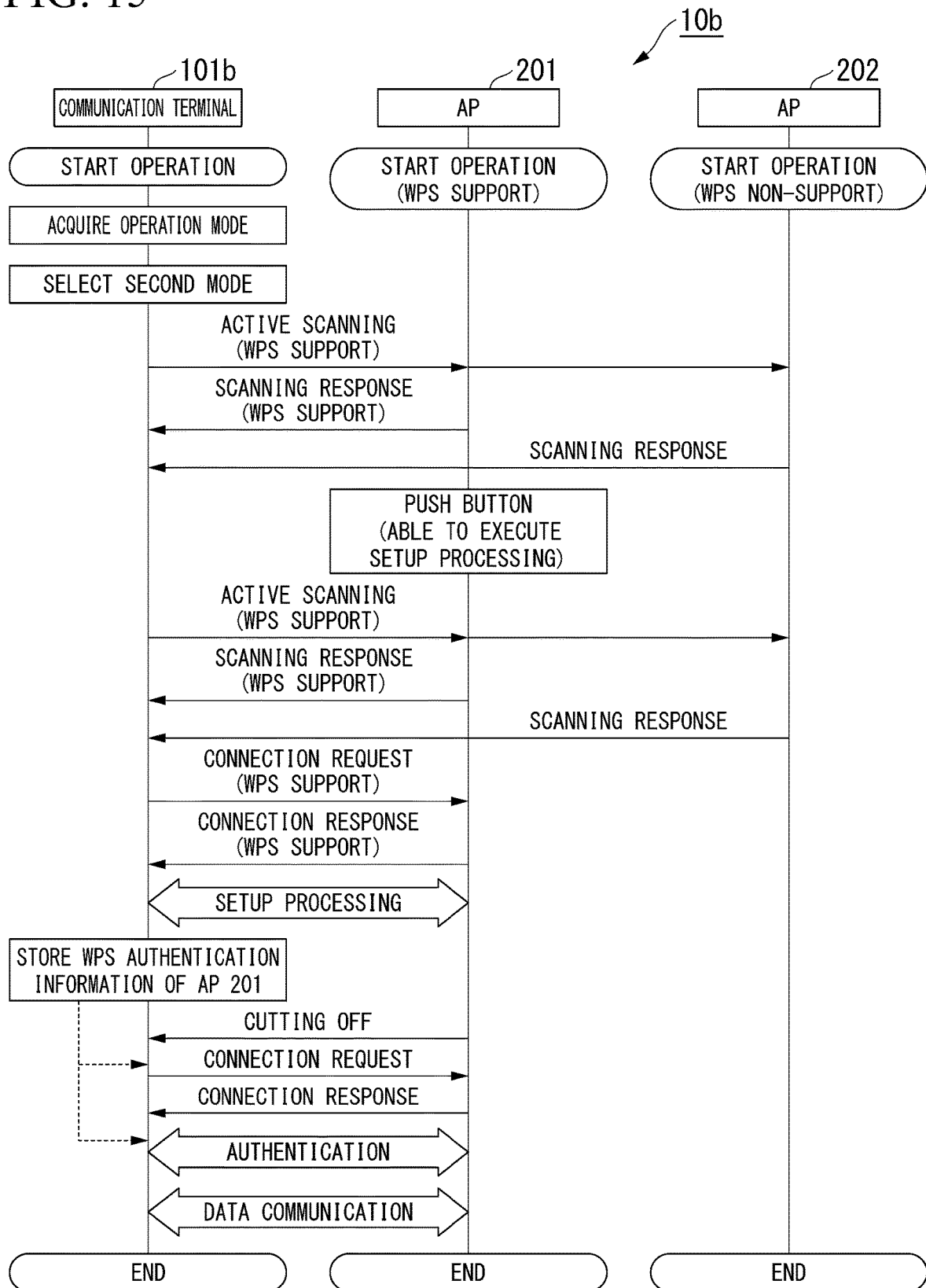
FIG. 15 is a diagram showing a procedure of an operation of each terminal in the third embodiment of the present invention.

FIG. 15 shows an operation of each of the communication terminal 101*b* in which the second mode has been set as the operation mode, the AP 201 in the WPS support, and the AP 202 in the WPS non-support. For example, FIG. 15 shows an operation of each terminal after the communication terminal 101*b* and the AP 202 complete the data communication in FIG. 14. After the power source is turned off in the communication terminal 101*b*, the state of the mode switch of the communication terminal 101*b* is set to the second mode in order for the communication terminal 101*b* and the AP 201 to perform the data communication. Thereafter, the power source of the communication terminal 101*b* is turned on. At this time, the AP 201 has been set in the state (WPS support) of being able to execute the setup processing on the basis of a user's operation. The AP 202 has been set in the state (WPS non-support) of being unable to execute the setup processing on the basis of a user's operation.

The communication terminal 101*b* executes the connection and the authentication with the AP 202 through the operation shown in FIG. 14 before executing the operation shown in FIG. 15. The communication terminal 101*b* stores the WPS authentication information of the AP 202 on the memory 131.

The communication terminal 101b acquires the operation mode (Step S121). Since the operation mode is the second mode, the communication terminal 101b selects the second mode (Step S122).

The communication terminal 101b executes the active scanning by transmitting a probe request by broadcasting (Step S101). The probe request includes the information indicating that the communication terminal 101b supports the WPS. The communication terminal 101b finds the AP 201 and the AP 202 by receiving scanning responses transmitted from the AP 201 and the AP 202. The scanning response transmitted from the AP 201 includes the information indicating that the AP 201 supports the WPS. The scanning response transmitted from the AP 202 does not include the information indicating that the AP 202 supports the WPS. Since the scanning response including the information indicating that the AP supports the WPS is received, the communication terminal 101b finds the AP in the WPS support (Step S108).

At this time point, pushing a push button, inputting a PIN code, or the like has not been performed in the AP 201. Therefore, the AP 201 has not started the operation based on the WPS method and is unable to execute the setup processing (Step S109).

Thereafter, a user pushes the button in the AP 201 and the AP 201 is then able to execute the setup processing using the PBC method. The communication terminal 101b executes the active scanning by transmitting a probe request by broadcasting (Step S101). The probe request includes the information indicating that the communication terminal 101b supports the WPS. The communication terminal 101b finds the AP 201 and the AP 202 by receiving scanning responses transmitted from the AP 201 and the AP 202. The scanning response transmitted from the AP 201 includes the information indicating that the AP 201 supports the WPS. The scanning response transmitted from the AP 202 does not include the information indicating that the AP 202 supports the WPS. Since the scanning response including the information indicating that the AP supports the WPS is received, the communication terminal 101b finds the AP in the WPS support (Step S108). The AP 201 is able to execute the setup processing (Step S109).

The communication terminal 101b transmits a connection request including the information indicating that the communication terminal 101b supports the WPS to the AP 201. The communication terminal 101b completes the connection by receiving a connection response from the AP 201 (Step S110).

The communication terminal 101b and the AP 201 execute the setup processing on the basis of the PBC method. In the setup processing, the WPS authentication information is transmitted from the AP 201 to the communication terminal 10 lb (Step S111). The communication terminal 101b stores the WPS authentication information of the AP 201 on the memory 131 (Step S112). The AP 201 cuts off the connection with the communication terminal 101b (Step S113).

The communication terminal 101b transmits a connection request to the AP 201 on the basis of the network identifier of the WPS authentication information stored on the memory 131 and the MAC address of the WPS authentication information stored on the memory 131. The connection request does not include the information indicating that the communication terminal 101b supports the WPS. The communication terminal 101b completes the connection by receiving a connection response from the AP 201. The communication terminal 101b executes the authentication processing with the AP 201 on the basis of the WPA2-PSK by using the passphrase of the WPS authentication information or the PSK of the WPS authentication information (Step S114). After the authentication is completed, the communication terminal 101b and the AP 201 perform the data communication (Step S115).

The AP 202 is the last AP to have executed the connection and the authentication with the communication terminal 101b. However, the communication terminal 101b does not connect to the AP 202 and does not execute the authentication processing with the AP 202.

In any one of a case in which only one AP is present and a case in which two or more APs are present, the communication terminal 101b in which the first mode has been set connects to an AP through a similar procedure to that of the automatic connection and executes the authentication with the AP by using the WPS authentication information stored on the memory 131. In addition, in any of the above-described cases, the communication terminal 101b in which the second mode has been set executes the setup processing without executing the automatic connection regardless of whether or not the WPS authentication information is stored on the memory 131. The communication terminal 101b in which the second mode has been set connects to an AP and executes the authentication with the AP on the basis of the WPS authentication information acquired through the setup processing.

In the communication terminal 101b in which the first mode or the second mode has been set, some of the operations performed by a user are omitted. For example, a user does not need to perform an operation related to switching between ON and OFF of the automatic connection, selection of the connecting method (WPS), selection of the WPS method, and the instruction for starting the PBC method. These operations are replaced with the operation of setting the first mode or the second mode. Therefore, a user's load of operations related to the connection and the authentication can be reduced.

Fourth Embodiment

The AP transmits the WPS authentication information to the communication terminal in the setup processing. In the first to third embodiments, a timing at which the WPS authentication information is generated is arbitrary. Therefore, the AP is able to transmit the WPS authentication information already stored before the AP executes the setup processing to the communication terminal. In other words, after the AP generates the WPS authentication information, the AP transmits the same WPS authentication information to the communication terminal each time the AP executes the setup processing as long as the AP does not explicitly change the WPS authentication information.

In the fourth embodiment of the present invention, the AP changes part of the WPS authentication information each time the AP executes the setup processing. Specifically, the AP changes any one of or both the network identifier and the passphrase (or PSK). In other words, the AP generates new WPS authentication information each time the AP executes the setup processing. The AP executes the setup processing and transmits the WPS authentication information of which part has been changed to the communication terminal. The AP constructs a network on the basis of the WPS authentication information of which part has been changed, connects to the communication terminal via the network, and executes the authentication with the communication terminal.

Figure 16:
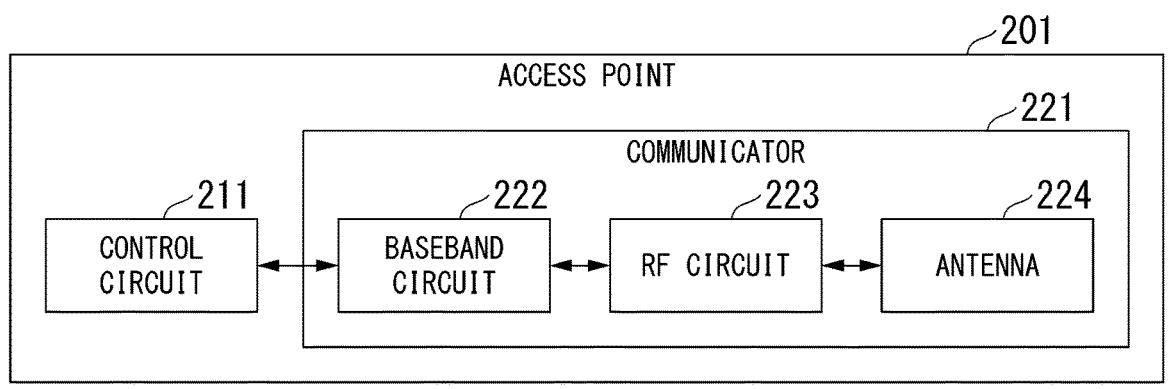
FIG. 16 is a block diagram showing a configuration of an access point according to a fourth embodiment of the present invention.

FIG. 16 shows a configuration of an AP (access point) 201 according to the fourth embodiment of the present invention. The AP 201 shown in FIG. 16 includes a control circuit 211 (first control circuit) and a communicator 221. The communicator 221 is a wireless communicator (first wireless communicator).

A schematic configuration of the AP 201 will be described. The AP 201 performs wireless communication with the communication terminal 101 of the first embodiment. The control circuit 211 generates authentication information (WPS authentication information). In a case in which the communicator 221 does not receive the setup information from the communication terminal 101, the control circuit 211 causes the communicator 221 to wirelessly connect to the communication terminal 101 and executes the authentication processing with the communication terminal 101 on the basis of the generated authentication information without executing the setup processing. The setup information indicates that the control circuit 111 of the communication terminal 101 is able to execute the setup processing. When the communicator 221 receives the setup information from the communication terminal 101, the control circuit 211 causes the communicator 221 to start the setup processing with the communication terminal 101. The control circuit 211 causes the communicator 221 to transmit the generated authentication information to the communication terminal 101 in the setup processing. After the setup processing is executed, the control circuit 211 causes the communicator 221 to wirelessly connect to the communication terminal 101 with which the communicator 221 has executed the setup processing and executes the authentication processing, on the basis of the authentication information transmitted to the communication terminal 101 in the setup processing, with the communication terminal 101 with which the communicator 221 has executed the setup processing. The control circuit 211 generates authentication information different from the already generated authentication information each time the communicator 221 executes the setup processing.

A detailed configuration of the AP 201 will be described. The control circuit 211 (controller) is a processor. The AP 201 may include one or a plurality of processors. The control circuit 211 may be at least one of a dedicated IC, an ASIC, and an FPGA.

The control circuit 211 may read a program and execute the read program. The program includes commands defining the operations of the control circuit 211. In other words, the functions of the control circuit 211 may be realized by software. The program is realized similarly to the program that realizes the functions of the control circuit 111.

The communicator 221 is a wireless module. For example, the communicator 221 performs communication in accordance with IEEE802.11. The communicator 221 includes a baseband circuit 222, an RF circuit 223, and an antenna 224.

The baseband circuit 222 is similar to the baseband circuit 122 of the communicator 121. The RF circuit 223 is similar to the RF circuit 123 of the communicator 121. The antenna 224 is similar to the antenna 124 of the communicator 121.

In the example shown in FIG. 16, the antenna 224 is disposed inside the communicator 221. The antenna 224 may be disposed outside the communicator 221.

The control circuit 211 is disposed outside the communicator 221 and controls the entire operations of the AP 201. The control circuit 211 controls the baseband circuit 222. In a case in which the AP 201 includes a display unit, an operation unit, or the like not shown in FIG. 16, the control circuit 211 controls the display unit, the operation unit, or the like. A control circuit disposed inside the communicator 221 may control the baseband circuit 222 in place of the control circuit 211. In such a case, the control circuit 211 controls the control circuit inside the communicator 221.

The control circuit 211 transmits information such as the WPS authentication information to the communication terminal 101 by using the communicator 221. Specifically, the control circuit 211 controls the communicator 221 such that information is transmitted to the communication terminal 101. In other words, the control circuit 211 causes the communicator 221 to transmit information for the communication terminal 101. In this way, the communicator 221 transmits information to the communication terminal 101. The control circuit 211 receives information such as a connection request from the communication terminal 101 by using the communicator 221. Specifically, the control circuit 211 controls the communicator 221 such that information is received from the communication terminal 101. In other words, the control circuit 211 causes the communicator 221 to receive information from the communication terminal 101. In this way, the communicator 221 receives information from the communication terminal 101.

Figure 17:
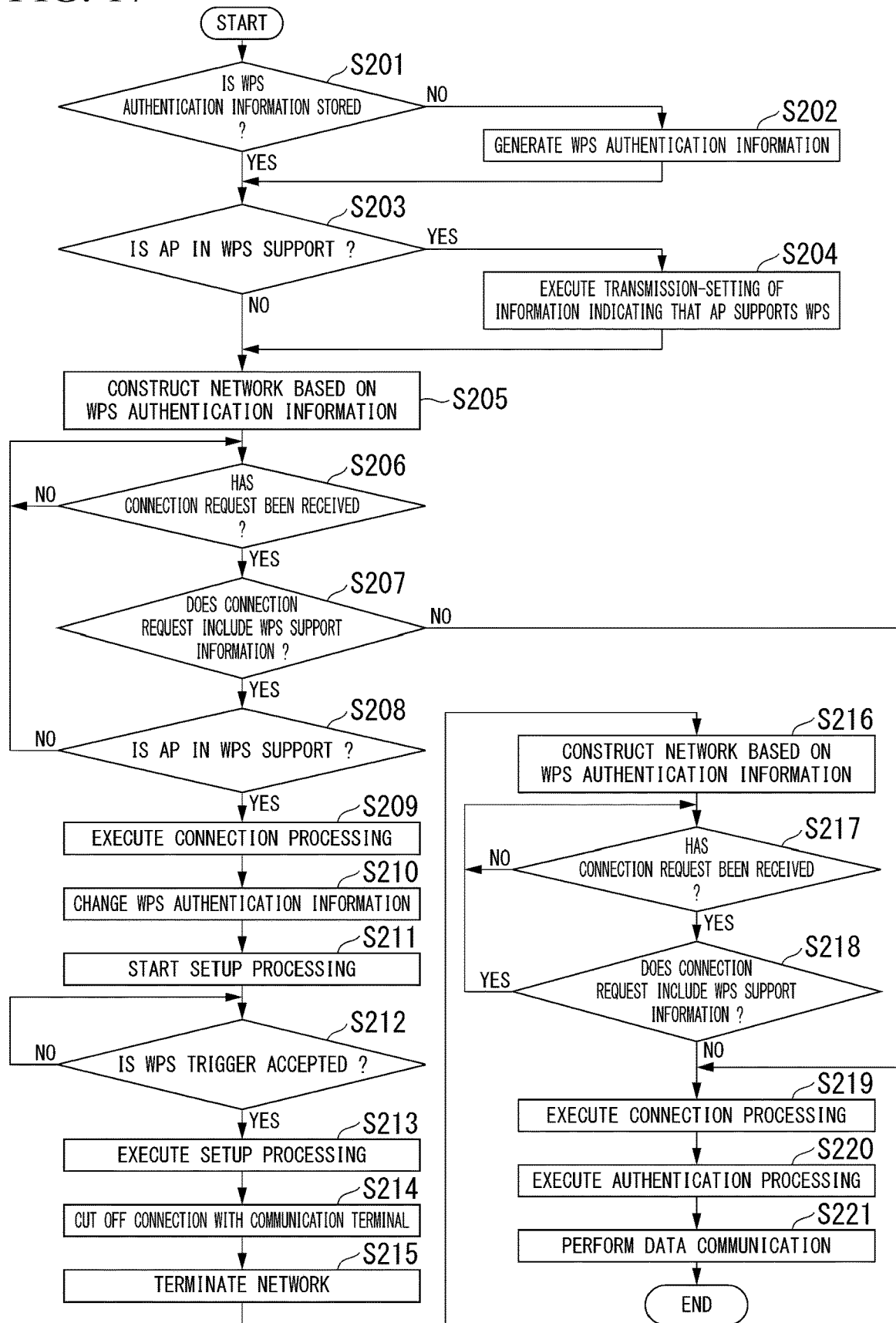
FIG. 17 is a flow chart showing a procedure of an operation of the access point according to the fourth embodiment of the present invention.

An operation of the AP 201 will be described. FIG. 17 shows a procedure of the operation of the AP 201.

(Step S201)

The control circuit 211 determines whether or not the WPS authentication information is stored on a memory not shown in FIG. 16. When the control circuit 211 determines that the WPS authentication information is stored on the memory in Step S201, the processing in Step S203 is executed.

(Step S202)

When the control circuit 211 determines that the WPS authentication information is not stored on the memory in Step S201, the control circuit 211 generates the WPS authentication information.

(Step S203)

After Step S202, the control circuit 211 determines whether or not the AP 201 supports the WPS. For example, at the time of shipping the AP 201, the state of the AP 201 is set to the WPS support or the WPS non-support. Alternatively, a user may set the state of the AP 201 to the WPS support or the WPS non-support. When the control circuit 211 determines that the AP 201 does not support the WPS in Step S203, the processing in Step S205 is executed.

(Step S204)

When the control circuit 211 determines that the AP 201 supports the WPS in Step S203, the control circuit 211 executes transmission-setting of the information indicating that the AP 201 supports the WPS. After this transmission-setting is executed, predetermined information transmitted to the communication terminal 101 by the AP 201 includes the WSC IE. The predetermined information is a beacon, a probe response, and an association response. The WSC IE indicates that the AP 201 supports the WPS.

The control circuit 211 causes the communicator 221 to transmit a beacon at predetermined intervals. When the communicator 221 receives a probe request from the communication terminal 101, the control circuit 211 causes the communicator 221 to transmit a probe response to the communication terminal 101. When the communicator 221 receives an association request from the communication terminal 101, the control circuit 211 causes the communicator 221 to transmit an association response to the communication terminal 101.

(Step S205)

After Step S204, the control circuit 211 constructs a network on the basis of the WPS authentication information. At this time, the control circuit 211 uses the WPS authentication information stored on the memory in Step S201 or the WPS authentication information generated in Step S202. The control circuit 211 turns the state of the AP 201 to be able to perform communication. The control circuit 211 uses the network identifier included in the WPS authentication information and the passphrase or the PSK included in the WPS authentication information and accepts connection from the communication terminal 101. The control circuit 211 is then able to authenticate the communication terminal 101. Through the above-described process, the control circuit 211 constructs the network.

(Step S206)

After Step S205, the control circuit 211 monitors the state of the communicator 221 and determines whether or not a connection request (association request) has been received from the communication terminal 101. When the control circuit 211 determines that the connection request has not been received in Step S206, the determination in Step S206 continues.

(Step S207)

When the control circuit 211 determines that the connection request has been received in Step S206, the control circuit 211 determines whether or not the connection request includes the WSC IE. The WSC IE indicates that the communication terminal 101 supports the WPS. When the control circuit 211 determines that the connection request does not include the WSC IE in Step S207, the processing in Step S219 is executed.

(Step S208)

When the control circuit 211 determines that the connection request includes the WSC IE in Step S207, the control circuit 211 determines whether or not the AP 201 supports the WPS. The determination in Step S208 is similar to that in Step S203. When the control circuit 211 determines that the AP 201 does not support the WPS in Step S208, the processing in Step S206 is executed.

(Step S209)

When the control circuit 211 determines that the AP 201 supports the WPS in Step S208, the control circuit 211 causes the communicator 221 to connect to the communication terminal 101. When the communicator 221 succeeds in connecting to the communication terminal 101, the control circuit 211 causes the communicator 221 to transmit a connection response (association response) to the communication terminal 101. This connection response includes information indicating a success.

(Step S210)

After Step S209, the control circuit 211 changes any one of or both the network identifier and the passphrase (or PSK). The control circuit 211 may change only the network identifier. Alternatively, the control circuit 211 may change only the passphrase (or PSK). Alternatively, the control circuit 211 may change both the network identifier and the passphrase (or PSK). In this way, the control circuit 211 generates new WPS authentication information.

When the WPS authentication information stored on the memory is used in Step S205, the control circuit 211 generates WPS authentication information different from that stored on the memory. When the WPS authentication information generated in Step S202 is used in Step S205, the control circuit 211 generates WPS authentication information different from that generated in Step S202. The control circuit 211 may generate WPS authentication information different from any WPS authentication information previously generated in the AP 201. The control circuit 211 may store the changed WPS authentication information on the memory.

(Step S211)

After Step S210, the control circuit 211 starts the setup processing with the communication terminal 101 in accordance with the start of the setup processing by the communication terminal 101.

(Step S212)

After Step S211, the control circuit 211 determines whether or not an operation unit not shown in FIG. 16 has accepted a WPS trigger. In the setup processing, the AP 201 and the communication terminal 101 perform communication of a great deal of messages. The WPS trigger is input to the operation unit by the time a predetermined message is transmitted in the setup processing. For example, the trigger of the PBC method is an action (push button) of pushing a button of the operation unit or an action of selecting the push button in the menu on the UI. The trigger of the PIN method is an action of inputting a PIN code through an operation of the operation unit. The trigger of the NFC method is an action of bringing the AP 201 into contact with a token card or the communication terminal 101.

At a time point at which the WPS trigger is input, the AP 201 is then able to execute the setup processing. After the WPS trigger is input, predetermined information to be transmitted to the communication terminal 101 by the AP 201 includes information indicating that the AP 201 is able to execute the setup processing. In other words, in the WSC IE of the beacon and the WSC IE of the probe response, 1 is set in the selected-registrar.

When the control circuit 211 determines that the operation unit has not accepted the WPS trigger in Step S212, the determination in Step S212 continues. The setup processing continues in parallel with the determination in Step S212. When the control circuit 211 determines that the operation unit has not accepted the WPS trigger in Step S212, the setup processing may be terminated as an error and the processing in Step S211 may be executed.

(Step S213)

When the control circuit 211 determines that the operation unit has accepted the WPS trigger in Step S212, the control circuit 211 continues the setup processing started in Step S211. After the setup processing is started and until the determination in Step S212 is executed, the AP 201 and the communication terminal 101 perform communication of some messages. The AP 201 and the communication terminal 101 perform communication of the remaining messages in Step S213. When the setup processing is normally completed, the WPS authentication information is transmitted from the AP 201 to the communication terminal 101. The control circuit 211 causes the communicator 221 to transmit the WPS authentication information to the communication terminal 101.

(Step S214)

After Step S213, the control circuit 211 cuts off the connection with the communication terminal 101 to which the control circuit 211 has connected in Step S209. For example, the control circuit 211 causes the communicator 221 to transmit a deauthentication or a disassociation to the communication terminal 101. In a case in which the communicator 221 receives the deauthentication or the disassociation from the communication terminal 101 before the communicator 221 transmits the deauthentication or the disassociation to the communication terminal 101, the connection is cut off. In this case, the communicator 221 does not need to transmit the deauthentication or the disassociation to the communication terminal 101. Alternatively, the communicator 221 may transmit the deauthentication or the disassociation to the communication terminal 101.
(Step S215)

After Step S214, the control circuit 211 terminates the network constructed in Step S205. After the network is terminated, the AP 201 is unable to perform communication. After the network is terminated, the AP 201 is unable to accept connection from the communication terminal 101 and is unable to authenticate the communication terminal 101.
(Step S216)

After Step S215, the control circuit 211 constructs a network on the basis of the WPS authentication information changed in Step S210. The processing in Step S216 is similar to that in Step S205.
(Step S217)

After Step S216, the control circuit 211 monitors the state of the communicator 221 and determines whether or not a connection request (association request) has been received from the communication terminal 101. When the control circuit 211 determines that the connection request has not been received in Step S217, the determination in Step S217 continues.
(Step S218)

When the control circuit 211 determines that the connection request has been received in Step S217, the control circuit 211 determines whether or not the connection request includes the WSC IE. The WSC IE indicates that the communication terminal 101 supports the WPS. When the control circuit 211 determines that the connection request includes the WSC IE in Step S218, the processing in Step S217 is executed.
(Step S219)

When the control circuit 211 determines that the connection request does not include the WSC IE in Step S218, the control circuit 211 causes the communicator 221 to connect to the communication terminal 101. The processing in Step S219 is similar to that in Step S209.
(Step S220)

After Step S219, the control circuit 211 executes the authentication processing with the communication terminal 101 on the basis of, for example, the WPA2-PSK by using the passphrase of the WPS authentication information or the PSK of the WPS authentication information changed in Step S210.
(Step S221)

After Step S220, the control circuit 211 causes the communicator 221 to perform wireless data communication with the communication terminal 101.

The WPS authentication information may be changed at any timing from the timing at which the control circuit 211 determines that the AP 201 supports the WPS in Step S208 to the timing at which the WPS authentication information is transmitted to the communication terminal 101 in Step S213. In a case in which the WPS authentication information is generated in Step S202, the processing in Step S210 does not need to be executed.

The authentication processing may fail due to the reason that the passphrases or the PSKs stored by the communication terminal 101 and the AP 201 are different from each other or due to other reasons. In such a case, the processing may be completed without performing the data communication in Step S221. Alternatively, the processing in Step S206 may be executed without performing the data communication in Step S221. In a case in which the authentication processing fails and the processing in Step S206 is executed, the authentication processing is tried again and the authentication processing fails again. In a case in which the authentication processing repeatedly fails, the processing may be completed when the authentication processing fails a predetermined number of times.

When the power source of the AP 201 is turned off or the power source of the communicator 221 is turned off, the control circuit 211 terminates the network constructed in Step S216. This is not shown in FIG. 17. After the data communication in Step S221 is completed, the control circuit 211 may terminate the network. Alternatively, after the data communication in Step S221 is completed, the control circuit 211 does not need to terminate the network.

In the above descriptions, the AP 201 performs communication with the communication terminal 101. The AP 201 may perform communication with the communication terminal 101a shown in FIG. 6 or the communication terminal 101b shown in FIG. 9.

Figure 18:
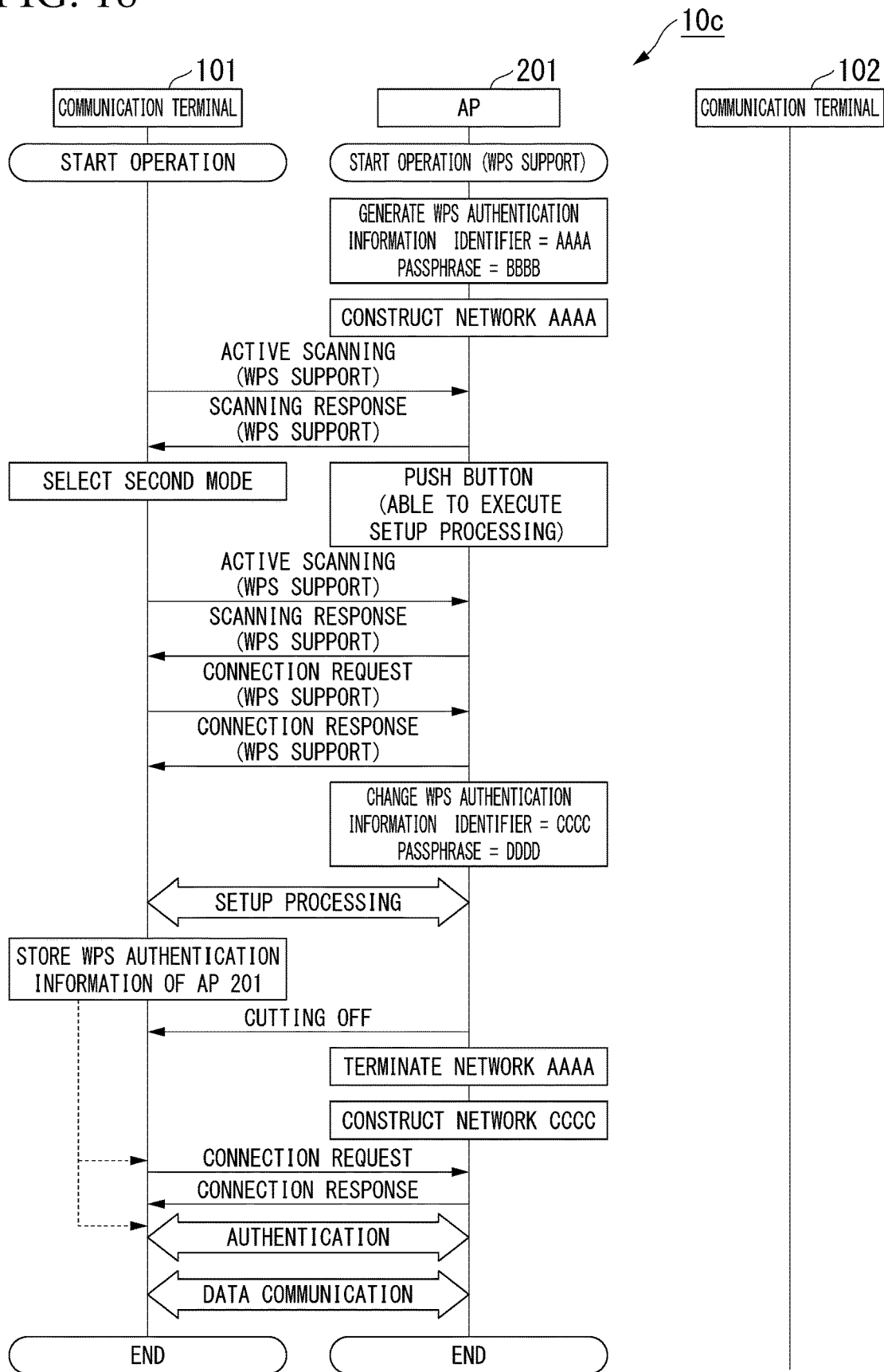
FIG. 18 is a diagram showing a procedure of an operation of each terminal in the fourth embodiment of the present invention.
Figure 19:
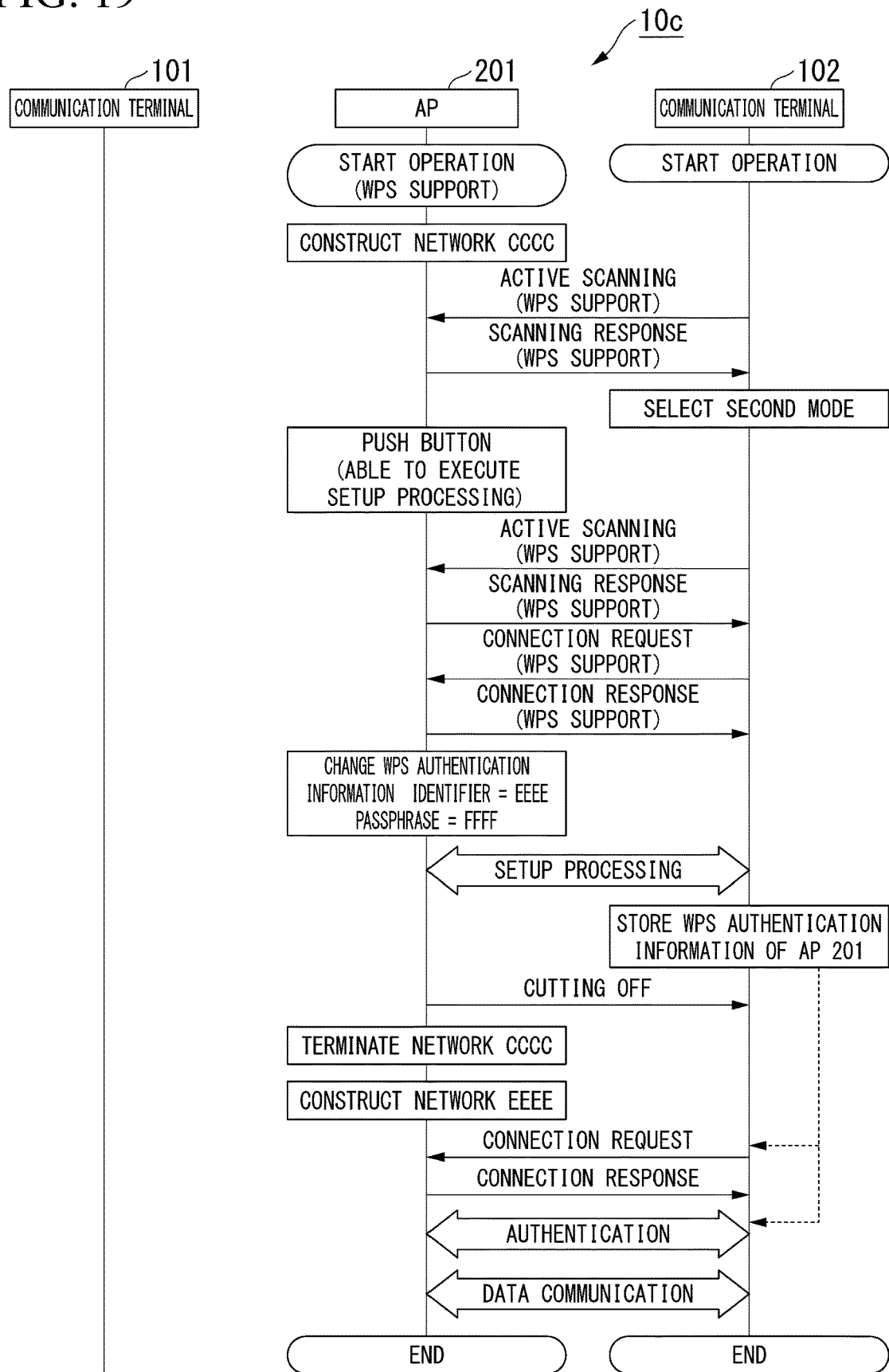
FIG. 19 is a diagram showing a procedure of an operation of each terminal in the fourth embodiment of the present invention.
Figure 20:
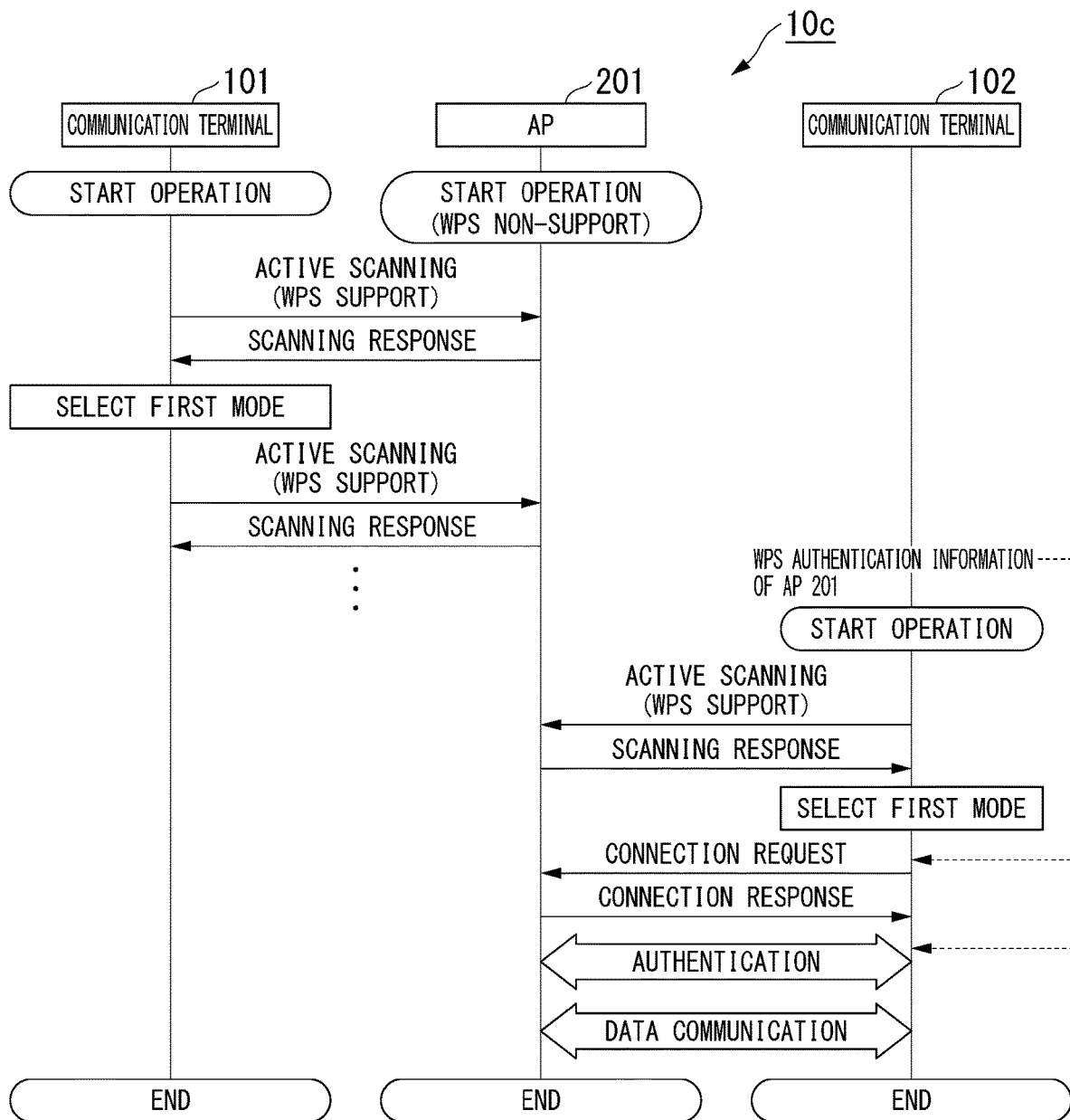
FIG. 20 is a diagram showing a procedure of an operation of each terminal in the fourth embodiment of the present invention.

An example of an operation of each terminal in the fourth embodiment will be described. FIGS. 18 to 20 show a procedure of an operation of each terminal included in a wireless communication system 10c. The wireless communication system 10c includes two communication terminals (communication terminal 101 and communication terminal 102) and the AP 201.

FIG. 18 shows an operation of each of the communication terminal 101 and the AP 201 in the WPS support. FIG. 18 shows an operation of each of the communication terminal 101 and the AP 201 in a case in which the communication terminal 101 and the AP 201 perform the data communication for the first time. The AP 201 has never performed the data communication with any of the communication terminal 101 and the communication terminal 102 and does not hold the WPS authentication information. The AP 201 has been set in the state (WPS support) of being able to execute the setup processing on the basis of a user's operation. The communication terminal 101 performs the operation in the first embodiment.

The AP 201 does not hold the WPS authentication information (Step S201). Therefore, the AP 201 generates the WPS authentication information (Step S202). In the example shown in FIG. 18, the network identifier included in the WPS authentication information is "AAAA" and the passphrase included in the WPS authentication information is "BBBB." The AP 201 supports the WPS (Step S203). Therefore, the information transmitted by the AP 201 includes the information indicating that the AP 201 supports the WPS (Step S204). The AP 201 constructs a network by using the network identifier "AAAA" and the passphrase "BBBB" (Step S205).

The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). The scanning response transmitted from the AP 201 includes the information indicating that the AP 201 supports the WPS. Since the scanning response not including the information indicating that the AP supports the WPS is not received, the communication terminal 101 does not find the AP in the WPS non-support (Step S105). Since the scanning response including the information indicating that the AP supports the WPS is received, the communication terminal 101 finds the AP in the WPS support (Step S108).

The communication terminal 101 selects the second mode (Step S1081). At this time point, pushing a push button, inputting a PIN code, or the like has not been performed in the AP 201. Therefore, the AP 201 has not started the operation based on the WPS method and is unable to execute the setup processing (Step S109).

Thereafter, a user pushes the button in the AP 201 and the AP 201 is then able to execute the setup processing using the PBC method. Therefore, the information transmitted by the AP 201 includes the information indicating that the AP 201 is able to execute the setup processing.

The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). The scanning response transmitted from the AP 201 includes the information indicating that the AP 201 supports the WPS. Therefore, the communication terminal 101 finds the AP in the WPS support (Step S105 and Step S108).

The communication terminal 101 selects the second mode (Step S1081). The AP 201 is able to execute the setup processing (Step S109). The communication terminal 101 transmits a connection request including the information indicating that the communication terminal 101 supports the WPS to the AP 201.

The AP 201 receives the connection request transmitted from the communication terminal 101 (Step S206). The connection request includes the information indicating that the communication terminal 101 supports the WPS (Step S207). The AP 201 is in the WPS support (Step S208). Therefore, the AP 201 transmits a connection response to the communication terminal 101 (Step S209).

The AP 201 changes the network identifier in the WPS authentication information to "CCCC" and changes the passphrase in the WPS authentication information to "DDDD" (Step S210). The AP 201 starts the setup processing with the communication terminal 101 (Step S211). Since the button has already been pushed in the AP 201, the AP 201 has accepted a WPS trigger (Step S212).

The AP 201 executes the setup processing with the communication terminal 101 on the basis of the PBC method. In the setup processing, the AP 201 transmits the WPS authentication information to the communication terminal 101 (Step S213). The AP 201 cuts off the connection with the communication terminal 101 (Step S214). The AP 201 terminates the network (Step S215).

The communication terminal 101 completes the connection by receiving a connection response from the AP 201 (Step S110). The communication terminal 101 executes the setup processing with the AP 201 on the basis of the PBC method. In the setup processing, the communication terminal 101 receives the WPS authentication information from the AP 201 (Step S111). The communication terminal 101 stores the WPS authentication information of the AP 201 on the memory 131 (Step S112). The AP 201 cuts off the connection with the communication terminal 101 (Step S113).

The AP 201 constructs a network by using the changed network identifier "CCCC" and the changed passphrase "DDDD" (Step S216).

The communication terminal 101 transmits a connection request to the AP 201 on the basis of the network identifier of the WPS authentication information stored on the memory 131 and the MAC address of the WPS authentication information stored on the memory 131. The connection request does not include the information indicating that the communication terminal 101 supports the WPS (Step S114).

The AP 201 receives the connection request (Step S217). The connection request does not include the information indicating that the communication terminal 101 supports the WPS (Step S218). Therefore, the AP 201 transmits a connection response to the communication terminal 101 (Step S219). The AP 201 executes the authentication processing with the communication terminal 101 on the basis of the WPA2-PSK by using the passphrase "DDDD" of the WPS authentication information (Step S220). After the authentication is completed, the AP 201 performs the data communication with the communication terminal 101 (Step S221).

The communication terminal 101 completes the connection by receiving a connection response from the AP 201. The communication terminal 101 executes the authentication processing with the AP 201 on the basis of the WPA2-PSK by using the passphrase "DDDD" of the WPS authentication information (Step S114). After the authentication is completed, the communication terminal 101 performs the data communication with the AP 201 (Step S115).

FIG. 19 shows an operation of each of the communication terminal 102 and the AP 201 in the WPS support. FIG. 19 shows an operation of each of the communication terminal 102 and the AP 201 in a case in which the AP 201 performs the data communication with the communication terminal 102 for the first time after the AP 201 performs the data communication with the communication terminal 101. The AP 201 stores the WPS authentication information including the network identifier "CCCC" and the passphrase "DDDD" as a result of the operation shown in FIG. 18. At this time, the AP 201 has been set in the state (WPS support) of being able to execute the setup processing on the basis of a user's operation. The communication terminal 102 performs the operation in the first embodiment.

The AP 201 holds the WPS authentication information (Step S201). Therefore, the AP 201 does not generate the WPS authentication information.

The operation thereafter is similar to that shown in FIG. 18. The network identifier "AAAA" in the operation shown in FIG. 18 is replaced with the network identifier "CCCC" in the operation shown in FIG. 19. The network identifier "CCCC" in the operation shown in FIG. 18 is replaced with the network identifier "EEEE" in the operation shown in FIG. 19. The passphrase "BBBB" in the operation shown in FIG. 18 is replaced with the passphrase "DDDD" in the operation shown in FIG. 19. The passphrase "DDDD" in the operation shown in FIG. 18 is replaced with the passphrase "FFFF" in the operation shown in FIG. 19. The operation of the communication terminal 101 in FIG. 18 is replaced with the operation of the communication terminal 102 in FIG. 19.

FIG. 20 shows an operation of each of the two communication terminals and the AP 201 in the WPS non-support. FIG. 20 shows an operation of each of the communication terminal 101, the communication terminal 102, and the AP 201 in a case in which the AP 201 performs the data communication with the communication terminal 102 again after the AP 201 performs the data communication with the communication terminal 102. The AP 201 stores the WPS authentication information including the network identifier "EEEE" and the passphrase "FFFF" as a result of the operation shown in FIG. 19. The communication terminal 101 stores the WPS authentication information including the network identifier "CCCC" and the passphrase "DDDD" as a result of the operation shown in FIG. 18. At this time, the AP 201 has been set in the state (WPS non-support) of being unable to execute the setup processing on the basis of a user's operation. The communication terminal 101 and the communication terminal 102 perform the operation in the first embodiment.

The AP 201 holds the WPS authentication information (Step S201). Therefore, the AP 201 does not generate the WPS authentication information. The AP 201 does not support the WPS (Step S203). Therefore, the information transmitted by the AP 201 does not include the information indicating that the AP 201 supports the WPS. The AP 201 has constructed a network by using the network identifier "EEEE" and the passphrase "FFFF" in the operation shown in FIG. 19. The network is maintained in FIG. 20.

The communication terminal 101 executes the active scanning by transmitting a probe request by broadcasting (Step S101). The probe request includes the information indicating that the communication terminal 101 supports the WPS. The communication terminal 101 finds the AP 201 by receiving a scanning response transmitted from the AP 201 (Step S102). Since the scanning response transmitted from the AP 201 does not include the information indicating that the AP 201 supports the WPS, the communication terminal 101 finds the AP in the WPS non-support (Step S105).

The communication terminal 101 selects the first mode (Step S1051). The found AP 201 is the last AP to have executed the connection and the authentication with the communication terminal 101. However, the current network identifier "EEEE" of the AP 201 is different from the network identifier "CCCC" of the AP 201 when the communication terminal 101 last executed the connection and the authentication with the AP 201. Alternatively, the current network identifier "EEEE" of the AP 201 is different from the network identifier "CCCC" of the WPS authentication information stored in the communication terminal 101 (Step S106). Therefore, the communication connection is not executed.

Thereafter, the communication terminal 101 repeats the active scanning. The communication terminal 101 does not connect to the AP 201 and does not execute the authentication processing with the AP 201.

The communication terminal 102 executes the active scanning by transmitting a probe request by broadcasting (Step S101). The probe request includes the information indicating that the communication terminal 102 supports the WPS. The communication terminal 102 finds the AP 201 by receiving a scanning response transmitted from the AP 201 (Step S102). Since the scanning response transmitted from the AP 201 does not include the information indicating that the AP 201 supports the WPS, the communication terminal 102 finds the AP in the WPS non-support (Step S105).

The communication terminal 102 selects the first mode (Step S1051). The AP 201 is the last AP to have executed the connection and the authentication with the communication terminal 102. The current network identifier "EEEE" of the AP 201 is the same as the network identifier "EEEE" of the AP 201 when the communication terminal 102 last executed the connection and the authentication with the AP 201. Alternatively, the current network identifier "EEEE" of the AP 201 is the same as the network identifier "EEEE" of the WPS authentication information stored in the communication terminal 102 (Step S106). Therefore, the communication terminal 102 transmits a connection request to the AP 201 on the basis of the network identifier of the WPS authentication information stored on the memory 131 and the MAC address of the WPS authentication information stored on the memory 131. The connection request does not include the information indicating that the communication terminal 102 supports the WPS.

The AP 201 receives the connection request transmitted from the communication terminal 102 (Step S206). The connection request does not include the information indicating that the communication terminal 102 supports the WPS (Step S207). Therefore, the AP 201 transmits a connection response to the communication terminal 102 (Step S219). The AP 201 executes the authentication processing with the communication terminal 102 on the basis of the WPA2-PSK by using the passphrase "FFFF" of the WPS authentication information (Step S220). After the authentication is completed, the AP 201 performs the data communication with the communication terminal 102 (Step S221).

The communication terminal 102 completes the connection by receiving a connection response from the AP 201. The communication terminal 102 executes the authentication processing with the AP 201 on the basis of the WPA2-PSK by using the passphrase "FFFF" of the WPS authentication information (Step S107). After the authentication is completed, the communication terminal 102 performs the data communication with the AP 201 (Step S115).

In the operations shown in FIGS. 18 to 20, the AP 201 changes the network identifier by changing the WPS authentication information. Therefore, in the operation shown in FIG. 20, the communication terminal 101 does not connect to the AP 201 and does not execute the authentication processing with the AP 201. However, in a case in which the AP 201 changes not the network identifier but only the passphrase or the PSK in order to change the WPS authentication information, the connection processing in Step S219 and the communication connection in Step S107 are successful. However, the passphrase or the PSK held by the AP 201 and the passphrase or the PSK held by the communication terminal 101 are different from each other. Therefore, the authentication in the authentication processing in Step S220 and the authentication processing in Step S107 is not successful. Consequently, the data communication in Step S115 and Step S221 is not performed between the AP 201 and the communication terminal 101.

The communication terminal 101 and the communication terminal 102 may perform the operation shown in FIG. 7 or FIG. 10.

The wireless communication method executed by the AP 201 includes a first step, a second step, a third step, a fourth step, a fifth step, and a sixth step. The control circuit 211 generates the WPS authentication information in the first step (Step S202 and Step S210). In a case in which the communicator 221 does not receive the setup information from the communication terminal 101, the control circuit 211 causes the communicator 221 to wirelessly connect to the communication terminal 101 in the second step (Step S219) without executing the setup processing. In such a case, the control circuit 211 executes the authentication processing with the communication terminal 101 on the basis of the generated authentication information in the third step (Step S220).

When the communicator 221 receives the setup information from the communication terminal 101, the control circuit 211 causes the communicator 221 to start the setup processing with the communication terminal 101 in the fourth step (Step S213). The control circuit 211 causes the communicator 221 to transmit the generated authentication information to the communication terminal 101 in the setup processing. After the setup processing is executed, the control circuit 211 causes the communicator 221 to wirelessly connect to the communication terminal 101 with which the communicator 221 has executed the setup processing in the fifth step (Step S219). The control circuit 211 executes the authentication processing, on the basis of the authentication information transmitted to the communication terminal 101 in the setup processing, with the communication terminal 101 with which the communicator 221 has executed the setup processing in the sixth step (Step S220). The control circuit 211 generates authentication information different from the already generated authentication information each time the communicator 221 executes the setup processing.

The wireless communication method executed by the AP 201 has only to include processing corresponding to the above-described first to sixth steps.

In any one of a case in which only one AP is present and a case in which two or more APs are present, a plurality of communication terminals that have selected the first mode store the WPS authentication information different from that stored in the other communication terminals in a case in which the communication terminals connect to one AP 201. Only the last communication terminal to have executed the setup processing with the AP 201 stores the same WPS authentication information as the latest WPS authentication information of the AP 201. In a case in which the last communication terminal to have executed the setup processing and the data communication with the AP 201 tries the automatic connection and the data communication, the AP 201 avoids unintentionally executing the automatic connection with another communication terminal. A user does not need to perform an operation for causing another communication terminal having connected to the AP 201 through the unintentional automatic connection to cut off the connection with the AP 201. Therefore, a user's load of operations related to the connection and the authentication can be reduced.

Fifth Embodiment

A fifth embodiment of the present invention will be described by using the communication terminal 101b shown in FIG. 9. The operation device 151 accepts an operation of selecting any one of a first mode, a second mode, and a third mode. The third mode is an operation mode for selecting any one of the first mode and the second mode on the basis of the state of receiving the setup information. When the operation device 151 accepts an operation of selecting the first mode, the control circuit 111 selects the first mode in the selection processing. When the operation device 151 accepts an operation of selecting the second mode, the control circuit 111 selects the second mode in the selection processing. When the operation device 151 accepts an operation of selecting the third mode and the communicator 121 receives, by executing scanning, the setup information from only any one of the one or more APs detected through the scanning, the control circuit 111 selects the first mode in the selection processing. When the operation device 151 accepts an operation of selecting the third mode and the communicator 121 receives, by executing scanning, the setup information from at least two of the one or more APs detected through the scanning, the control circuit 111 selects the second mode in the selection processing.

When the state of the operation device 151 is set to the first mode, the communication terminal 101b selects the first mode. The communication terminal 101b executes the automatic connection with the AP without executing the setup processing. When the state of the operation device 151 is set to the second mode, the communication terminal 101b selects the second mode. The communication terminal 101b executes the setup processing with the AP. When the state of the operation device 151 is set to the third mode, the communication terminal 101b selects the third mode. The communication terminal 101b selects any one of the first mode and the second mode on the basis of the number of APs in the WPS support.

Figure 21:
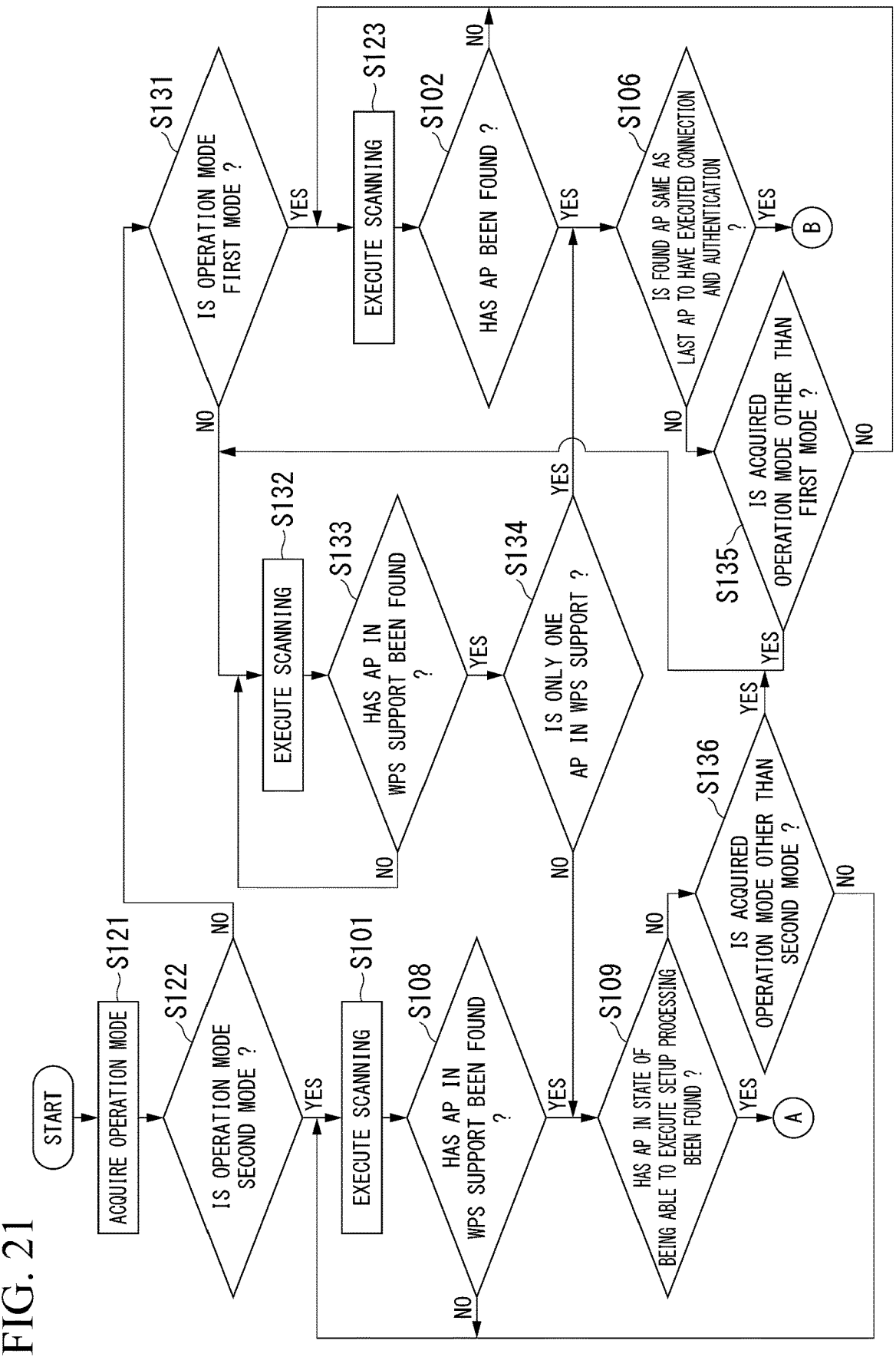
FIG. 21 is a flow chart showing a procedure of an operation of a communication terminal according to a fifth embodiment of the present invention.
Figure 22:
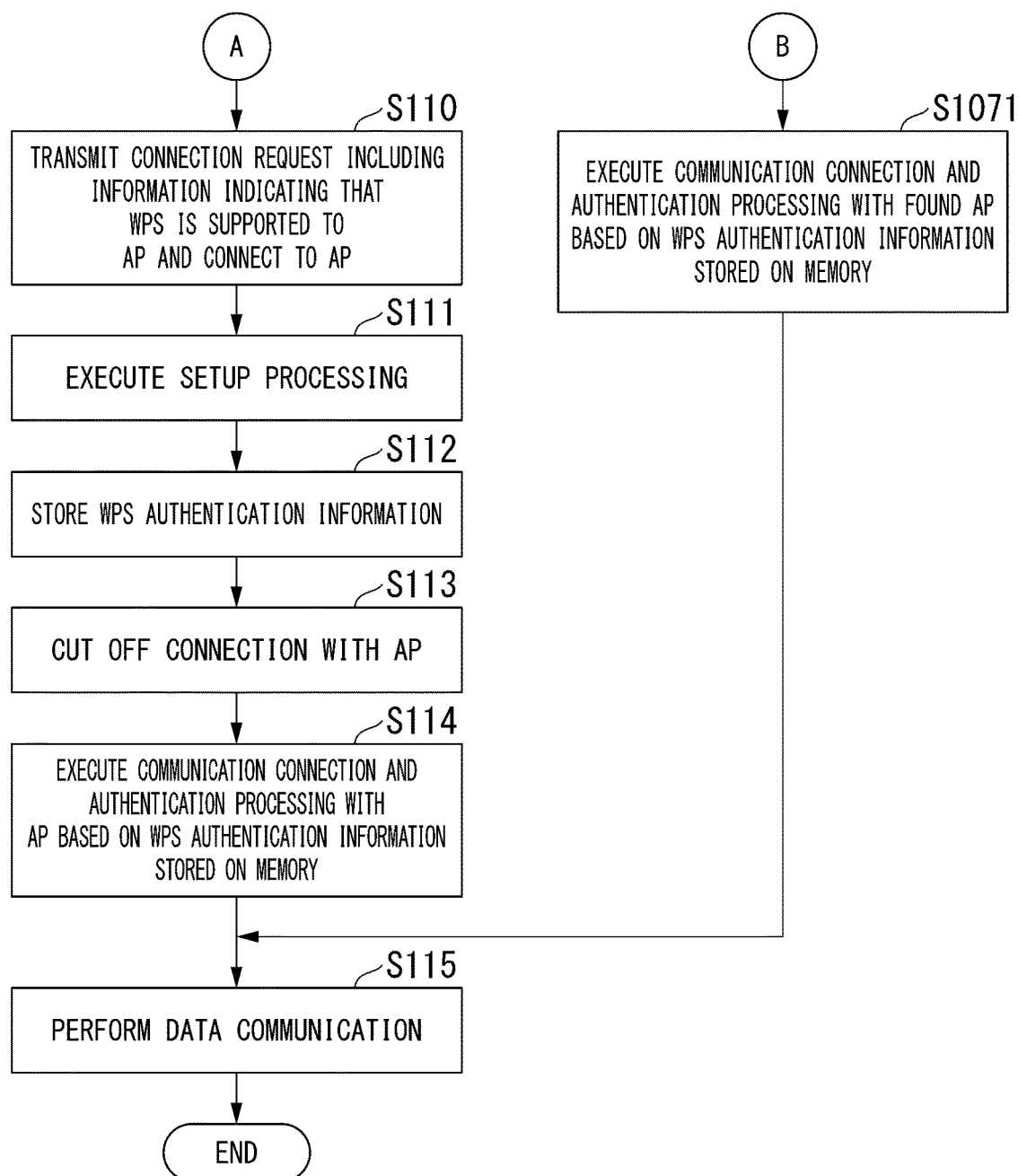
FIG. 22 is a flow chart showing a procedure of an operation of the communication terminal according to the fifth embodiment of the present invention.

An operation of the communication terminal 101b will be described. FIG. 21 and FIG. 22 show a procedure of the operation of the communication terminal 101b. The same processing as that shown in FIG. 2 or FIG. 10 will not be described.

(Step S131)

When the control circuit 111 determines that the operation mode is not the second mode in Step S122, the control circuit 111 determines whether or not the operation mode is the first mode. When the operation mode is the first mode, the control circuit 111 selects the first mode. When the operation mode is not the first mode, the control circuit 111 selects the third mode. When the control circuit 111 determines that the operation mode is the first mode in Step S131, the processing in Step S123 is executed.

(Step S132)

When the control circuit 111 determines that the operation mode is not the first mode in Step S131, the control circuit 111 executes the scanning by using the communicator 121. The processing in Step S132 is similar to that in Step S101.

(Step S133)

After Step S132, the control circuit 111 determines whether or not the AP in the WPS support has been found. The processing in Step S133 is similar to that in Step S108. When the control circuit 111 determines that the AP in the WPS support has not been found in Step S133, the processing in Step S132 is executed.

(Step S134)

When the control circuit 111 determines that the AP in the WPS support has been found in Step S133, the control circuit 111 determines whether or not only one AP is in the WPS support. When the control circuit 111 determines that only one AP is in the WPS support in Step S134, the processing in Step S106 is executed. In this case, the control circuit 111 selects the first mode. When the control circuit 111 determines that not only one AP is in the WPS support in Step S134, the processing in Step S109 is executed. In other words, when the control circuit 111 determines that two or more APs are in the WPS support, the processing in Step S109 is executed. In this case, the control circuit 111 selects the second mode.

(Step S135)

When the control circuit 111 determines that the AP found through the scanning is not the same as the last AP to have executed the connection and the authentication with the communication terminal 101b in Step S106, the control circuit 111 determines whether or not the operation mode acquired in Step S121 is a mode other than the first mode. The state of the operation device 151 has been set to the first mode or the third mode when the processing in Step S135 is executed.

When the control circuit 111 determines that the operation mode is the first mode in Step S135, the processing in Step S123 is executed. In this case, the control circuit 111 selects the first mode. When the control circuit 111 determines that the operation mode is the third mode in Step S135, the processing in Step S132 is executed. In this case, the control circuit 111 selects the third mode.

(Step S136)

When the control circuit 111 determines that the AP in the state of being able to execute the setup processing has not been found in Step S109, the control circuit 111 determines whether or not the operation mode acquired in Step S121 is a mode other than the second mode. The state of the operation device 151 has been set to the second mode or the third mode when the processing in Step S136 is executed.

When the control circuit 111 determines that the operation mode is the second mode in Step S136, the processing in Step S101 is executed. In this case, the control circuit 111 selects the second mode. When the control circuit 111 determines that the operation mode is the third mode in Step S136, the processing in Step S132 is executed. In this case, the control circuit 111 selects the third mode.

For example, the operation mode acquired in Step S121 is the third mode and only one AP in the WPS support is found through the first scanning in Step S132. Since the AP is not the last AP to have executed the connection and the authentication with the communication terminal 101b, the communication terminal 101b is unable to connect to the AP. For example, two or more APs in the WPS support are found through the scanning executed thereafter. In such a case, the communication terminal 101b needs to select the second mode and execute the setup processing.

For example, the operation mode acquired in Step S121 is the third mode and two APs in the WPS support are found through the first scanning in Step S132. However, the APs are not in the state of being able to execute the setup processing. For example, only one AP in the WPS support is found through the scanning executed thereafter. In such a case, the communication terminal 101b needs to select the first mode and execute the automatic connection.

Accordingly, in a case in which the operation mode acquired in Step S121 is the third mode, the control circuit 111 needs to select any one of the first mode and the second mode on the basis of the results of the scanning each time the scanning is executed.

When the control circuit 111 determines that the operation mode is the first mode in Step S135, the processing in Step S121 may be executed. When the control circuit 111 determines that the operation mode is the second mode in Step S136, the processing in Step S121 may be executed.

When the control circuit 111 determines that the AP in the WPS support has not been found in Step S133, the processing in Step S121 may be executed. When the control circuit 111 determines that the operation mode is the third mode in Step S135, the processing in Step S121 may be executed. When the control circuit 111 determines that the operation mode is the third mode in Step S136, the processing in Step S121 may be executed.

Figure 23:
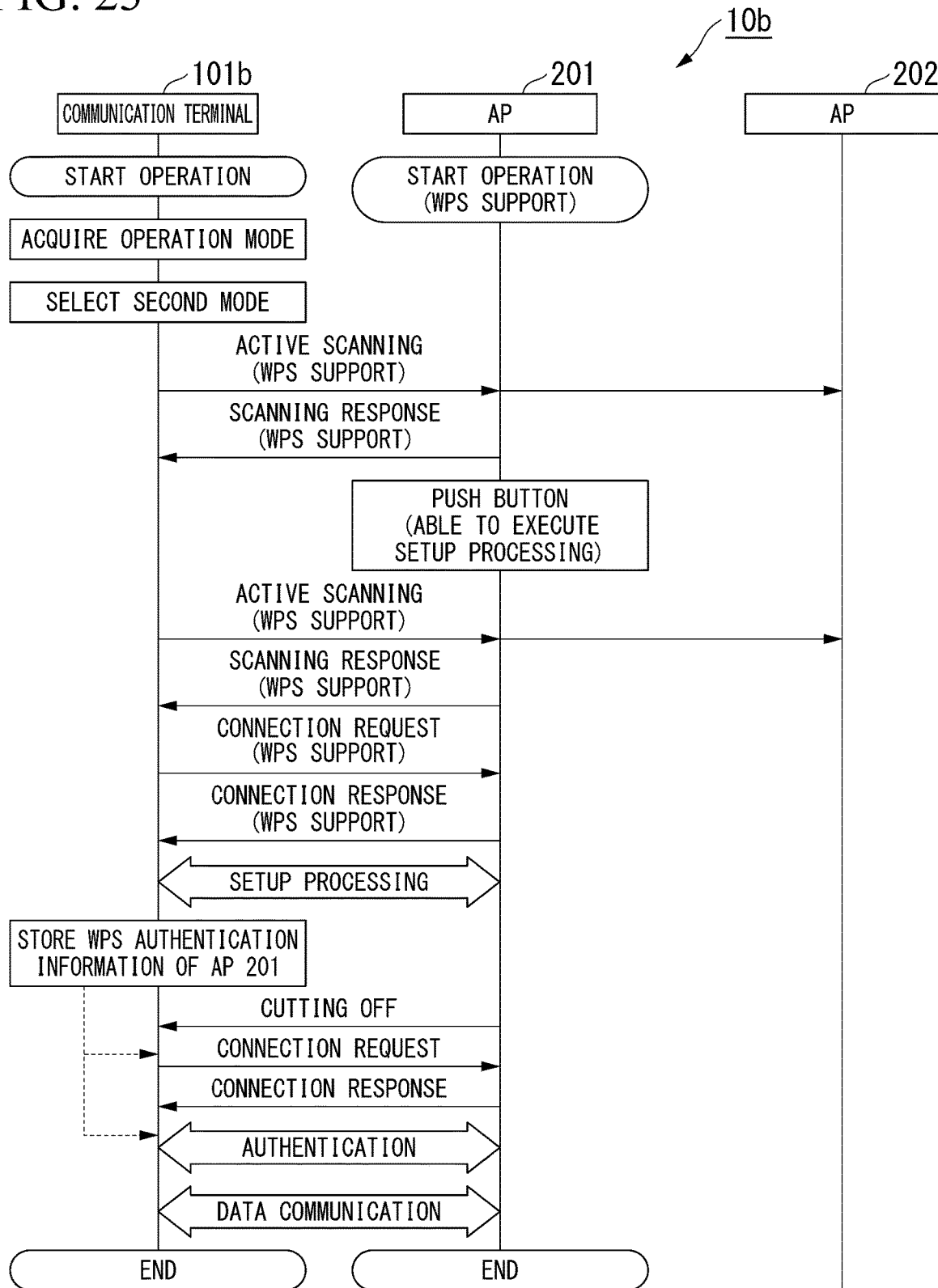
FIG. 23 is a diagram showing a procedure of an operation of each terminal in the fifth embodiment of the present invention.
Figure 24:
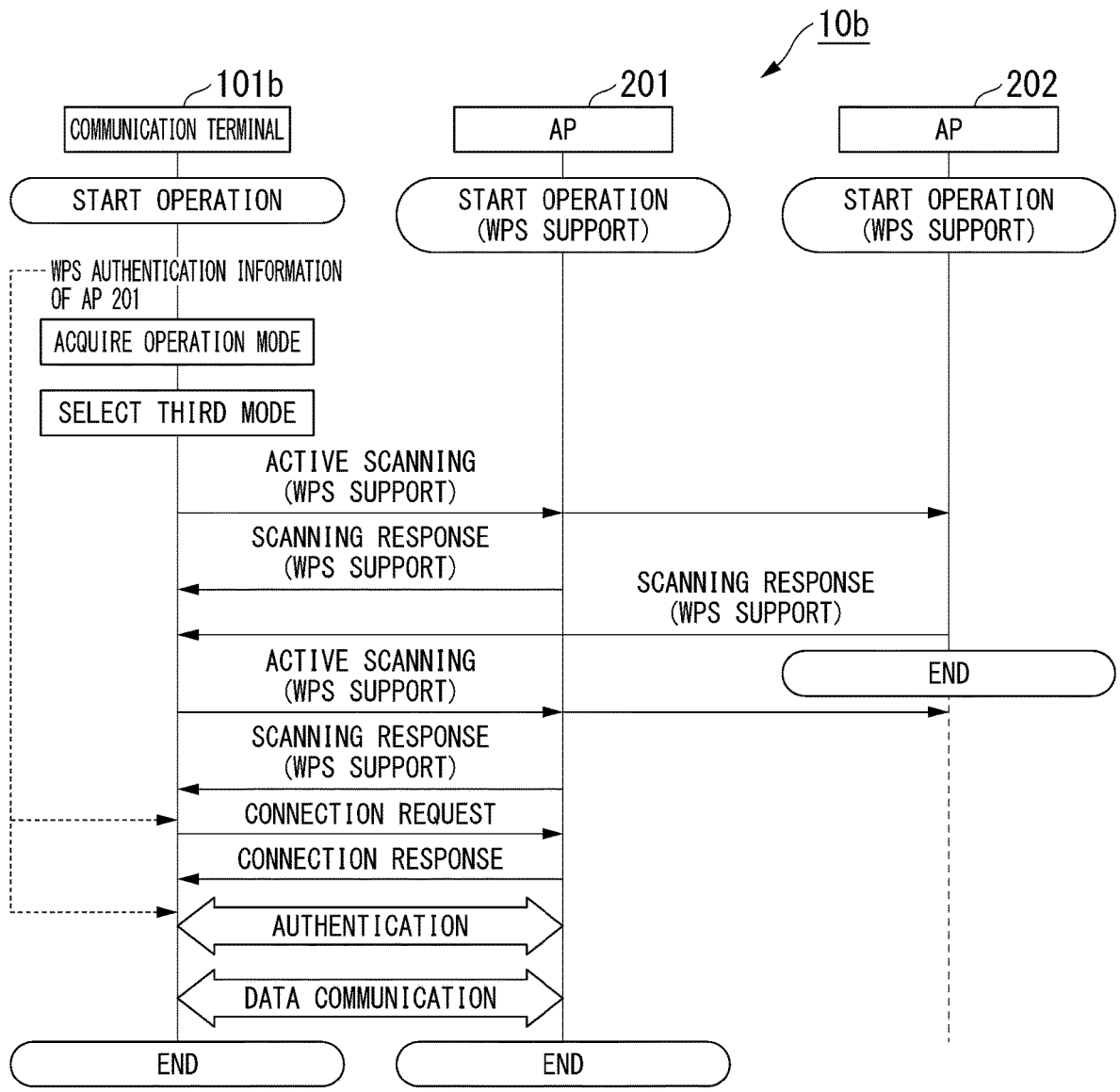
FIG. 24 is a diagram showing a procedure of an operation of each terminal in the fifth embodiment of the present invention.
Figure 25:
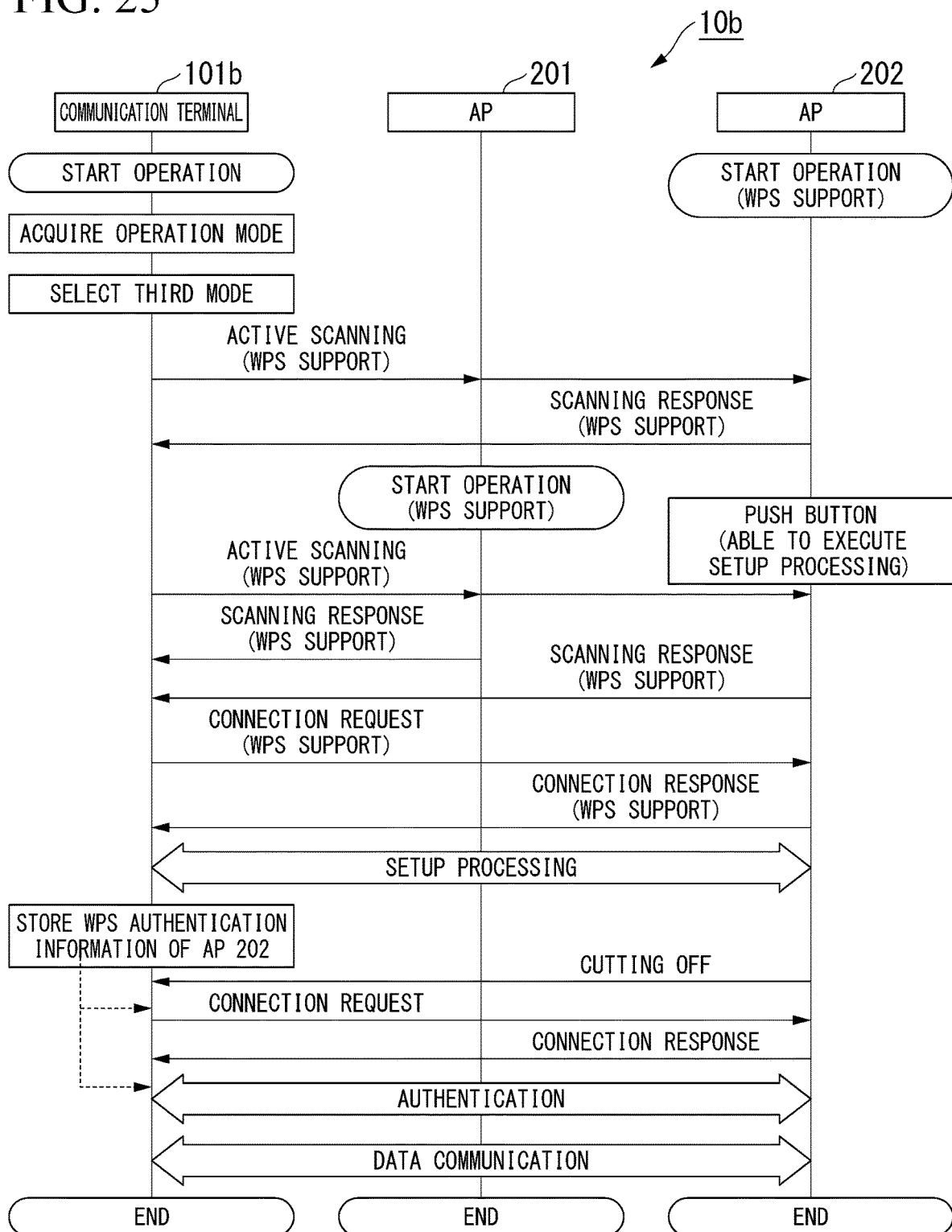
FIG. 25 is a diagram showing a procedure of an operation of each terminal in the fifth embodiment of the present invention.

An example of an operation of each terminal in the fifth embodiment will be described. FIGS. 23 to 25 show a procedure of an operation of each terminal included in a wireless communication system 10b. The wireless communication system 10b includes the communication terminal 101b and two APs (AP 201 and AP 202). The differences from the operations shown in FIG. 11 and FIG. 12 will be described.

FIG. 23 shows an operation of each of the communication terminal 101b in which the second mode has been set as the operation mode and the AP 201 in the WPS support. The AP 201 has been set in the state (WPS support) of being able to execute the setup processing on the basis of a user's operation. In the communication terminal 101b, the state of the operation device 151 has been set to the second mode.

The communication terminal 101b acquires the operation mode (Step S121). Since the operation mode is the second mode, the communication terminal 101b selects the second mode (Step S122).

The communication terminal 101b executes the active scanning by transmitting a probe request by broadcasting (Step S101). The probe request includes the information indicating that the communication terminal 101b supports the WPS. The communication terminal 101b finds the AP 201 by receiving a scanning response transmitted from the AP 201. The scanning response transmitted from the AP 201 includes the information indicating that the AP 201 supports the WPS. Since the scanning response including the information indicating that the AP supports the WPS is received, the communication terminal 101b finds the AP in the WPS support (Step S108).

At this time point, pushing a push button, inputting a PIN code, or the like has not been performed in the AP 201. Therefore, the AP 201 has not started the operation based on the WPS method and is unable to execute the setup processing (Step S109).

Thereafter, a user pushes the button in the AP 201 and the AP 201 is then able to execute the setup processing using the PBC method. The operation mode acquired in Step S121 is the second mode (Step S136). The communication terminal 101b executes the active scanning by transmitting a probe request by broadcasting (Step S101). The probe request includes the information indicating that the communication terminal 101b supports the WPS. The communication terminal 101b finds the AP 201 by receiving a scanning response transmitted from the AP 201. The scanning response transmitted from the AP 201 includes the information indicating that the AP 201 supports the WPS. Therefore, the communication terminal 101b finds the AP in the WPS support (Step S108). The AP 201 is able to execute the setup processing (Step S109). Thereafter, the processing similar to that shown in FIG. 11 is executed.

FIG. 24 shows an operation of each of the communication terminal 101b in which the third mode has been set as the operation mode and two APs in the WPS support. The AP 201 and the AP 202 have been set in the state (WPS support) of being able to execute the setup processing on the basis of a user's operation. In the communication terminal 101b, the state of the operation device 151 has been set to the third mode.

The communication terminal 101b executes the connection and the authentication with the AP 201 by executing the operation shown in FIG. 23 before executing the operation shown in FIG. 24. The communication terminal 101b stores the WPS authentication information of the AP 201 on the memory 131.

The communication terminal 101b acquires the operation mode (Step S121). Since the operation mode is the third mode, the communication terminal 101b selects the third mode (Step S122 and Step S131).

The communication terminal 101b executes the active scanning by transmitting a probe request by broadcasting (Step S132). The probe request includes the information indicating that the communication terminal 101b supports the WPS. The communication terminal 101b finds the AP 201 and the AP 202 by receiving scanning responses transmitted from the AP 201 and the AP 202. The scanning response transmitted from the AP 201 includes the information indicating that the AP 201 supports the WPS. The scanning response transmitted from the AP 202 includes the information indicating that the AP 202 supports the WPS. Therefore, the communication terminal 101b finds the APs in the WPS support (Step S133). The APs in the WPS support are only two APs 201 and 202 (Step S134).

At this time point, pushing a push button, inputting a PIN code, or the like has not been performed in the AP 201 and the AP 202. Therefore, the AP 201 and the AP 202 have not started the operation based on the WPS method and are unable to execute the setup processing (Step S109). Thereafter, the power source is turned off in the AP 202. Since the operation mode acquired in Step S121 is the third mode, the communication terminal 101*b* selects the third mode (Step S136). The communication terminal 101*b* executes the active scanning by transmitting a probe request by broadcasting (Step S132). The probe request includes the information indicating that the communication terminal 101*b* supports the WPS. The communication terminal 101*b* finds the AP 201 by receiving a scanning response transmitted from the AP 201. The scanning response transmitted from the AP 201 includes the information indicating that the AP 201 supports the WPS. Therefore, the communication terminal 101*b* finds the AP in the WPS support (Step S133). The AP in the WPS support is only one AP 201 (Step S134). The AP 201 is the last AP to have executed the connection and the authentication with the communication terminal 101*b* and the APs in the WPS support include the AP 201 (Step S106). Thereafter, the processing similar to that shown in FIG. 12 is executed.

FIG. 25 shows an operation of each of the communication terminal 101*b* in which the third mode has been set as the operation mode and two APs in the WPS support. The number of APs in the WPS support increases from one to two. After the operation shown in FIG. 24 is performed, the power source of the AP 201 is turned off. The AP 202 has been set in the state (WPS support) of being able to execute the setup processing on the basis of a user's operation. In the communication terminal 101*b*, the state of the operation device 151 has been set to the third mode.

The communication terminal 101*b* executes the connection and the authentication with the AP 201 by executing the operation shown in FIG. 24 before executing the operation shown in FIG. 25. The communication terminal 101*b* stores the WPS authentication information of the AP 201 on the memory 131.

The communication terminal 101*b* acquires the operation mode (Step S121). Since the operation mode is the third mode, the communication terminal 101*b* selects the third mode (Step S122 and Step S131).

The communication terminal 101*b* executes the active scanning by transmitting a probe request by broadcasting (Step S132). The probe request includes the information indicating that the communication terminal 101*b* supports the WPS. The communication terminal 101*b* finds the AP 202 by receiving a scanning response transmitted from the AP 202. The scanning response transmitted from the AP 202 includes the information indicating that the AP 202 supports the WPS. Therefore, the communication terminal 101*b* finds the AP in the WPS support (Step S133). The AP in the WPS support is only one AP 202 (Step S134). The AP 202 is not the last AP to have executed the connection and the authentication with the communication terminal 101*b* (Step S106). Therefore, the communication connection is not executed.

The power source of the AP 201 is turned on. At this time, the AP 201 has been set in the state (WPS support) of being able to execute the setup processing on the basis of a user's operation. Thereafter, a user pushes the button in the AP 202 and the AP 202 is then able to execute the setup processing using the PBC method.

Since the operation mode acquired in Step S121 is the third mode, the communication terminal 101*b* selects the third mode (Step S135). The communication terminal 101*b* executes the active scanning by transmitting a probe request by broadcasting (Step S132). The probe request includes the information indicating that the communication terminal 101*b* supports the WPS. The communication terminal 101*b* finds the AP 201 and the AP 202 by receiving scanning responses transmitted from the AP 201 and the AP 202. The scanning response transmitted from the AP 201 includes the information indicating that the AP 201 supports the WPS. The scanning response transmitted from the AP 202 includes the information indicating that the AP 202 supports the WPS. Therefore, the communication terminal 101*b* finds the APs in the WPS support (Step S133). The APs in the WPS support are two APs 201 and 202 (Step S134). The AP 202 is able to execute the setup processing (Step S109). Thereafter, the processing similar to that in the communication terminal 101*b* and the AP 201 shown in FIG. 23 is executed in the communication terminal 101*b* and the AP 202.

In any one of a case in which only one AP is present and a case in which two or more APs are present, the communication terminal 101*b* that has selected the first mode connects to an AP through a similar procedure to that of the automatic connection and executes the authentication with the AP by using the WPS authentication information stored on the memory 131. In addition, in any of the above-described cases, the communication terminal 101*b* that has selected the second mode executes the setup processing without executing the automatic connection regardless of whether or not the WPS authentication information is stored on the memory 131. The communication terminal 101*b* that has selected the second mode connects to an AP and executes the authentication with the AP on the basis of the WPS authentication information acquired through the setup processing.

In addition, in any of the above-described cases, the communication terminal 101*b* that has selected the third mode selects any one of the first mode and the second mode on the basis of the number of APs in the WPS support. When only one AP is in the WPS support, the communication terminal 101*b* selects the first mode. When two or more APs are in the WPS support, the communication terminal 101*b* selects the second mode. A user can reduce the load of operations for switching the operation modes of the communication terminal 101*b* by setting the operation mode of the communication terminal 101*b* to the third mode. Therefore, a user's load of operations related to the connection and the authentication can be reduced.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal, comprising:
   a control circuit;
   a wireless communicator; and
   a memory,
   wherein the memory is configured to store authentication information received from an access point when the control circuit executes setup processing with the access point by using the wireless communicator,
   the control circuit is configured to detect one or more access points by executing scanning using the wireless communicator,
   the control circuit is configured to determine whether or not a first AP is included in the one or more access points, the first AP being an access point having experience in executing the setup processing with the wireless communication terminal, the first AP being the last access point wirelessly connected to by the wireless communicator, the control circuit is configured to determine whether or not a second AP is included in the one or more access points, the second AP being an access point in a state of being able to execute the setup processing with the wireless communication terminal, the control circuit is configured to select any one of a first mode and a second mode by executing selection processing when the wireless communicator does not wirelessly connect to any of the one or more access points, the first mode being an operation mode in which the setup processing is not executed, the second mode being an operation mode in which the setup processing is executed, the control circuit is configured to prevent the wireless communicator from wirelessly connecting to any of the one or more access points when the control circuit selects the first mode in the selection processing and the first AP is not included in the one or more access points, the control circuit is configured to cause the wireless communicator to wirelessly connect to the first AP on the basis of the authentication information of the first AP stored on the memory and is configured to execute authentication processing with the first AP on the basis of the authentication information of the first AP stored on the memory without executing the setup processing when the control circuit selects the first mode in the selection processing and the first AP is included in the one or more access points, the control circuit is configured to cause the wireless communicator to transmit setup information to the second AP and is configured to start the setup processing with the second AP by using the wireless communicator regardless of whether or not a user performs a new operation on the wireless communication terminal after the second mode is selected and regardless of whether or not the authentication information is stored on the memory when the control circuit selects the second mode in the selection processing, the setup information indicating that the control circuit is able to execute the setup processing, and after the setup processing is executed, the control circuit is configured to cause the wireless communicator to wirelessly connect to the second AP with which the control circuit has executed the setup processing and is configured to execute the authentication processing, on the basis of authentication information received from the second AP by the wireless communicator in the setup processing, with the second AP with which the control circuit has executed the setup processing.

2. The wireless communication terminal according to claim 1,
wherein the control circuit is configured to select the first mode in the selection processing when the setup information is not included in information received from at least one of the one or more access points by the wireless communicator by executing the scanning.

3. The wireless communication terminal according to claim 1,
wherein the control circuit is configured to select the second mode in the selection processing when the setup information is included in information received from at least one of the one or more access points by the wireless communicator by executing the scanning.

4. The wireless communication terminal according to claim 1, further comprising an alarm circuit,
wherein the control circuit is configured to notify a user of occurrence of an error by using the alarm circuit without selecting any of the first mode and the second mode in the selection processing when the wireless communicator receives information not including the setup information from at least one of the one or more access points by executing the scanning and the wireless communicator receives the setup information from at least one of the one or more access points by executing the scanning.

5. The wireless communication terminal according to claim 1, further comprising an operation device configured to accept an operation of selecting any one of the first mode and the second mode,
wherein the control circuit is configured to select the first mode in the selection processing when the operation device accepts an operation of selecting the first mode, and
the control circuit is configured to select the second mode in the selection processing when the operation device accepts an operation of selecting the second mode.

6. The wireless communication terminal according to claim 1,
wherein the control circuit is configured to update the authentication information stored on the memory with the authentication information received from the second AP each time the setup processing is executed.

7. The wireless communication terminal according to claim 1,
wherein the control circuit is configured to select the first mode in the selection processing when the wireless communicator receives the setup information from only any one of the one or more access points by executing the scanning, and
the control circuit is configured to select the second mode in the selection processing when the control circuit detects two or more access points by executing the scanning using the wireless communicator and the wireless communicator receives the setup information from at least two of the two or more access points by executing the scanning.

8. The wireless communication terminal according to claim 1, further comprising an operation device configured to accept an operation of selecting any one of a first mode, a second mode, and a third mode, the third mode being an operation mode for selecting any one of the first mode and the second mode on the basis of a state of receiving the setup information,
wherein the control circuit is configured to select the first mode in the selection processing when the operation device accepts an operation of selecting the first mode,
the control circuit is configured to select the second mode in the selection processing when the operation device accepts an operation of selecting the second mode,
the control circuit is configured to select the first mode in the selection processing when the operation device accepts an operation of selecting the third mode and the wireless communicator receives the setup information from only any one of the one or more access points by executing the scanning, and
the control circuit is configured to select the second mode in the selection processing when the control circuit detects two or more access points by executing the scanning using the wireless communicator, the operation device accepts an operation of selecting the third mode, and the wireless communicator receives the setup information from at least two of the two or more access points by executing the scanning.

9. The wireless communication terminal according to claim 1,
wherein the authentication information is configured to be information used for generating a common key and the common key is used for encryption of data communication.

10. The wireless communication terminal according to claim 1,
wherein the authentication information includes at least one of a passphrase and a pre-shared key (PSK).

11. An access point configured to execute wireless communication with a wireless communication terminal, the access point comprising:
a first control circuit; and
a first wireless communicator,
wherein the wireless communication terminal includes a second control circuit, a second wireless communicator, and a memory,
the memory is configured to store authentication information received from the access point when the second control circuit executes setup processing with the access point by using the second wireless communicator,
the second control circuit is configured to detect one or more access points by executing scanning using the second wireless communicator,
the second control circuit is configured to determine whether or not a first AP is included in the one or more access points, the first AP being an access point having experience in executing the setup processing with the wireless communication terminal, the first AP being the last access point wirelessly connected to by the second wireless communicator,
the second control circuit is configured to determine whether or not a second AP is included in the one or more access points, the second AP being an access point in a state of being able to execute the setup processing with the wireless communication terminal,
the second control circuit is configured to select any one of a first mode and a second mode by executing selection processing when the second wireless communicator does not wirelessly connect to any of the one or more access points, the first mode being an operation mode in which the setup processing is not executed, the second mode being an operation mode in which the setup processing is executed,
the second control circuit is configured to prevent the second wireless communicator from wirelessly connecting to any of the one or more access points when the second control circuit selects the first mode in the selection processing and the first AP is not included in the one or more access points,
the second control circuit is configured to cause the second wireless communicator to wirelessly connect to the first AP on the basis of the authentication information of the first AP stored on the memory and is configured to execute authentication processing with the first AP on the basis of the authentication information of the first AP stored on the memory without executing the setup processing when the second control circuit selects the first mode in the selection processing and the first AP is included in the one or more access points,
the second control circuit is configured to cause the second wireless communicator to transmit setup information to the second AP and is configured to start the setup processing with the second AP by using the second wireless communicator regardless of whether or not a user performs a new operation on the wireless communication terminal after the second mode is selected and regardless of whether or not the authentication information is stored on the memory when the second control circuit selects the second mode in the selection processing, the setup information indicating that the second control circuit is able to execute the setup processing,
after the setup processing is executed, the second control circuit is configured to cause the second wireless communicator to wirelessly connect to the second AP with which the second control circuit has executed the setup processing and is configured to execute the authentication processing, on the basis of authentication information received from the second AP by the second wireless communicator in the setup processing, with the second AP with which the second control circuit has executed the setup processing,
the first control circuit is configured to generate authentication information,
the first control circuit is configured to cause the first wireless communicator to wirelessly connect to the wireless communication terminal and is configured to execute the authentication processing with the wireless communication terminal on the basis of the generated authentication information without executing the setup processing in a case in which the first wireless communicator does not receive the setup information from the wireless communication terminal,
the first control circuit is configured to start the setup processing with the wireless communication terminal by using the first wireless communicator when the first wireless communicator receives the setup information from the wireless communication terminal,
the first control circuit is configured to cause the first wireless communicator to transmit the generated authentication information to the wireless communication terminal in the setup processing,
after the setup processing is executed, the first control circuit is configured to cause the first wireless communicator to wirelessly connect to the wireless communication terminal with which the first control circuit has executed the setup processing and is configured to execute the authentication processing, on the basis of the authentication information transmitted to the wireless communication terminal in the setup processing, with the wireless communication terminal with which the first control circuit has executed the setup processing, and
the first control circuit is configured to generate authentication information different from the already generated authentication information each time the first control circuit executes the setup processing.

12. A wireless communication system, comprising:
an access point; and
a wireless communication terminal,
wherein the access point includes:
a first wireless communicator; and
a first control circuit, the wireless communication terminal includes:
a second control circuit;
a second wireless communicator; and
a memory,
the memory is configured to store authentication information received from the access point when the second control circuit executes setup processing with the access point by using the second wireless communicator,
the second control circuit is configured to detect one or more access points by executing scanning using the second wireless communicator,
the second control circuit is configured to determine whether or not a first AP is included in the one or more access points, the first AP being an access point having experience in executing the setup processing with the wireless communication terminal, the first AP being the last access point wirelessly connected to by the second wireless communicator,
the second control circuit is configured to determine whether or not a second AP is included in the one or more access points, the second AP being an access point in a state of being able to execute the setup processing with the wireless communication terminal,
the second control circuit is configured to select any one of a first mode and a second mode by executing selection processing when the second wireless communicator does not wirelessly connect to any of the one or more access points, the first mode being an operation mode in which the setup processing is not executed, the second mode being an operation mode in which the setup processing is executed,
the second control circuit is configured to prevent the second wireless communicator from wirelessly connecting to any of the one or more access points when the second control circuit selects the first mode in the selection processing and the first AP is not included in the one or more access points,
the second control circuit is configured to cause the second wireless communicator to wirelessly connect to the first AP on the basis of the authentication information of the first AP stored on the memory and is configured to execute authentication processing with the first AP on the basis of the authentication information of the first AP stored on the memory without executing the setup processing when the second control circuit selects the first mode in the selection processing and the first AP is included in the one or more access points,
the second control circuit is configured to cause the second wireless communicator to transmit setup information to the second AP and is configured to start the setup processing with the second AP by using the second wireless communicator regardless of whether or not a user performs a new operation on the wireless communication terminal after the second mode is selected and regardless of whether or not the authentication information is stored on the memory when the second control circuit selects the second mode in the selection processing, the setup information indicating that the second control circuit is able to execute the setup processing,
after the setup processing is executed, the second control circuit is configured to cause the second wireless communicator to wirelessly connect to the second AP with which the second control circuit has executed the setup processing and is configured to execute the authentication processing, on the basis of authentication information received from the second AP by the second wireless communicator in the setup processing, with the second AP with which the second control circuit has executed the setup processing,
the first control circuit is configured to generate authentication information,
the first control circuit is configured to cause the first wireless communicator to wirelessly connect to the wireless communication terminal and is configured to execute the authentication processing with the wireless communication terminal on the basis of the generated authentication information without executing the setup processing in a case in which the first wireless communicator does not receive the setup information from the wireless communication terminal,
the first control circuit is configured to start the setup processing with the wireless communication terminal by using the first wireless communicator when the first wireless communicator receives the setup information from the wireless communication terminal,
the first control circuit is configured to cause the first wireless communicator to transmit the generated authentication information to the wireless communication terminal in the setup processing,
after the setup processing is executed, the first control circuit is configured to cause the first wireless communicator to wirelessly connect to the wireless communication terminal with which the first control circuit has executed the setup processing and is configured to execute the authentication processing, on the basis of the authentication information transmitted to the wireless communication terminal in the setup processing, with the wireless communication terminal with which the first control circuit has executed the setup processing, and
the first control circuit is configured to generate authentication information different from the already generated authentication information each time the first control circuit executes the setup processing.

13. A wireless communication method of a wireless communication terminal,
wherein the wireless communication terminal includes a control circuit, a wireless communicator, and a memory,
the memory is configured to store authentication information received from an access point when the control circuit executes setup processing with the access point by using the wireless communicator,
the wireless communication method comprises:
a first step in which the control circuit detects one or more access points by executing scanning using the wireless communicator,
a second step in which the control circuit determines whether or not a first AP is included in the one or more access points, the first AP being an access point having experience in executing the setup processing with the wireless communication terminal, the first AP being the last access point wirelessly connected to by the wireless communicator,
a third step in which the control circuit determines whether or not a second AP is included in the one or more access points, the second AP being an access point in a state of being able to execute the setup processing with the wireless communication terminal, a fourth step in which the control circuit selects any one of a first mode and a second mode by executing selection processing when the wireless communicator does not wirelessly connect to any of the one or more access points, the first mode being an operation mode in which the setup processing is not executed, the second mode being an operation mode in which the setup processing is executed,
   wherein the control circuit prevents the wireless communicator from wirelessly connecting to any of the one or more access points when the control circuit selects the first mode in the selection processing and the first AP is not included in the one or more access points, a fifth step in which the control circuit causes the wireless communicator to wirelessly connect to the first AP on the basis of the authentication information of the first AP stored on the memory and executes authentication processing with the first AP on the basis of the authentication information of the first AP stored on the memory without executing the setup processing when the control circuit selects the first mode in the selection processing and the first AP is included in the one or more access points, a sixth step in which the control circuit causes the wireless communicator to transmit setup information to the second AP and starts the setup processing with the second AP by using the wireless communicator regardless of whether or not a user performs a new operation on the wireless communication terminal after the second mode is selected and regardless of whether or not the authentication information is stored on the memory when the control circuit selects the second mode in the selection processing, the setup information indicating that the control circuit is able to execute the setup processing, and a seventh step in which the control circuit causes the wireless communicator to wirelessly connect to the second AP with which the control circuit has executed the setup processing and executes the authentication processing, on the basis of authentication information received from the second AP by the wireless communicator in the setup processing, with the second AP with which the control circuit has executed the setup processing after the setup processing is executed.

14. A non-transitory computer-readable recording medium saving a program for causing a control circuit of a wireless communication terminal to execute processing,
   wherein a memory of the wireless communication terminal is configured to store authentication information received from an access point when the control circuit executes setup processing with the access point by using a wireless communicator of the wireless communication terminal, the program causes the control circuit to execute:

a first step in which the control circuit detects one or more access points by executing scanning using the wireless communicator, a second step in which the control circuit determines whether or not a first AP is included in the one or more access points, the first AP being an access point having experience in executing the setup processing with the wireless communication terminal, the first AP being the last access point wirelessly connected to by the wireless communicator, a third step in which the control circuit determines whether or not a second AP is included in the one or more access points, the second AP being an access point in a state of being able to execute the setup processing with the wireless communication terminal, a fourth step in which the control circuit selects any one of a first mode and a second mode by executing selection processing when the wireless communicator does not wirelessly connect to any of the one or more access points, the first mode being an operation mode in which the setup processing is not executed, the second mode being an operation mode in which the setup processing is executed,
   wherein the control circuit prevents the wireless communicator from wirelessly connecting to any of the one or more access points when the control circuit selects the first mode in the selection processing and the first AP is not included in the one or more access points, a fifth step in which the control circuit causes the wireless communicator to wirelessly connect to the first AP on the basis of the authentication information of the first AP stored on the memory and executes authentication processing with the first AP on the basis of the authentication information of the first AP stored on the memory without executing the setup processing when the control circuit selects the first mode in the selection processing and the first AP is included in the one or more access points, a sixth step in which the control circuit causes the wireless communicator to transmit setup information to the second AP and starts the setup processing with the second AP by using the wireless communicator regardless of whether or not a user performs a new operation on the wireless communication terminal after the second mode is selected and regardless of whether or not the authentication information is stored on the memory when the control circuit selects the second mode in the selection processing, the setup information indicating that the control circuit is able to execute the setup processing, and a seventh step in which the control circuit causes the wireless communicator to wirelessly connect to the second AP with which the control circuit has executed the setup processing and executes the authentication processing, on the basis of authentication information received from the second AP by the wireless communicator in the setup processing, with the second AP with which the control circuit has executed the setup processing after the setup processing is executed.

\* \* \* \* \*